(12) United States Patent
Hirai et al.

(10) Patent No.: US 6,339,699 B1
(45) Date of Patent: Jan. 15, 2002

(54) PHONE HOLDER

(75) Inventors: Hiroki Hirai; Yuichiro Tsutsumi; Masashi Sugimoto; Tetsuji Tanaka; Yasuhiro Hiura; Shigeki Sakai; Yoshito Sakai, all of Nagoya (JP)

(73) Assignees: Harness System Technologies Research, Ltd., Nagoya; Sumitomo Wiring Systems, Ltd., Mie; Sumitomo Electric Industries Ltd., Osaka, all of (JP)

(*) Notice: Subject to any disclaimer, the term of this patent is extended or adjusted under 35 U.S.C. 154(b) by 0 days.

(21) Appl. No.: 09/153,897

(22) Filed: Sep. 16, 1998

(30) Foreign Application Priority Data

| Sep. 24, 1997 | (JP) | 9-258935 |
| Sep. 24, 1997 | (JP) | 9-258936 |
| Nov. 27, 1997 | (JP) | 9-326541 |
| Mar. 16, 1998 | (JP) | 10-065747 |

(51) Int. Cl.[7] .................................. H04B 1/38
(52) U.S. Cl. ................ 455/90; 455/575; 455/346; 379/433; 379/408
(58) Field of Search .................... 455/90, 575, 89, 455/100, 345–349, 351; 379/426, 446, 449, 455, 454, 428, 433

(56) References Cited

U.S. PATENT DOCUMENTS

| 5,189,358 A | * | 2/1993 | Tomura et al. ............ 320/2 |
| 5,230,016 A | * | 7/1993 | Yasuda ...................... 379/58 |
| 5,659,887 A | * | 8/1997 | Ooe ........................... 456/575 |
| 5,708,707 A | * | 1/1998 | Halttunen et al. ......... 379/446 |
| 5,896,564 A | * | 4/1999 | Akama et al ............. 455/90 |
| 5,898,775 A | * | 4/1999 | Niemo et al. .............. 379/446 |
| 5,940,502 A | * | 8/1999 | Hirai et al ................. 379/446 |
| 5,956,399 A | * | 9/1999 | Whitley et al. ............ 379/446 |
| 5,995,622 A | * | 11/1999 | Roussy et al. ............. 379/446 |
| 6,028,930 A | * | 2/2000 | Chen ......................... 379/446 |
| 6,043,626 A | * | 3/2000 | Snyder et al. ............. 320/113 |
| 6,052,603 A | * | 4/2000 | Kinzalow et al. ......... 455/557 |

FOREIGN PATENT DOCUMENTS

| DE | 4107995 A1 | * | 8/1995 | ......... B60R/11/02 |
| EP | 0545670 A2 | * | 1/1992 | ......... H04M/1/04 |
| GB | 2286744 A | * | 8/1995 | ......... H04M/1/04 |

* cited by examiner

*Primary Examiner*—Daniel Hunter
*Assistant Examiner*—Pablo Tran
(74) *Attorney, Agent, or Firm*—Oliff & Berridge, PLC

(57) ABSTRACT

A phone holder for holding a mobile phone in a connected state with a holder connector. The phone holder has a fixed casing and a movable casing. The movable casing is mounted with the holder connector and formed with a hollow portion therein. The movable casing is mounted on the fixed casing and is settable between a housed position and a detachable position. When set at the detachable position, the hollow portion of the movable casing is accessible to enable insertion of the mobile phone in the movable casing in the connecting direction with the holder connector.

15 Claims, 45 Drawing Sheets

PHONE HOLDER

BACKGROUND OF THE INVENTION

1. Field of the Invention

This invention relates to a phone holder which is mounted in a passenger compartment of a vehicle to enable holding of a mobile phone.

2. Description of the Background Art

In recent years, as mobile phones become popular, various types of phone holders for use in e.g., a vehicle which enable holding of the mobile phone in a connected state with a holder connector have been developed. One of such phone holders comprises a holder main body such as a base frame capable of holding a mobile phone, and a holder connector mounted on the holder main body or a vehicle body via a curl cord or its equivalent. A mobile phone is held by the phone holder in such a manner that it is connected to the holder connector when the mobile phone is positioned relative to the holder main body and held therein by an engaging means.

In the above phone holder, a connecting operation of the mobile phone with the holder connector and a positioning operation of the mobile phone relative to the holder main body are not feasible when a driver has to perform the above operations during driving. Further, while driving, a holding state of the mobile phone set in the phone holder is unstable due to a shaking of the vehicle and the like. Accordingly, the phone may be disconnected from the holder connector or may come out of the holder main body.

To eliminate the above drawbacks, a phone holder as shown in FIG. 45 has been developed. This phone holder is incorporated in a vehicle body 200, and comprises a holder main body 202 and a hollow portion (phone insertion space) 204 to insert a mobile phone T in a substantially horizontal posture from above. A holder connector 206 is fixed to a side portion of the hollow portion 204 to be connected to the mobile phone T placed in the hollow portion 204.

The above phone holder of prior art has the problem such that when setting the mobile phone T in the hollow portion 204 in a connected state with the holder connector 206, the mobile phone T has to be inserted in the hollow portion 204 from above in the direction of arrow ① (first stage of insertion). Then, the mobile phone T has to be shifted by a certain length horizontally toward the holder connector 206 in the direction of arrow ② (second stage of insertion) to be connected with the holder connector 206. Accordingly, a length L1 of the hollow portion 204 must be set greater than a length L2 of the mobile phone T by a length corresponding to a stroke of connecting the mobile phone T with the holder connector 206 in the second stage. Accordingly, the phone holder requires a large space for installation, becoming a hindrance against an idea of installing the phone holder in a limited space of the vehicle body.

SUMMARY OF THE INVENTION

In view of the above problem of the prior art, it is an object of this invention to provide a phone holder that enables holding of a mobile phone with an easy operation in a stable state.

To fulfil the above object, the phone holder according to this invention comprises: a movable casing formed with a hollow portion adapted for receiving the mobile phone: a holder connector mounted on the movable casing at such a position as to be connectable with the mobile phone when the mobile phone is inserted in the movable casing; and a fixed casing for supporting the movable casing. The movable casing is settable between a housed position where the movable casing is housed in the fixed casing along with the mobile phone and a detachable position where the hollow portion is accessible to allow insertion of the mobile phone with the holder connector and ejection of the mobile phone.

It should be noted that "the housed position" of the movable casing is not limited to a position where the movable casing along with the mobile phone is completely accommodated in the fixed casing, and includes a state where part of the movable casing and the mobile phone is exposed outside of the fixed casing.

In this arrangement, the mobile phone can be inserted in the same direction as the connecting direction with the holder connector in the hollow portion of the movable casing when the movable casing is set to the detachable position, thereby facilitating connection with the holder connector in the connecting direction. After the connection, simply setting the movable casing to the housed position enables housing of the movable casing along with the mobile phone in the fixed casing.

The above and other objects, features and advantages of the present invention will become more apparent upon a reading of the following detailed description and drawings.

DETAILED DESCRIPTION OF THE PREFERRED EMBODIMENTS OF THE INVENTION

Figure 1:
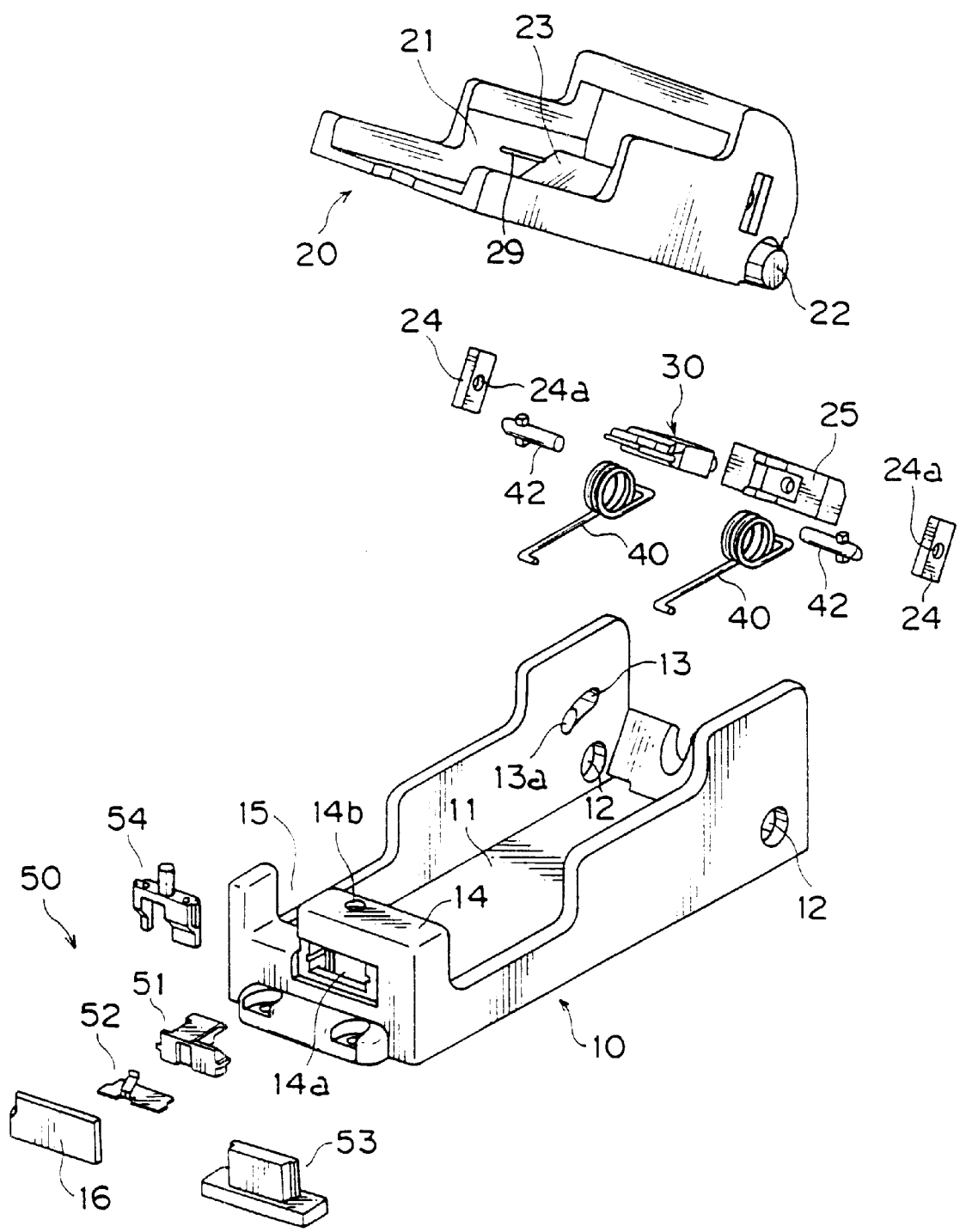
FIG. 1 is an exploded perspective view of a phone holder as a first embodiment according to this invention.

Hereinafter, preferred embodiments of this invention is described with reference to the accompanying drawings. It should be noted that in general throughout the detailed description, a lengthwise direction of a mobile phone 1, a widthwise direction thereof w, and a thickness direction thereof t are respectively defined, but not limited to, as a phone insertion direction, a transverse direction (widthwise) direction, and a thickness direction (see FIG. 3). However, for the purpose of easy understanding with clear and concise description and figures, one or more of the above directionalities may be referred to as different terminology.

First Embodiment

A first embodiment of a phone holder of this invention is described with reference to FIGS. 1 to 13.

The phone holder in this embodiment comprises a fixed casing 10, a movable casing 20, and a holder connector 30.

The fixed casing 10 is fixed in a certain position (e.g., an instrumental panel of an automotive vehicle), and is shaped into a vessel-like form with a hollow portion (movable casing accommodating space) 11 opened upward. The fixed casing 10 is formed with a through hole 12 at a rear portion on opposite side walls thereof.

The movable casing 20 is formed with a hollow portion (phone insertion space) 21 to set a mobile phone T therein. The hollow portion 21 is opened upward at a forward portion of the movable casing 20, and is also opened in a front direction (in a direction opposite to a connecting direction of the mobile phone T with the holder connector 30). For easy understanding, a portion of connecting the mobile phone T with the holder connector 30 is referred to as a "rear portion"

of the phone holder, while the portion opposite to the rear portion in the lengthwise direction of the mobile phone T is referred to a "forward portion" of the phone holder throughout the description unless otherwise specifically defined with a clear and concise term.

A pivot shaft 22 is insertable in the through holes 12 of the fixed casing 10 and through holes at a rear portion of the movable casing 20 in the transverse direction of the mobile phone T. When the pivot shaft 22 is inserted in the through holes 12 of the fixed casing 10 and the corresponding through holes of the movable casing 20 and fastened with fastening means such as a bolt and a nut, the movable casing 20 is mounted on the fixed casing 10 to be pivotable about an axis of the pivot shaft 22.

A torsion spring (biasing member) 40 (see FIG. 1) is wound around the pivot shaft 22 to raise the movable casing 20 upward in such a direction as to rotate the movable casing 20 in a clockwise direction in FIG. 3, i.e., to set the movable casing 20 to a detachable position which is described later due to a biasing force of the torsion spring 40.

More specifically, the movable casing 20 is supported on the fixed casing 10 to switch the position thereof between a housed position (position of FIG. 5) where the movable casing 20 is housed in the hollow portion 11 in a substantially horizontal state and the detachable position (position of FIGS. 3 and 4) where a forward portion of the movable casing 20 is raised up from the housed position to render the hollow portion 21 accessible to the mobile phone T from outside to place the mobile phone T therein. The biasing force of the torsion spring 40 is applied to the movable casing 20 to set the movable casing 20 at the detachable position.

Figure 13:
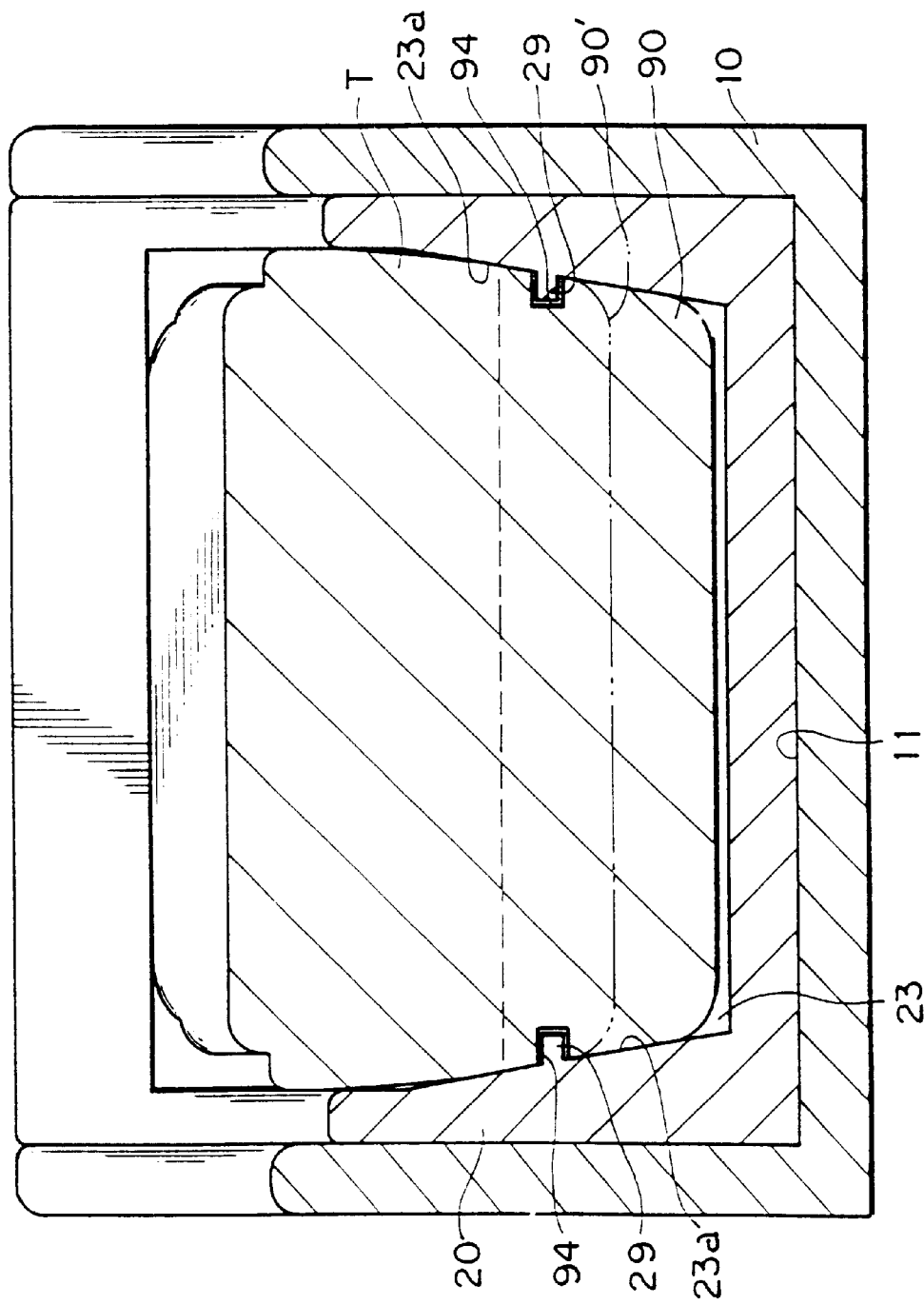
FIG. 13 is a cross sectional front view showing a state that a battery casing of the mobile phone is fitted in a recess of the movable casing.

As shown in FIG. 13, a battery casing 90 is mounted on a bottom plane of the mobile phone T in this embodiment to accommodate a battery therein. The battery casing 90 has a greater thickness (i.e., bulged downward in FIG. 13) than the other bottom portion of the mobile phone T, and a width thereof (transverse direction in FIG. 13) is reduced as directed downward. A recess 23 is formed in a bottom wall of the movable casing 20 to receive the bulged battery casing 90 of the mobile phone T.

Specifically, referring to FIG. 13, each of the opposite inner side surfaces 23a of the recess 23 is tapered toward the middle of the width of the mobile phone T in the downward direction. A guide groove 94 is formed on opposite outer side walls at a rear portion of the battery casing 90 extending in the lengthwise direction of the mobile phone T. A guide rib 29 which is engageable in the guide groove 94 is formed at the inner side surface 23a. The engagement of the guide ribs 29 in the guide grooves 94 fixedly sets the battery casing 90 of the mobile phone T at a certain height level when the mobile phone T is set in the movable casing 20.

Figure 3:
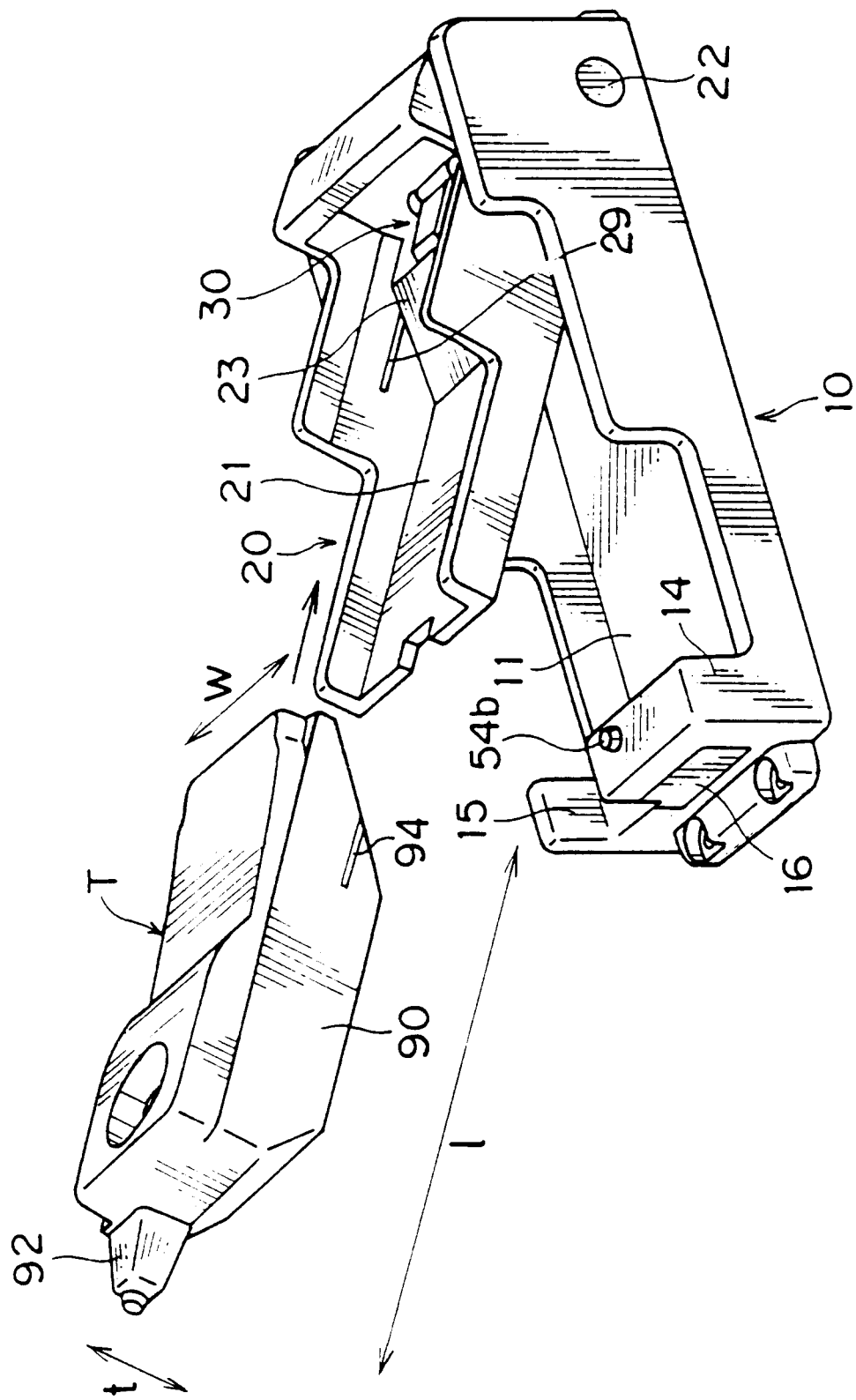
FIG. 3 is a perspective view showing a state that a mobile phone is about to be inserted in the movable casing at a detachable position.
Figure 4:
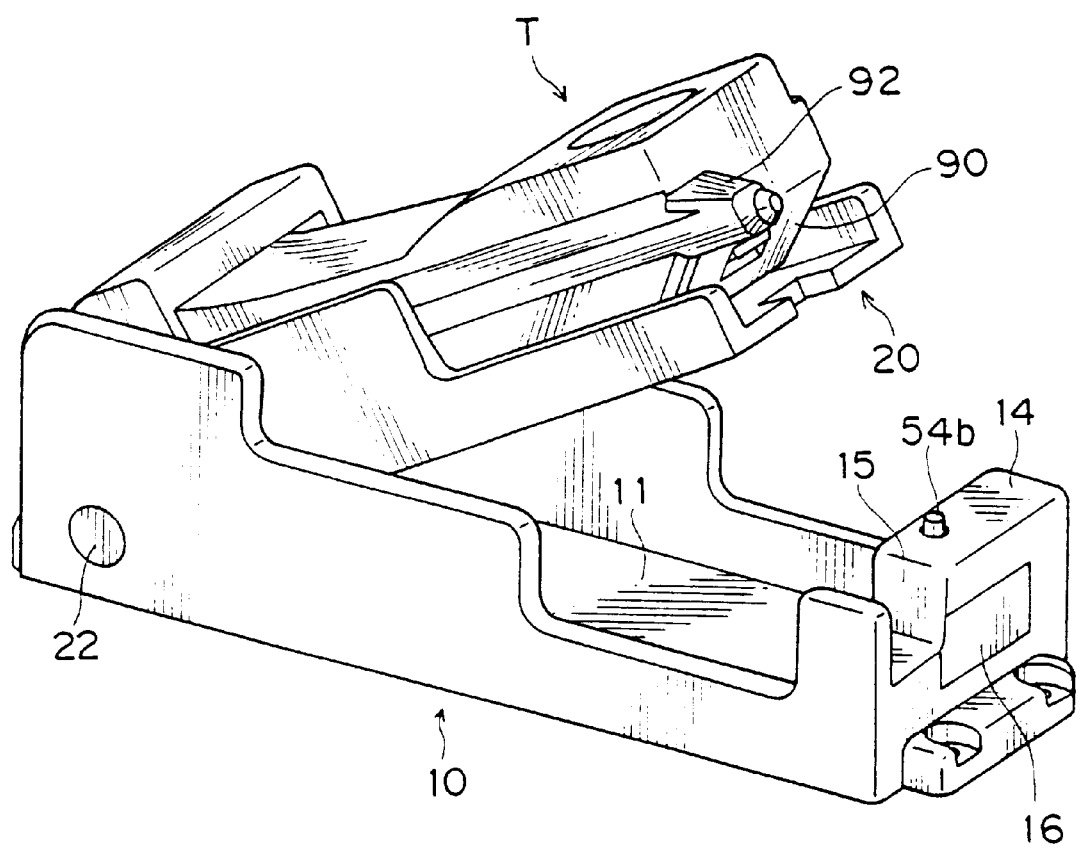
FIG. 4 is a perspective view showing a state that the mobile phone is inserted in the movable casing at the detachable position.
Figure 5:
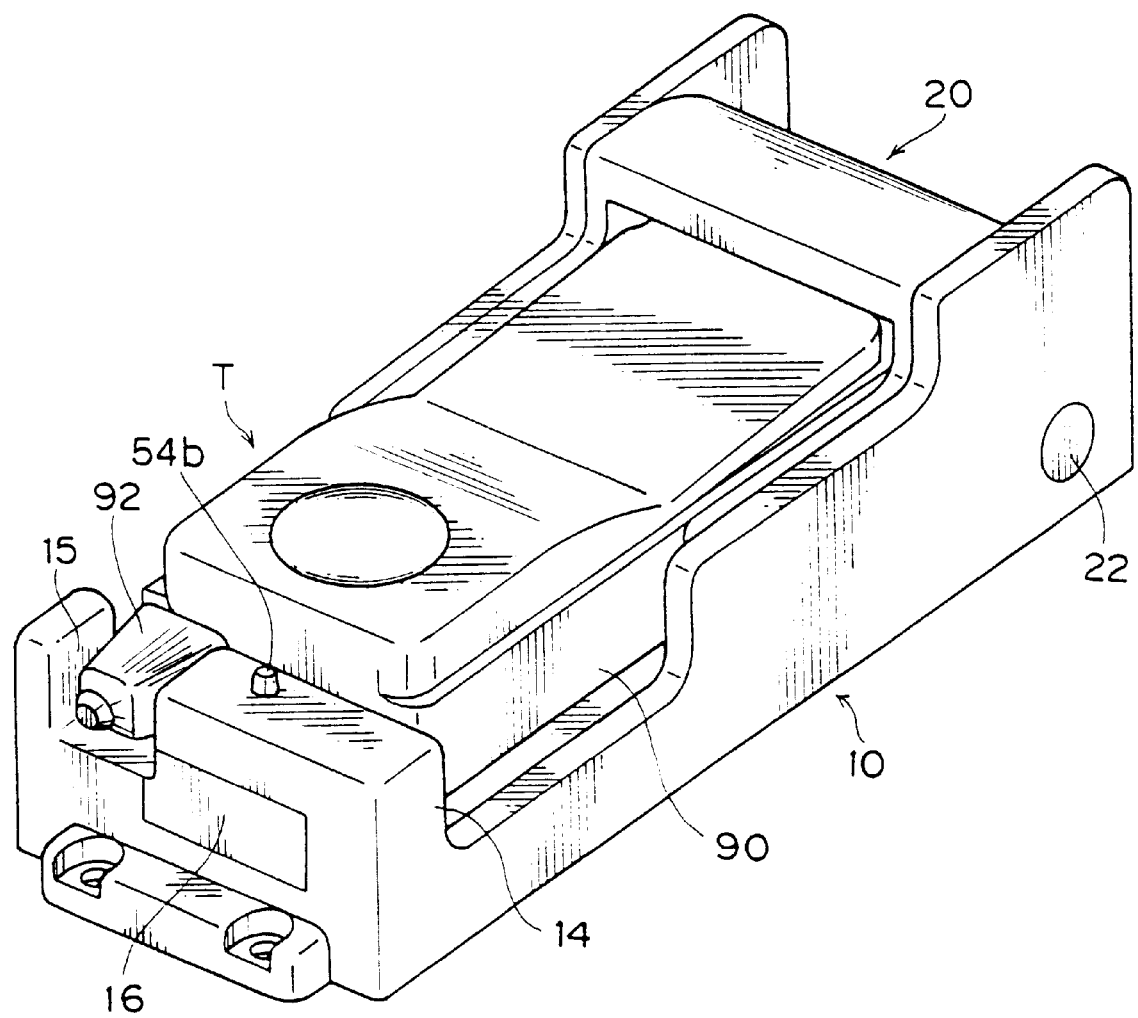
FIG. 5 is a perspective view showing a state that the mobile phone and the movable casing are accommodated in the fixed casing at a housed position.
Figure 6:
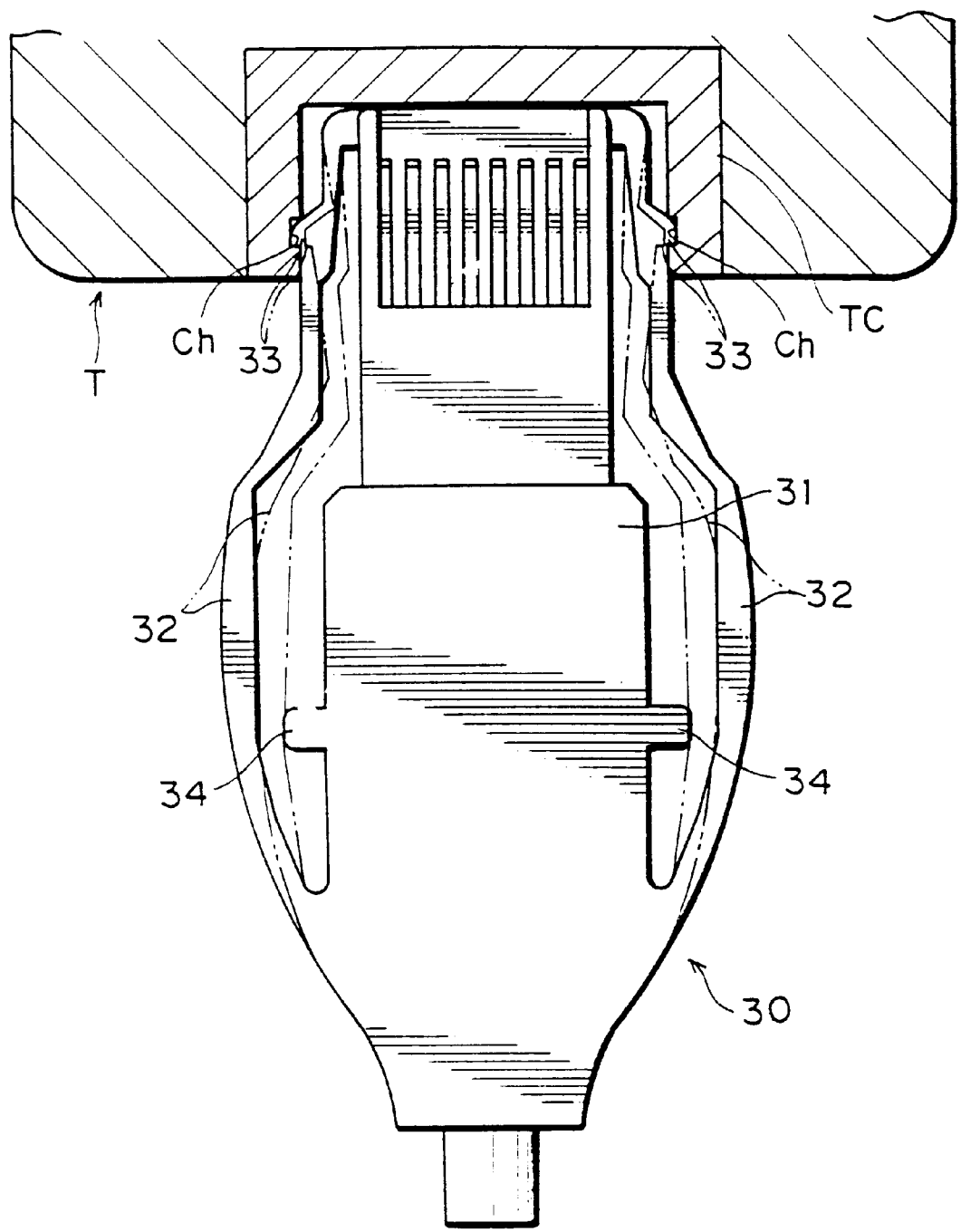
FIG. 6 is a plan view of a holder connector provided on the movable casing.

A phone connector TC shown in FIG. 6 is mounted at a rear end of the mobile phone T (left end in FIG. 3).

The holder connector 30 is provided at such a position on the rear portion of the movable casing 20 as to be connectable with the phone connector TC when the mobile phone T is placed in the hollow portion 21.

As shown in FIG. 6. the holder connector 30 is integrally formed with a connector main body 31 and a pair of operable members 32. The operable member 32 is a thin piece and is integral with the connector main body 31 due to a connection of the connector main body 31 with a front end (upper end in FIG. 6) and a rear end (lower end in FIG. 6) thereof.

More specifically, the operable member 32 is bulged outward in the width direction of the mobile phone T at an intermediate portion and curved into a substantially arc shape. When an external pressing force is applied to the intermediate portions of the operable members 32, the operable members 32 are deformed inward (see the state of the operable members 32 shown by the broken line in FIG. 6).

An engaging piece (locking member) 33 is projected from a side surface of a front portion of each of the operable members 32. When the operable members 32 are not applied with an external pressing force, as shown by the solid line in FIG. 6, the engaging pieces 33 are fitted in recesses Ch formed in an inner side surface of the phone connector TC to retain a connected state of the phone connector TC with the holder connector 30.

On the other hand,. when a pressing force is applied to the operable members 32 to deform the intermediate portion thereof inward, as shown by the broken line in FIG. 6, the engaging pieces 33 are retracted inward (disengaged from the recesses Ch) to release the locked state (connected state) of the holder connector 30 with the phone connector TC.

Reference numeral 34 in FIG. 6 is a stopper which is provided on the connector main body 31 to restrict the operable member 32 from deforming beyond a maximum amount.

A pair of operated shafts (movable members) 42 (see FIG. 1) are provided at such a position as to oppose to widthwise outer ends of the holder connector 30 at the rear portion of the movable casing 20. An upright projecting piece (stopper) 42a (see FIG. 7) is provided near an outward end of each of the operated shafts 42 to prohibit a rotation of the operated shafts 42.

Figure 8:
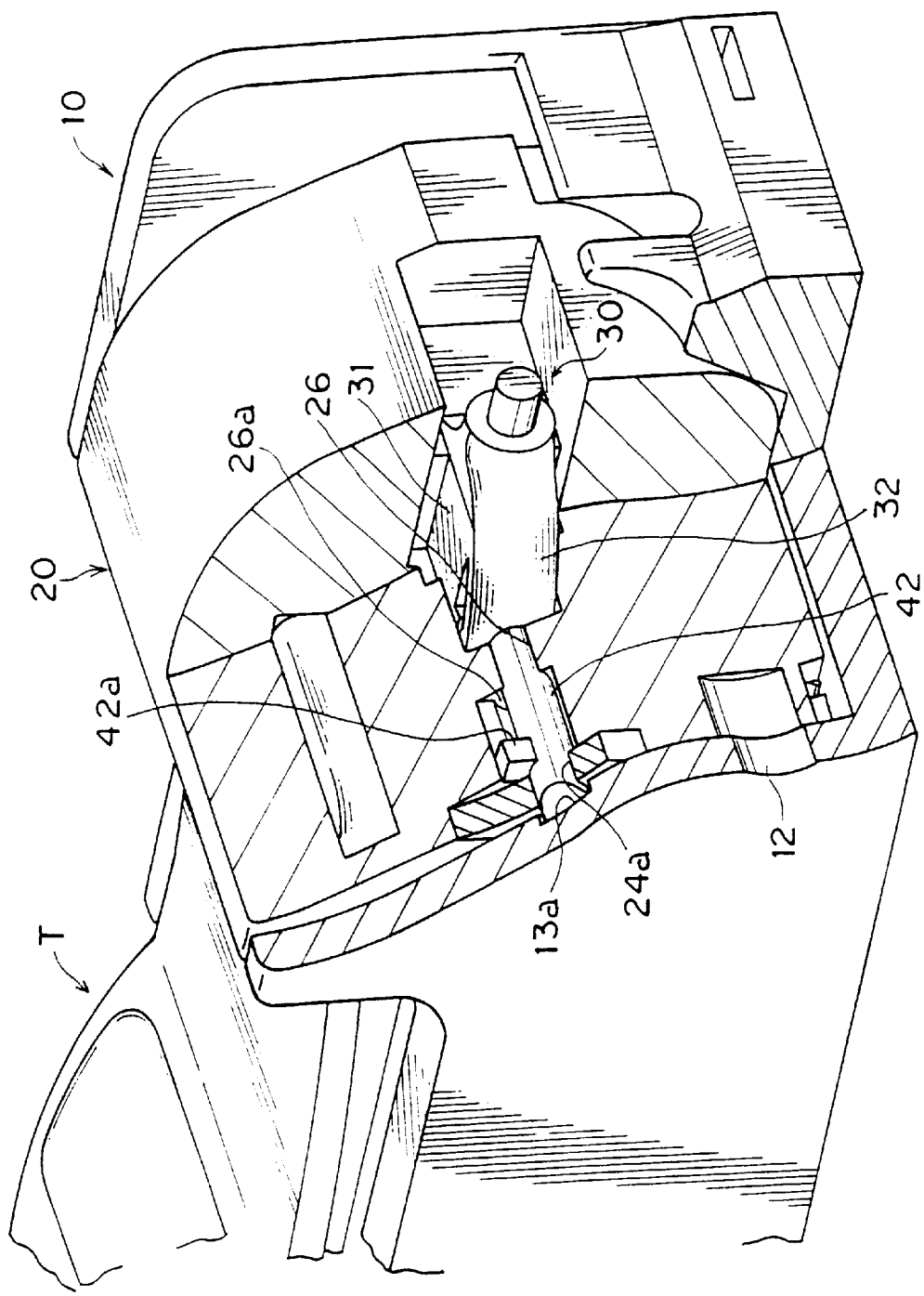
FIG. 8 is a partially cutaway perspective view showing a state that the holder connector and the operable member are provided in the movable casing.

As shown in FIG. 8, a through cutaway 26 extending from an outer side surface of the movable casing 20 to the operable member 32 of the holder connector 30 (i.e., extending in the widthwise direction of the mobile phone T) is formed in the rear portion of the movable casing 20 at opposite ends in the width direction of the mobile phone T. A stopper receptor 26a is formed in an outer side of each of the through cutaways 26 to accommodate a main body of the operated shaft 42 and the stopper 42a therein.

Figure 2:
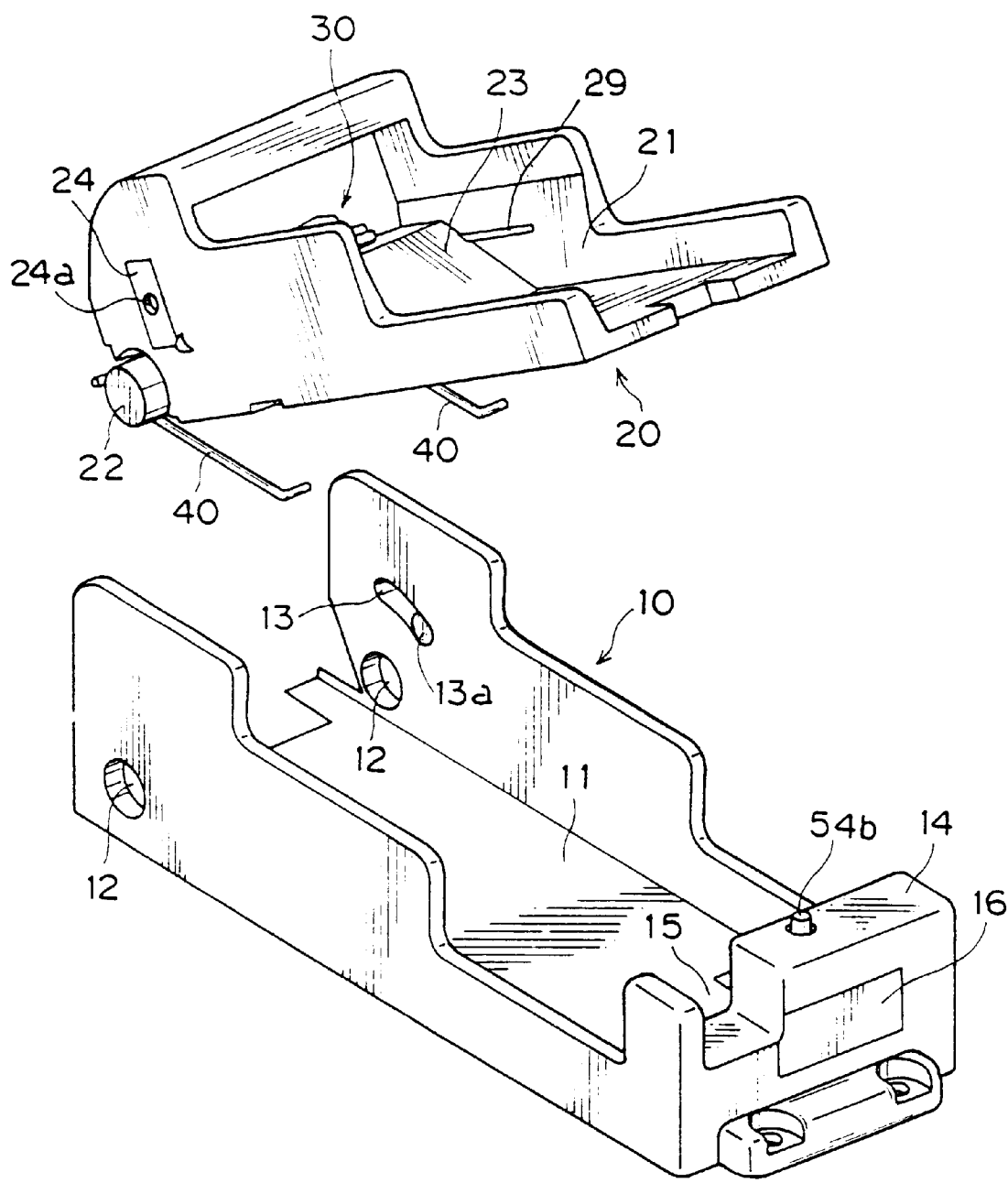
FIG. 2 is a perspective view showing a state that a movable casing is detached from a fixed casing in the first embodiment.

Fitting of the stopper 42a in the stopper receptors 26a prevents the operated shafts 42 from rotating about an axis thereof, while allowing a movement thereof in the axial direction (widthwise direction of the mobile phone T). Abutment of the stopper projections 42a with lids 24 (only one lid is shown in FIG. 2) which cover the stopper receptors 26a from outside prevents falling off of the operated shafts 42 from the movable casing 20. Each of the lids 24 is formed with a through hole 24a through which an outer end of each of the operated shafts 42 protrudes outward from an outer wall of the movable casing 20.

A groove 13 of an arc shape (curved shape) (as a guide member) (see FIGS. 1 & 7) is formed in an inner side of each of the side walls of the fixed casing 10 at a position opposing to the outer end of the operated shaft 42. The groove 13 is so shaped as to follow a track of a movement of the operated shaft (as a movable member) 42 while the movable casing 20 is pivoted about an axis of the operated shaft 42. A recess 13a which is deeper than the other portion of the groove 13 is formed at a foremost end of the groove 13 (i.e., at a contact position with the operated shaft 42 when the movable casing 20 is set to the housed position).

Figure 7:
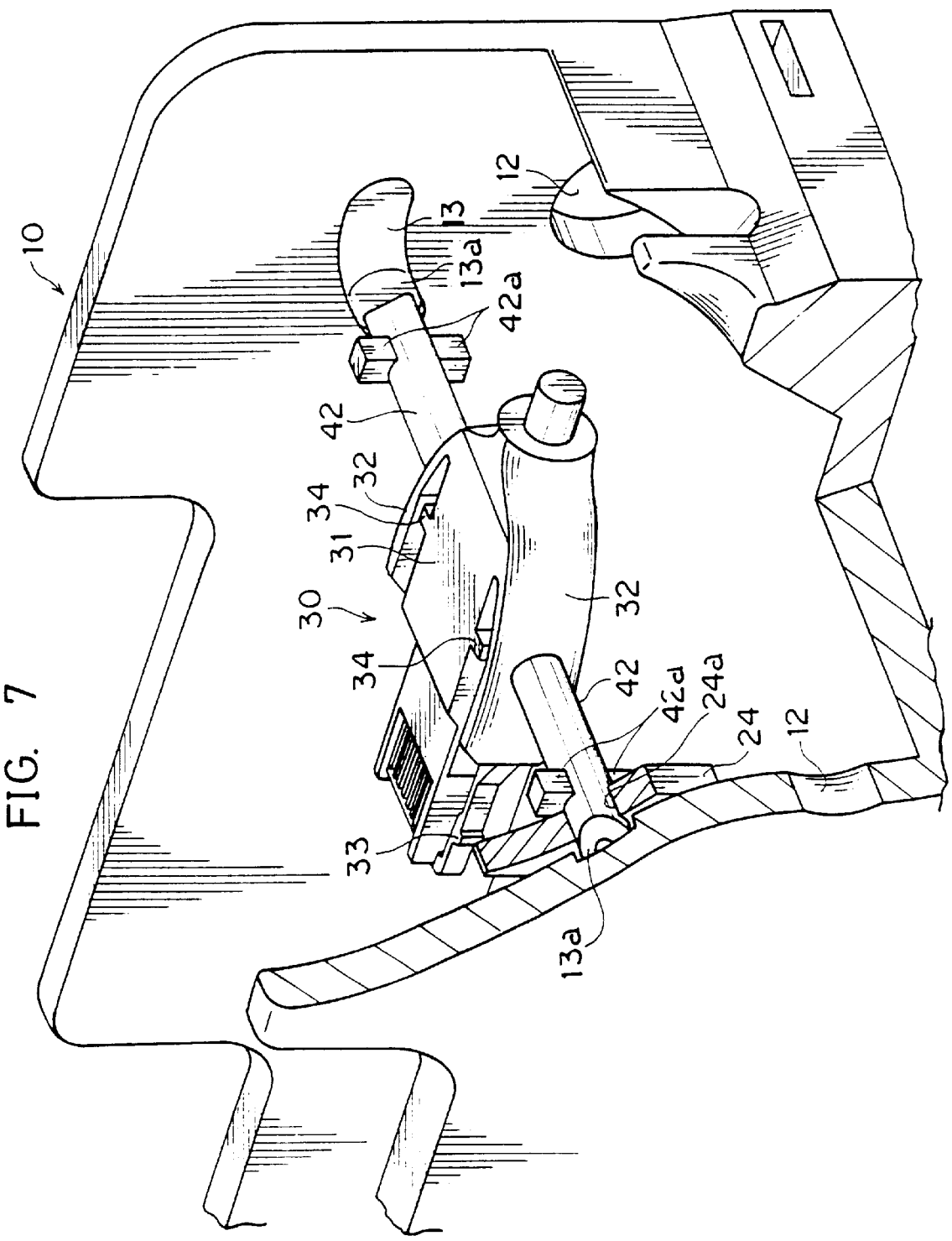
FIG. 7 is a partially cutaway perspective view showing the holder connector and an operated shaft for operating an operable member.
Figure 9:
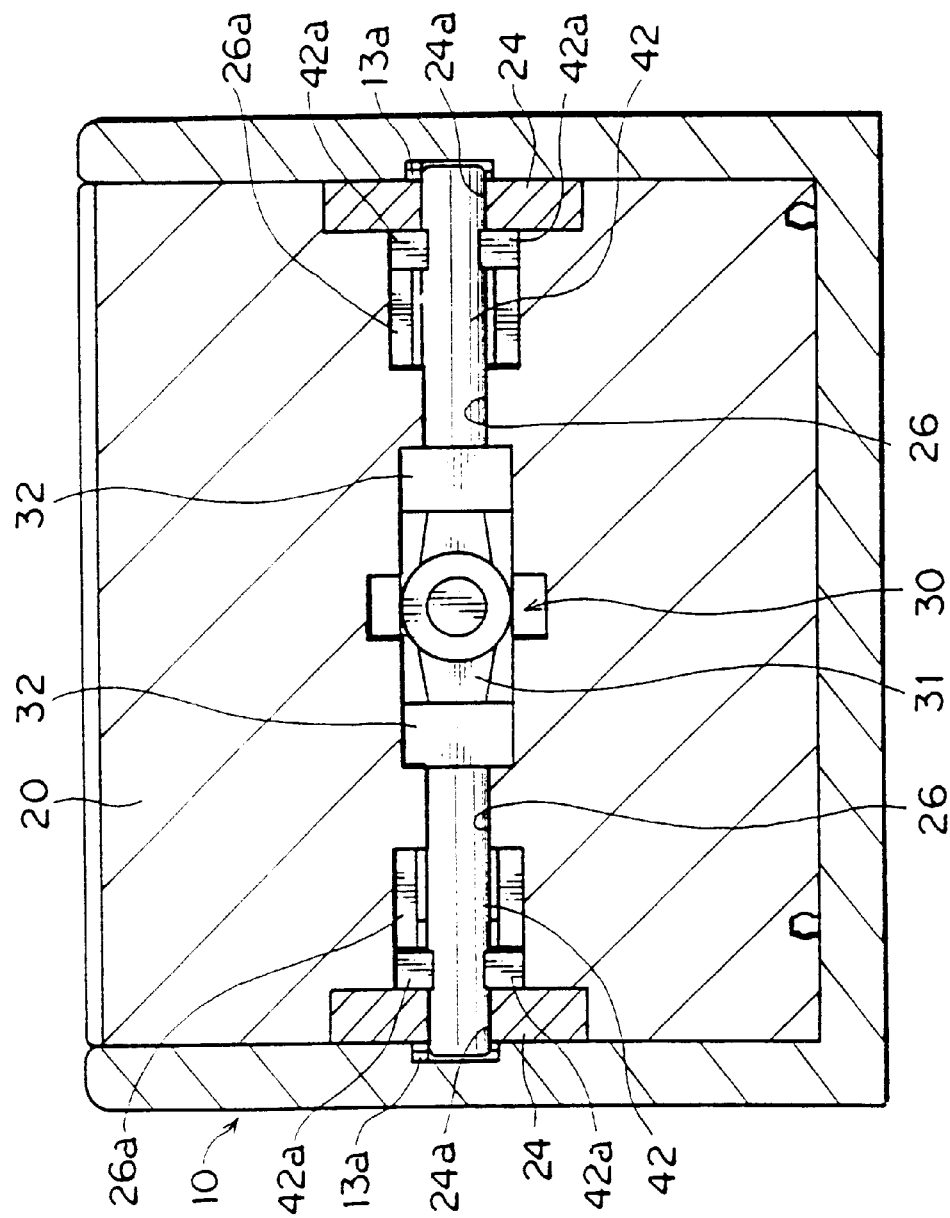
FIG. 9 is a cross sectional rear view showing a state that the operable member of the holder connector is not applied with an external force when the movable casing is set at the housed position.

More specifically, the shape and the depth (dimension in the widthwise direction of the mobile phone T) of the groove 13 are set as follows. When the movable casing 20 is set at the housed position, as shown in FIGS. 7 to 9, the outer ends of the operated shafts 42 are fitted in the deepmost recesses 13a while applied with a restoring force of the operable members 32 (urged laterally outward), thereby engaging the locking members 33 of the holder connector 30 in the recesses Ch of the mobile phone T (i.e., setting the locking members 33 at a lock position).

Figure 10:
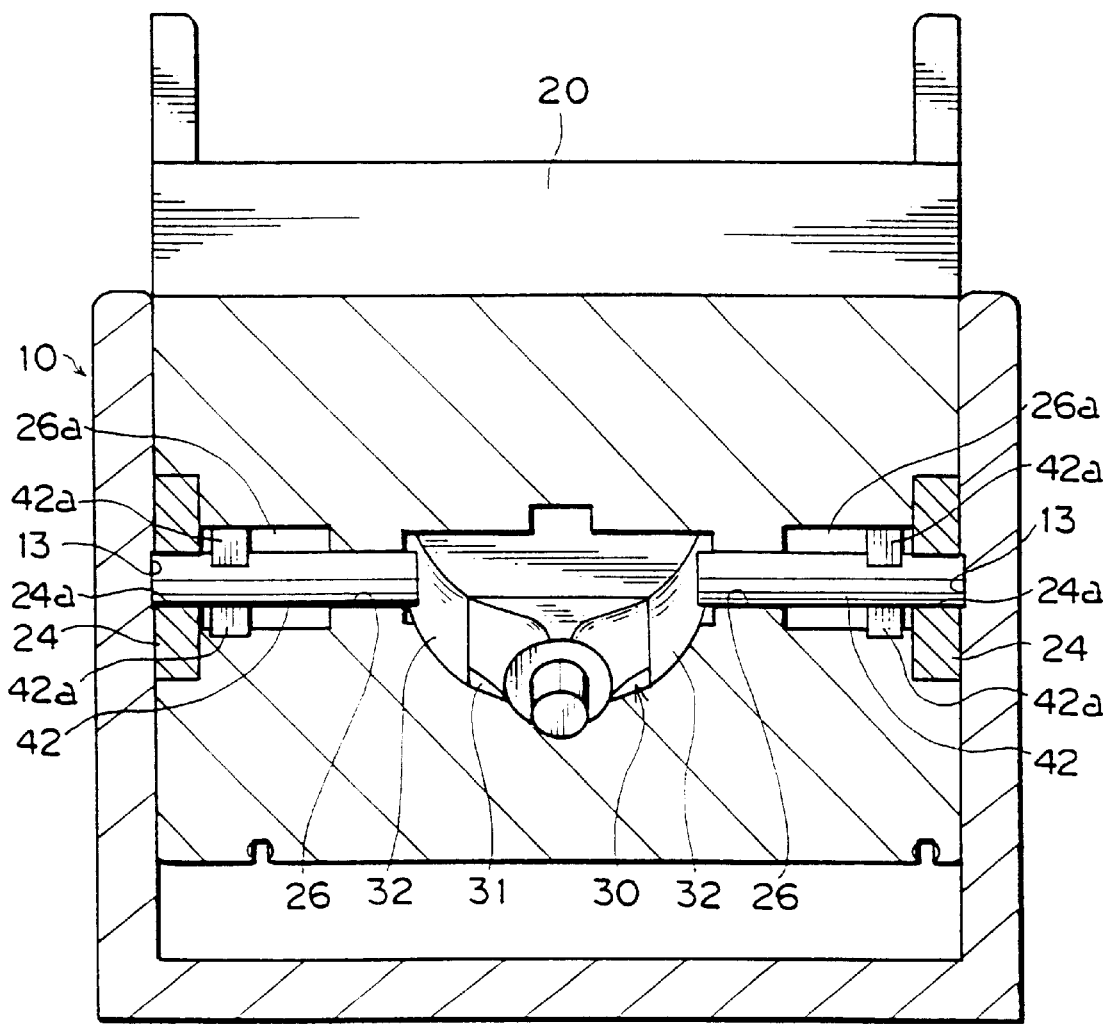
FIG. 10 is a cross sectional rear view showing a state that the operable member of the holder connector is depressed by the operated shaft when the movable casing is set at the detachable position.
Figure 11:
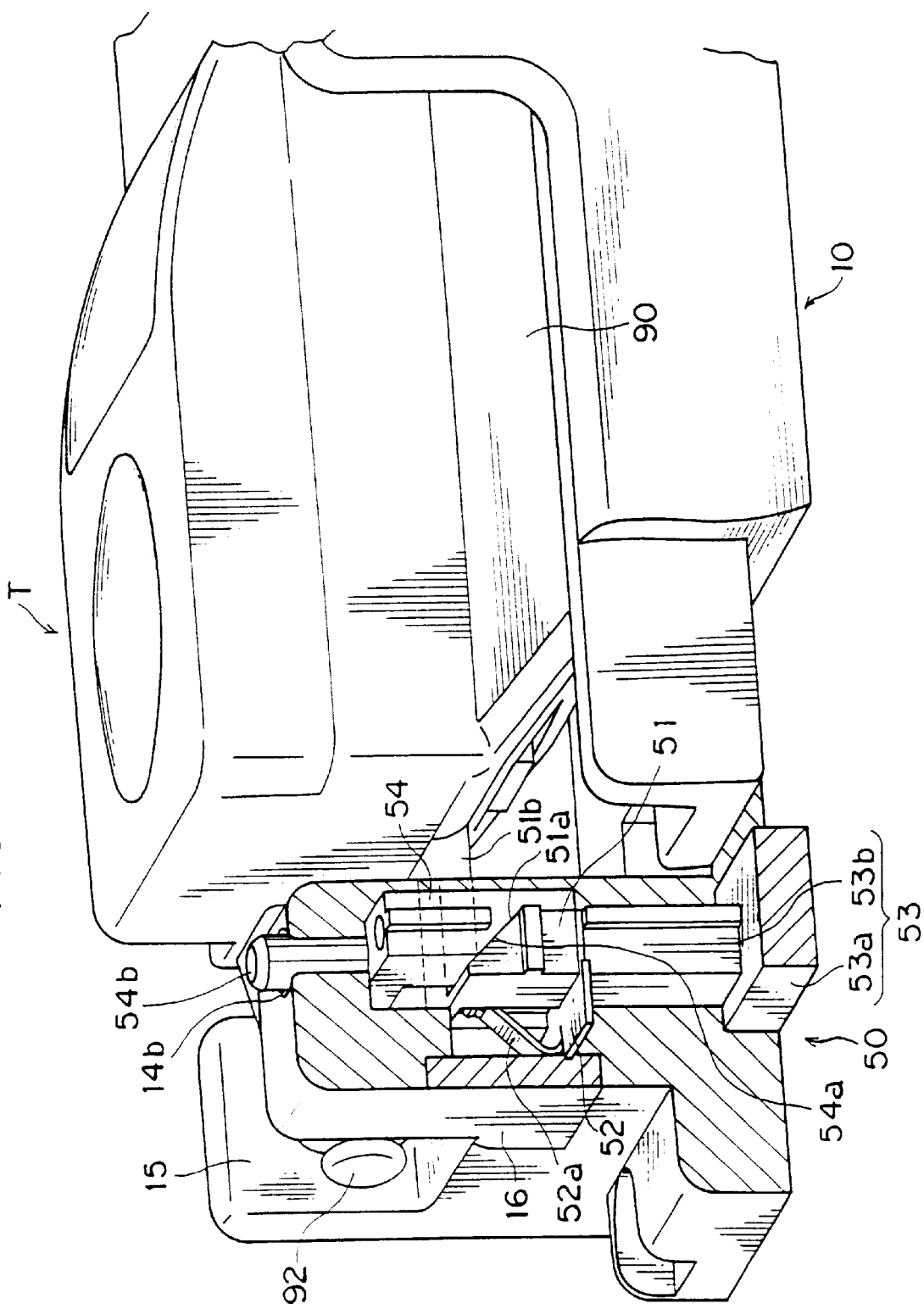
FIG. 11 is a cross sectional perspective view showing a locking mechanism incorporated in the phone holder.

On the other hand, when the movable casing 20 is raised up to be set at the detachable position, as shown in FIG. 10, the operated shafts 42 move out of the deepmost recesses 13a while moving along the shallow portion of the grooves 13 rearward and finally abut against rearmost ends of the grooves 13 to cause the inner ends of the operated shafts 42 to push back the intermediate portions of the operable members 32 laterally inward with a sufficient force, thereby deforming the operable members 32 inward to disengage the locking members 33 from the recesses Ch (setting the locking members 33 at an unlock position).

Reference numeral 25 in FIG. 1 is a lid which covers the rear portion of the holder connector 30.

A locking mechanism 50 for retaining the movable casing 20 at the housed position is provided in a front wall (see FIG. 1) of the fixed casing 10. The locking mechanism 50 comprises, as shown in FIGS. 1, 11, 12A and 12B, a locking member 51, a spring 52, a base block 53, and a operable member 54.

A main body of the locking member 51 is accommodated in a through hollow portion 14a which is formed in the front wall 14 extending in the lengthwise direction of the mobile phone T to be slidable in the through hollow portion 14a in the lengthwise direction of the mobile phone T.

Figure 12A:
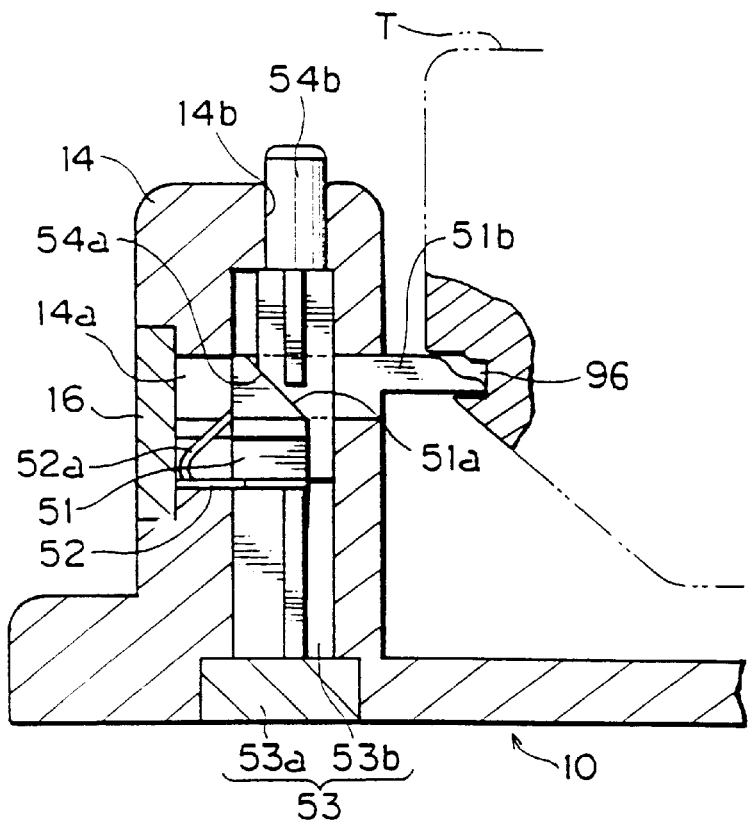
FIG. 12A is a partially cross sectional side view showing a state that the locking mechanism retains the mobile phone at the housed position.
Figure 12B:
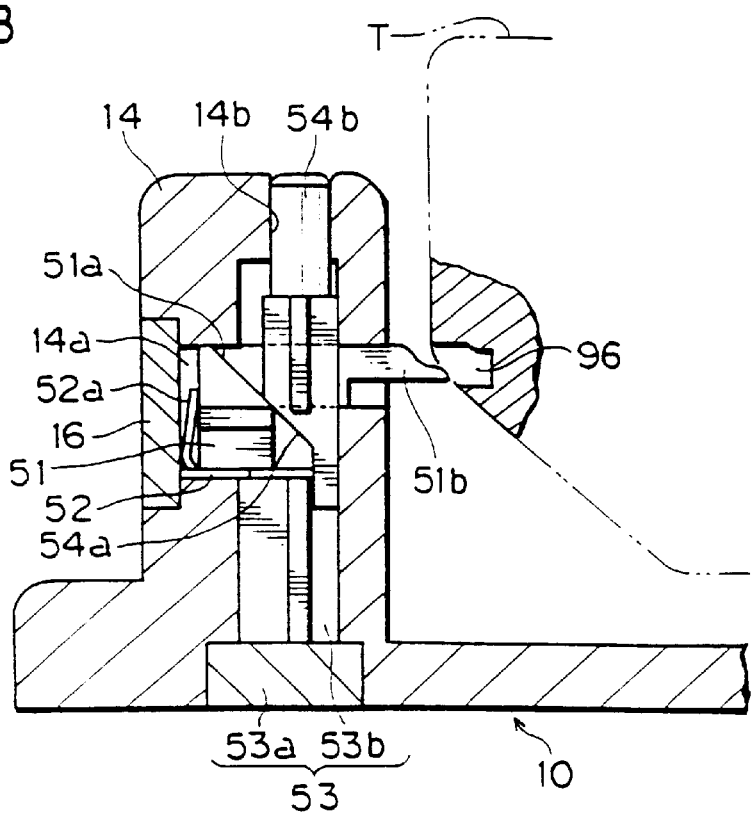
FIG. 12B is a partially cross sectional perspective view showing a state that the locking mechanism releases the locked state of the mobile phone.

Referring to FIGS. 12A and 12B, an upper surface of the main body of the locking member 51 is shaped into a tapered surface 51a slanting downward in the rearward direction. A locking portion 51b extends rearward from the main body of the locking member 51. Fitting of a rear end of the locking portion 51b in a recess 96 (see FIGS. 12A and 12B) formed in a front end of the mobile phone T sets the mobile phone T at a lock position (see FIG. 12A).

The spring 62 is a thin metal plate, and has a bent shape including a horizontal portion (main portion) and a bent portion 52a which stands up from the main portion. The main portion of the spring 52 is fixed on a top surface of lower part of the front wall 14 which is formed by defining the through hollow 14a. Abutment of a lead end of the bent portion 52a against the locking member 51 sets the locking member 51 in a biased state urged rearward due to a biasing force of the bent portion 52a.

The base block 53 is integrally formed with a bottom plate 53a and a guide column 53b which stands upright from the bottom plate 53a. The base block 53 is fixed on the fixed casing 10 at such a position as to render a bottom surface of the bottom plate 53a and a bottom surface of the fixed casing 10 substantially flush with each other.

The operable member 54 has a pushing pin 54b and a main body, and is so formed as to set the pushing pin 54b projecting outward from an upper surface of the main body when a pressing force is not applied. The pushing pin 54b is inserted in a through hole 14b which is formed in a vertical direction in the front wall 14. The insertion of the pushing pin 54b in the through hole 14b while supported by the upright guide column 53b sets an entirety of the operable member 54 vertically movable in the following manner.

A lower surface of a main body of the operable member 54 is shaped into a tapered surface 54a slanting downward in the rearward direction of the mobile phone T. The operable member 54 is provided at such a position as to render the tapered surface 54a in contact with the tapered surface 51a of the locking member 51.

Specifically, when the pushing pin 54b is not pressed downward, the operable member 54 is urged rearward away from the locking member 51 due to a biasing force of the bent portion 52a of the spring 52 to retain an engagement of the locking portion 51b in the recess 96 of the mobile phone T (setting the mobile phone T at a lock position) so as to retain the mobile phone T at the housed position (see FIG. 12A).

On the other hand, when the pushing pin 54b is depressed downward with a finger of a person or its equivalent to lower the entirety of the operable member 54 downward, the locking member 51, which is in contact with the operable member 54 at the tapered surfaces 54a, 51a, is moved forward against the biasing force of the bent portion 52a, thereby allowing the locking portion 51b to come out forward from the recess 96 of the mobile phone T (i.e., releasing the engagement of the locking member 51 with the mobile phone T) (see FIG. 12B).

Reference numeral 15 in FIG. 1 is a cutaway which is formed in the front wall 14 to receive an antenna 92 (see FIG. 5) of the mobile phone T when the mobile phone T is set in the fixed casing 20 at the housed position. Reference numeral 16 (see FIG. 1) is a lid to cover the through hollow 14a from the front direction.

Next, an operation of the phone holder of the first embodiment is described.

When the movable casing 20 is not set at a locked position by the locking mechanism 50, the movable casing 20 is set at a detachable position shown in FIG. 3 due to a biasing force of the torsion spring 40. In other words, in this state, the hollow portion (phone insertion space) 21 is set opened upward and in the front direction.

When the movable casing 20 is set at the detachable position, the outer ends of the operated shafts 42 are abutted against the shallow rearmost end of the recess 13 opposite to the deepmost recess 13a. Thereby, the inner ends of the operated shafts 42 press the operable members 32 inward to deform the operable members 32 inward, and accordingly, the engaging pieces 33 are set at the unlock position shown by the broken line in FIG. 6.

When the mobile phone T is inserted in the hollow portion 21 from the front direction in this state, connection of the phone connector TC with the holder connector 30 in the phone insertion direction is facilitated.

After the connection, pushing the mobile phone T from above with a small force to set the movable casing 20 at the housed position (position to accommodate the movable casing 20 in the movable casing accommodating space 11 of the fixed casing 10) against the biasing force of the torsion spring 40 temporarily and slightly shifts the locking portion 51b of the locking mechanism 50 forward due to a pressing contact with the front end of the mobile phone T.

Thereafter, when the movable casing 20 (and the mobile phone T) is securely accommodated in the fixed casing 10 at the housed position, the locking portion 51b is returned to an engaged state (i.e., moved rearward) in the recess 96 of the mobile phone T. Thereby, the movable casing 20 and the mobile phone T are locked at the housed position against the biasing force of the torsion spring 40.

When the movable casing 20 is set at the housed position, the outer ends of the operated shafts 42 are fled in the deepmost recess 13a of the groove 13 to set the operable members 32 in a released state (urged outward), and the engaging pieces (locking members) 33 are fitted in the recesses Ch of the phone connector TC to set the operable members 32 at the lock position. Thereby, the connected state of the holder connector 30 with the phone connector TC is secured at the lock position.

Next, an operation of switching the movable casing 20 from the housed position to the detachable position is described. Referring to FIGS. 12A and 12B, pressing the pushing pin 54b downward lowers the operable member 54 downward and moves the locking member 51 forward to release the locked state of the locking portion 51b in the recess 96 of the mobile phone T (see FIG. 12B). Thereby, the movable casing 20 springs up to the detachable position by the biasing force of the torsion spring 40.

Accompanied with the spring-up of the movable casing 20 (pivot of the movable casing 20 about the pivot shaft 22), the operated shafts 42 push the operable members 32 of the holder connector 30 inward while guided rearward along the grooves 13 of the fixed casing 10 from the deepmost recesses 13a to the shallow portion of the grooves 13. In accordance with the inward pressing of the operable members 32, the locking members 33 are disengaged from the recesses Ch of the mobile phone T. In this way, when the locking members 33 are returned to the unlock position, the mobile phone T is ejectable from the hollow portion 21 of the movable casing 20.

As mentioned above, the phone holder of this embodiment is constructed such that the movable casing 20 is settable between the housed position and the detachable position.

Figure 45:
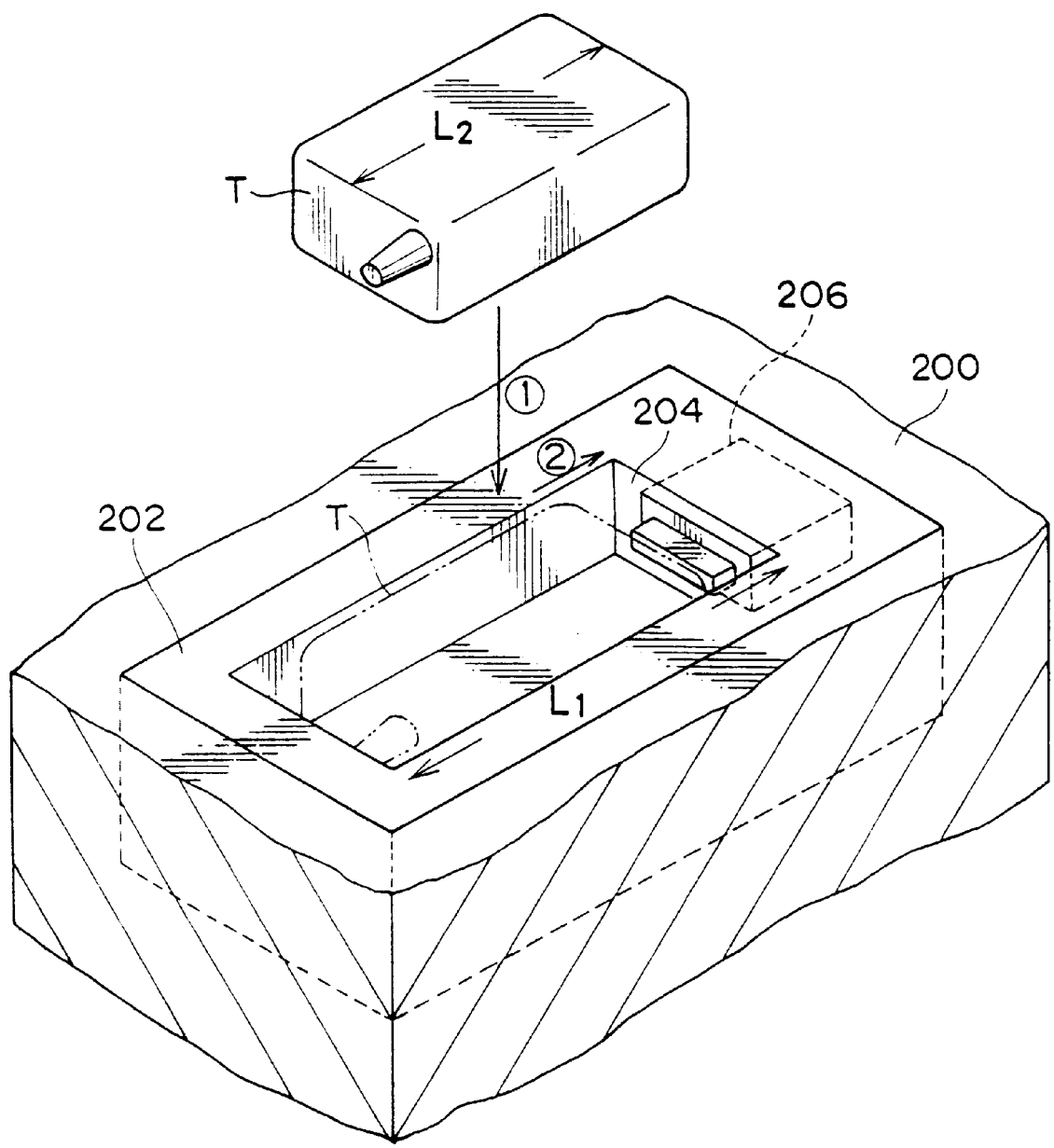
FIG. 45 is a partially cross sectional perspective view of a phone holder of prior art showing a manner of inserting a mobile phone in a hollow portion of the phone holder.

Accordingly, compared to the prior art phone holder shown in FIG. 45 in which the phone insertion direction (direction of arrow ①) and the connecting direction (direction of arrow ②) differ, the phone holder of this embodiment can be reduced in size to reduce an installation space for the phone holder as much as possible because the entire length of the phone insertion space 21 can be set at substantially the same length as the entire length of the mobile phone T (i.e. at a minimum size to accommodate the mobile phone T).

In particular, in this embodiment, the movable casing 20 comprises the torsion spring (biasing member) 40 to set the movable casing 20 at the detachable position, and the locking mechanism 50 to set the movable casing 20 at the housed position against the biasing force of the torsion spring 40 and release the locked state. Accordingly, merely pressing the pushing pin 54b of the locking mechanism 50 automatically releases the engaged state of the movable casing 20 and sets the movable casing 20 at the detachable position, thereby facilitating ejection of the mobile phone T from the movable casing 20.

In this embodiment, the operated shafts (movable members) 42 automatically switches the holder connector 30 between the lock position and the unlock position in association with a rotation of the movable casing 20. Accordingly, an additional operation of a user to switch the holder connector 30 between the lock position and the unlock position can be omitted, thereby rendering the phone holder user-friendly.

In the first embodiment, the movable casing 20 is pivotable about the axis of the pivot shaft 22, and the holder connector 30 is arranged near the axis of the pivot shaft 22. With this arrangement, an operation to connect the mobile phone T with the holder connector 30 while inserting the mobile phone T in the movable casing 20 is feasible, thereby enhancing the operability of the phone holder.

[Second Embodiment]

Next, a second embodiment of the phone holder according to this invention is described with reference to FIGS. 14 to 20. It should be noted that elements of the second embodiment identical to those in the first embodiment are denoted at the same reference numerals.

The phone holder comprises a fixed casing 10, a movable casing 20, and a holder connector 30.

The construction of the fixed casing 10 of the second embodiment is basically the same as the first embodiment except the following. In the second embodiment, a rear portion of each of opposite side walls of the fixed casing 10 is formed with a substantially U-shaped cutaway 12', in place of the through hole 12 in the first embodiment. A bottom portion of the cutaway 12' is shaped into a semicircle. The cutaway 12' extends from a bottom portion of the fixed casing 10 upward to an upper end thereof, and is opened upward.

In this embodiment, the movable casing 20 includes a main body 20A and a cover 20B. The main body 20A is formed with a hollow portion (phone insertion space) 21 equivalent to the hollow portion 21 of the first embodiment. The cover 20B is mounted at such a position as to cover a rear portion of the hollow portion 21 (a rear portion of the main body 20A) from above.

A pivot shaft 22' is integrally formed with the movable casing 20 at a rear portion on a lower side thereof. The pivot shaft 22' has such a length as to project outward from opposite ends of the movable casing 20 in the width thereof. When the pivot shaft 22' is fitted in a bottommost end of the cutaway 12' (see FIG. 15), the movable casing 20 is pivotally supported on the fixed casing 10 about an axis of the pivot shaft 22'. A torsion spring (biasing member) 40 is wound around the pivot shaft 22' which applies a biasing force to the movable casing 20 to raise the movable casing 20 upward (rotate the movable casing 20 in a clockwise direction of FIG. 16).

Figure 16:
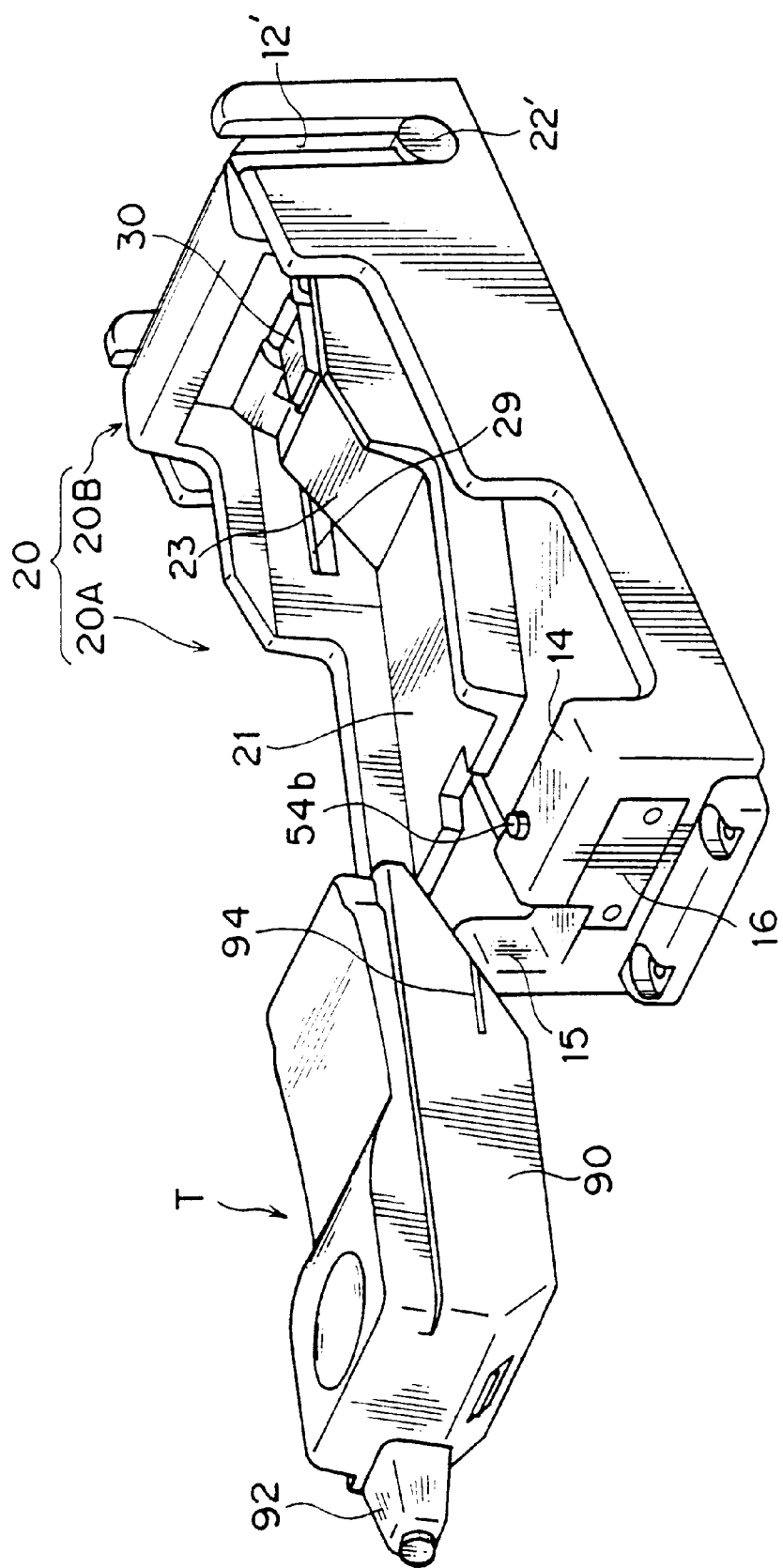
FIG. 16 is a perspective view showing a state that a mobile phone is about to be inserted in the movable casing at a detachable position in the second embodiment.
Figure 17:
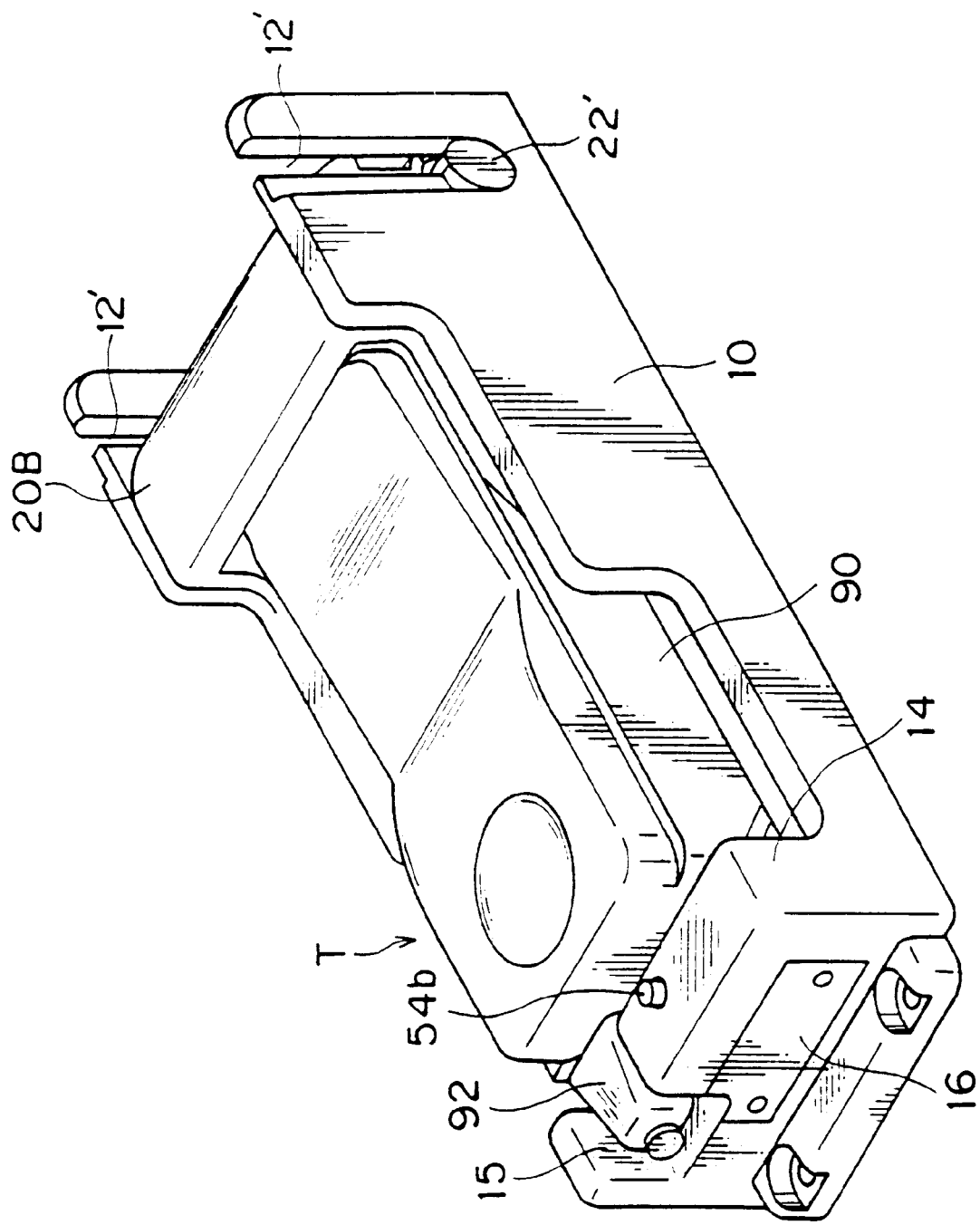
FIG. 17 is a perspective view showing a state that the mobile phone and the movable casing are accommodated in the fixed casing at a housed position in the second embodiment.
Figure 18:
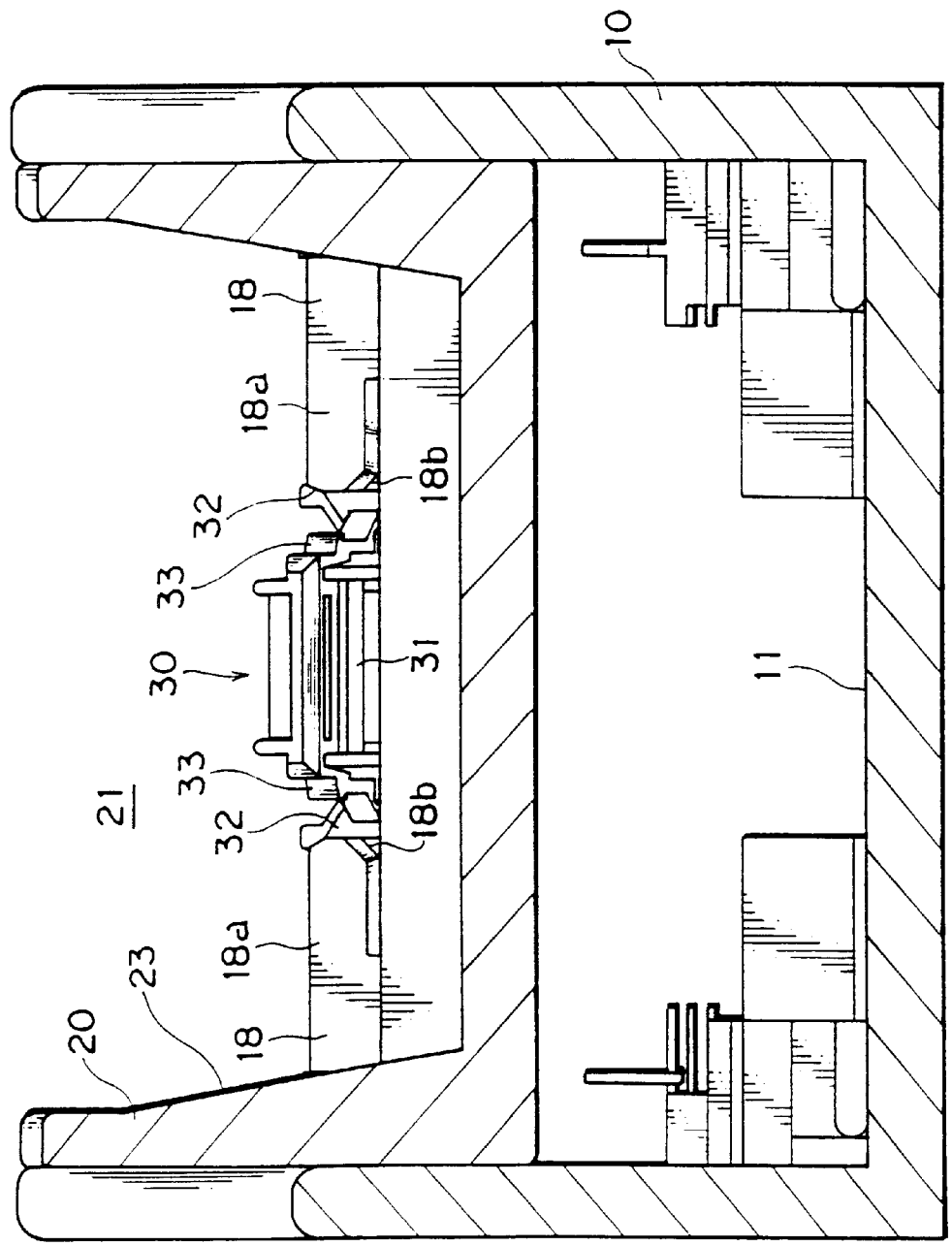
FIG. 18 is a cross sectional front view showing a state that the movable casing is set at the detachable position in the second embodiment.
Figure 19:
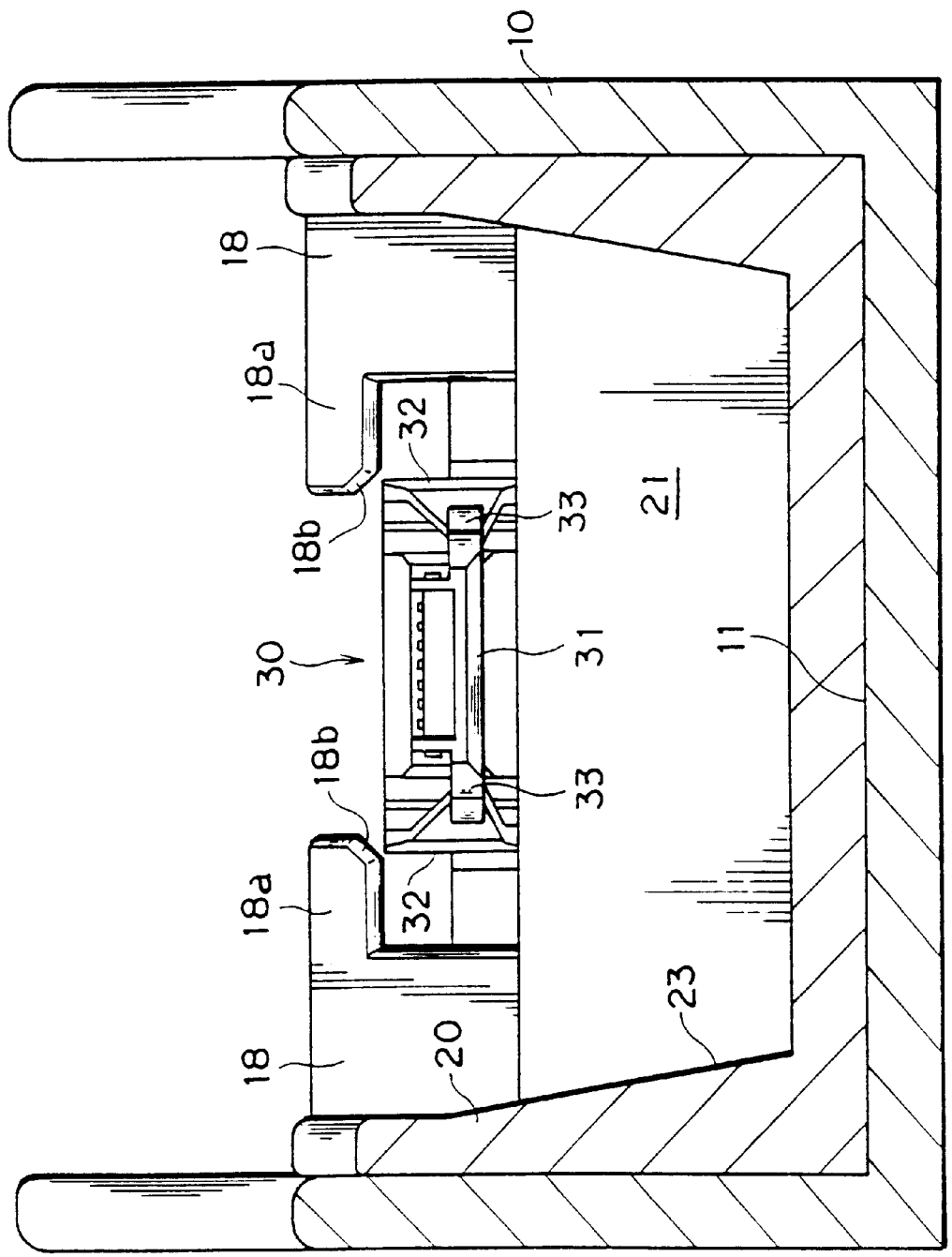
FIG. 19 is a cross sectional front view showing a state that the movable casing is set at the housed position.

Similar to the first embodiment, the movable casing 20 of the second embodiment is pivotally supported on the fixed casing 10 and is settable between a housed position (position of FIG. 17) and a detachable position (position of FIG. 16). The torsion spring 40 applies a biasing force to the movable casing 20 to set the movable casing 20 at the detachable position.

Similar to the first embodiment (see FIG. 13), a battery casing 90 (see FIG. 16) is mounted on a bottom plane of the mobile phone T in the second embodiment. Accordingly, the bottom plane of the mobile phone T corresponding to the battery casing 90 is bulged downward and tapered in the width direction as directed downward. A recess 23 to fit the projected battery casing 90 of the mobile phone T is formed in a bottom wall of the movable casing 20.

The construction of the recess 23 and the battery casing 90 which is engaged in the recess 23 is the same as the first embodiment, and accordingly, a description thereof is omitted herein.

Similar to the first embodiment, a phone connector TC is provided at a rear end of the mobile phone T.

The construction of the holder connector 30 of the second embodiment is the same as the first embodiment (see FIG. 6). Since the construction of the holder connector 30 is not described in detail in the first embodiment, the construction thereof is described in detail here in the second embodiment.

Figure 20:
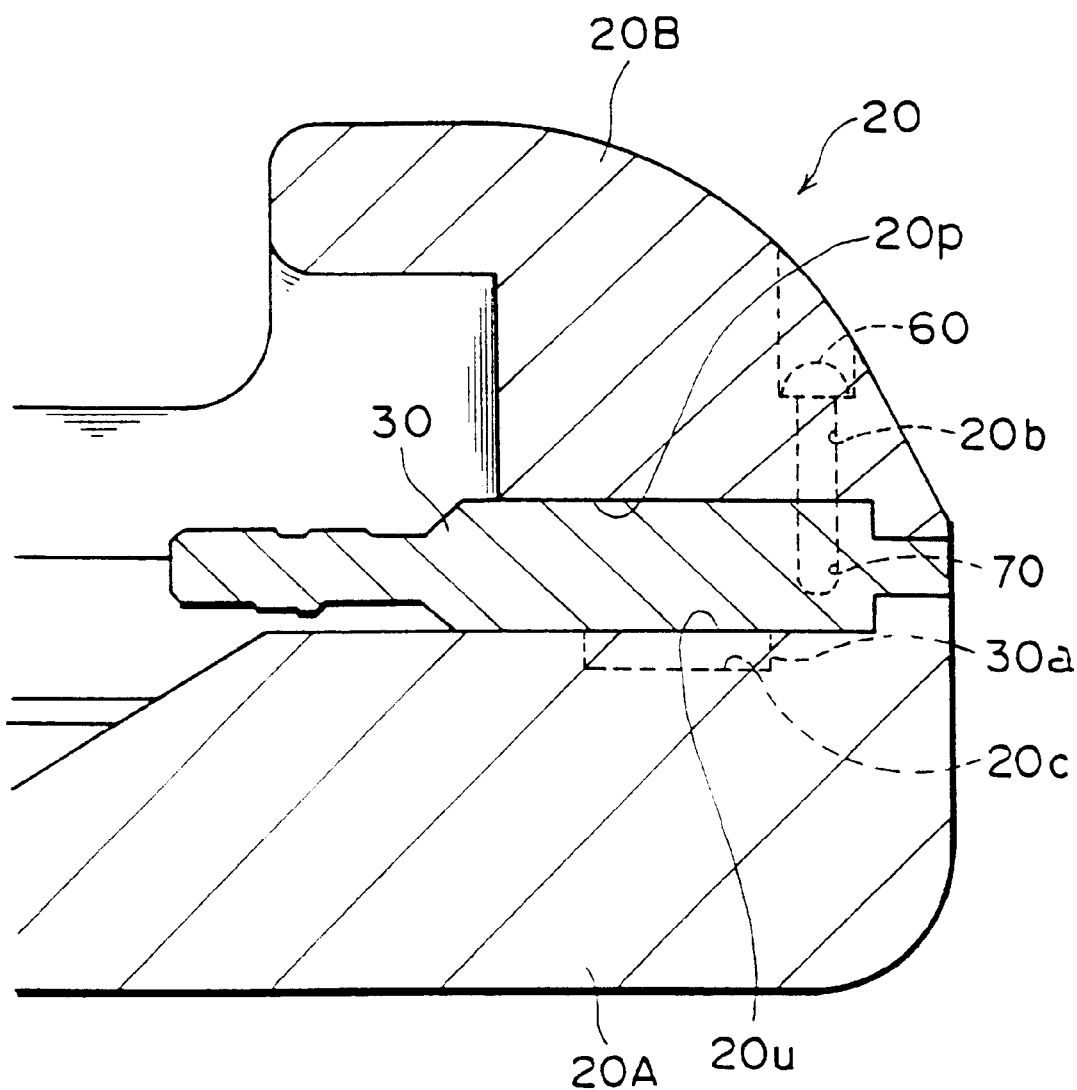
FIG. 20 is a cross sectional side view showing a state that a holder connector is mounted on the movable casing in the second embodiment.
Figure 21:
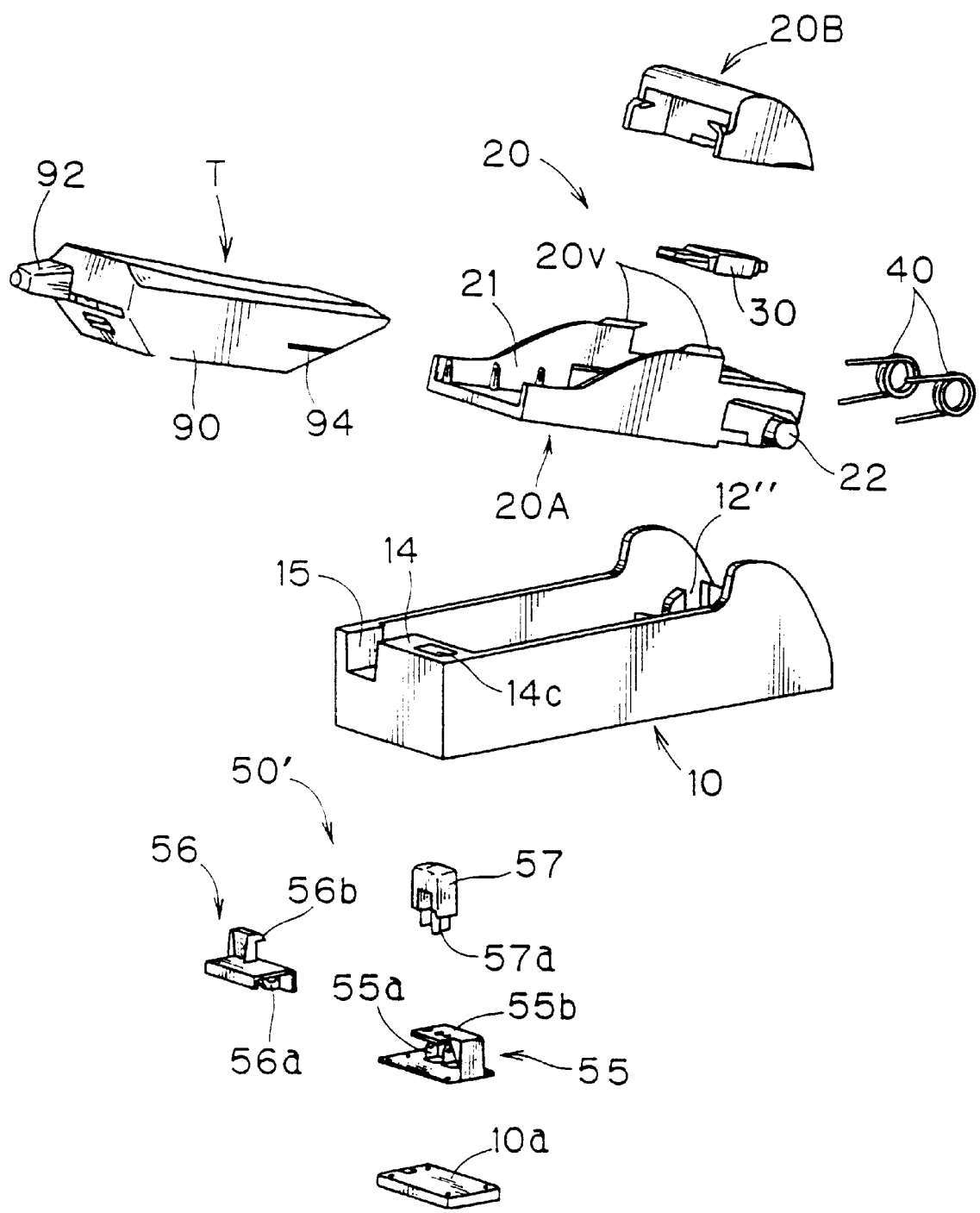
FIG. 21 is an exploded perspective view of a phone holder as a third embodiment according to this invention.
Figure 22:
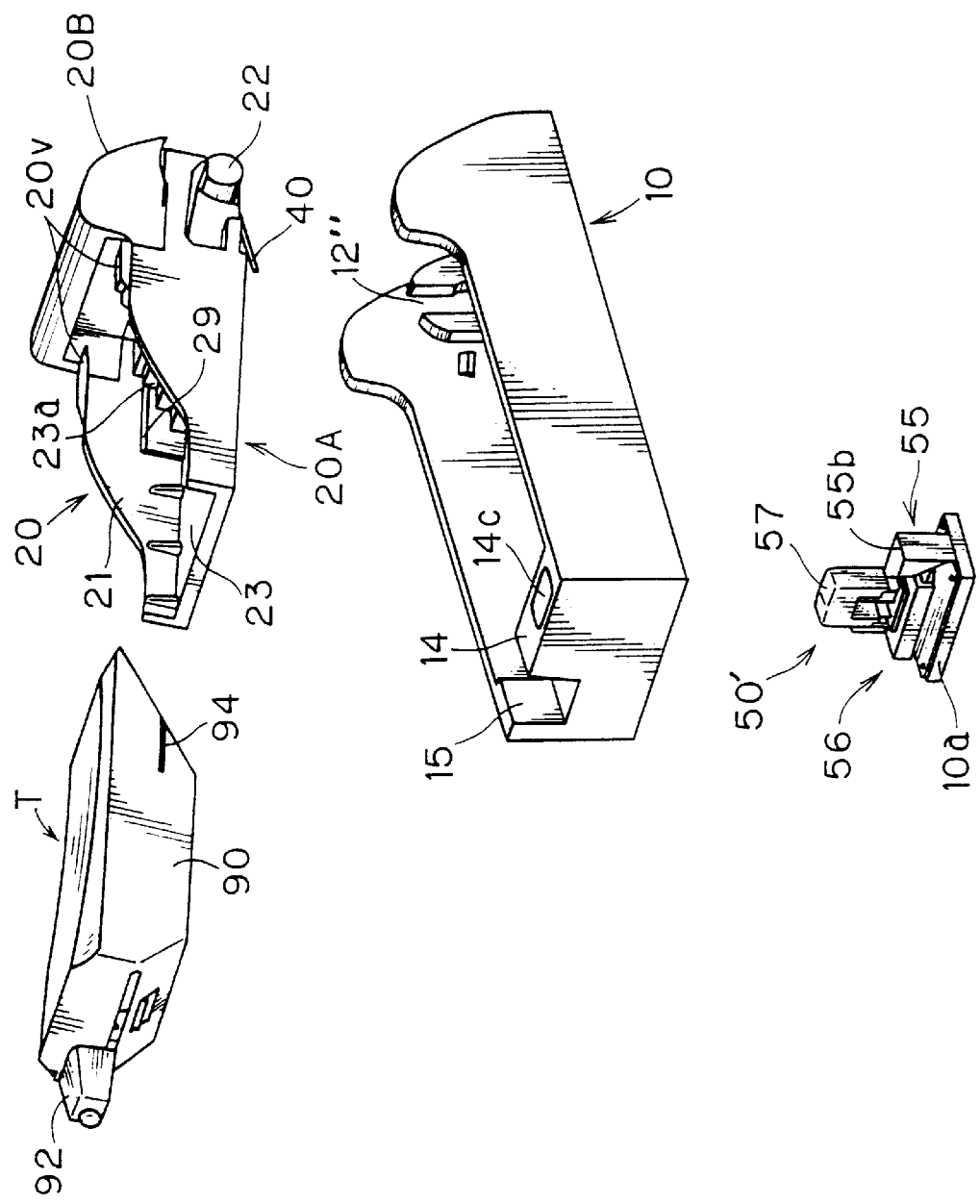
FIG. 22 is a perspective view showing a state before a movable casing is mounted on a fixed casing in the third embodiment.
Figure 23:
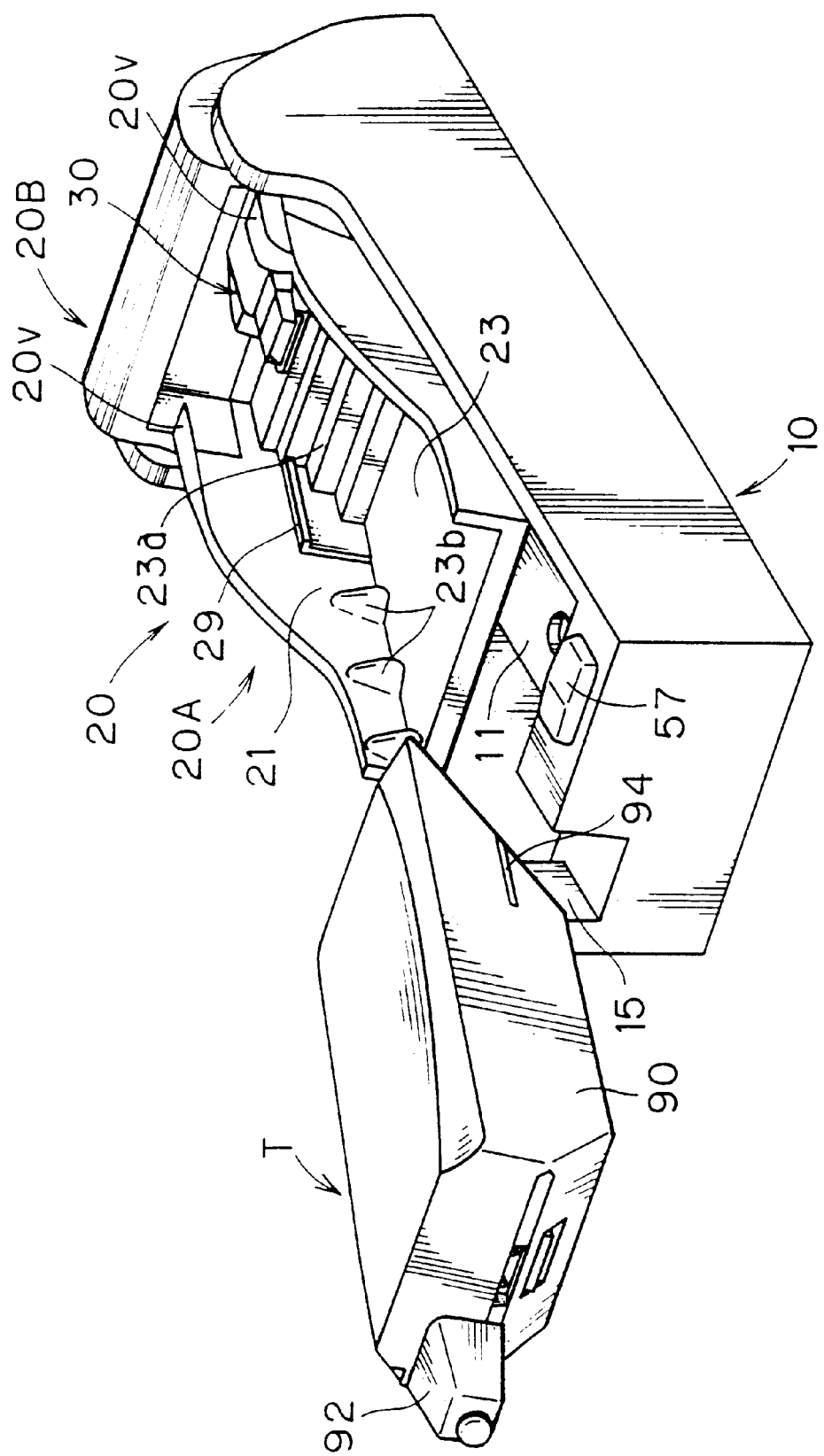
FIG. 23 is a perspective view showing a state that a mobile phone is about to be inserted in the movable casing at a detachable position in the third embodiment.

An engagement of the holder connector 30 with the movable casing 20 is described referring to FIG. 20. A bottom wall of a rear portion of the main body 20A is formed with a lower recess 20u which engages with a lower portion of the holder connector 30. A top wall of the cover 20B is formed with an upper recess 20p which engages with an upper portion of the holder connector 30.

Figure 14:
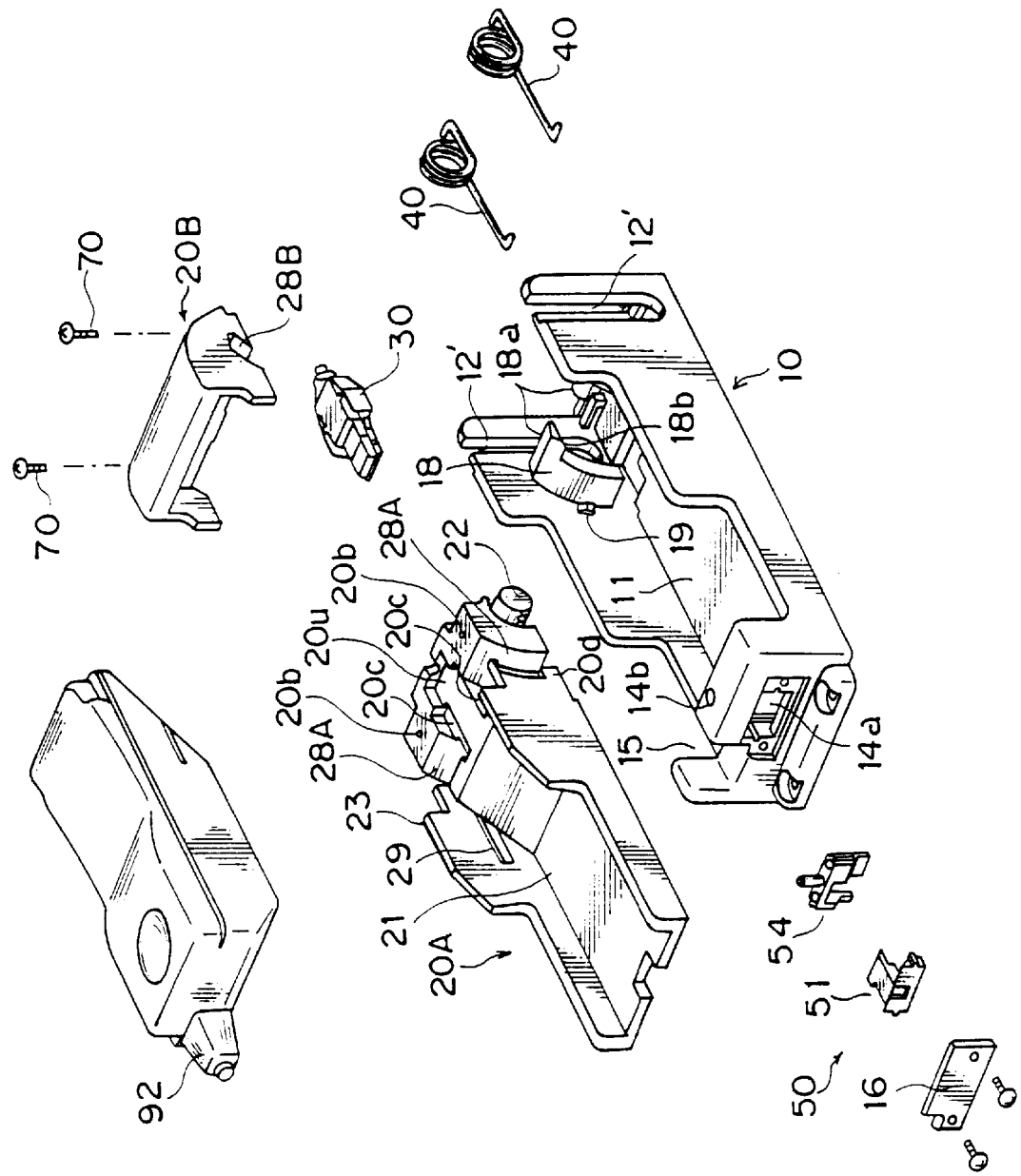
FIG. 14 is an exploded perspective view of a phone holder as a second embodiment according to this invention.

Referring to FIG. 14, after the holder connector 30 is fitted in the rear portion of the movable casing 20 via the engagement with the upper recess 20p and the lower recess 20u, bolts 70 are inserted in bolt insertion holes 20b which are formed in the cover 20B. The bolt insertion hole 20b is opened upward. Screwing the bolts 70 in the bolt insertion holes 20b fixedly mounts the cover 20B on the main body 20A of the movable casing 20.

Referring back to FIG. 20, a projection 30a projecting downward is formed in the bottom portion of the holder connector 30, and an engaging recess 20c which has a greater depth than the lower recess 20u is formed in the bottom wall of the main body 20A. Fitting the projection 30a in the engaging recess 20c restricts a movement of the holder connector 30 relative to the movable casing 20 in the length direction of the mobile phone T (fore and aft directions). Fixation of the cover 20B on the main body 20A secures the fitted state of the projection 30a in the engaging recess 20c.

Referring back to FIG. 14, a recess 28A is formed in opposite sides of the rear portion of the main body 20A, and a recess 28B is formed in opposite side walls of the cover 20B. The recesses 28A, 28B constitute a recess (hollow portion) 28 when the cover 20B is jointed on the main body 20A. A operable member 32 (see FIG. 18) of the holder connector 30 opposes to part of the recess 28 (specifically to a boundary between the recesses 28A and 28B).

Referring back to FIG. 14, a projection 20d projecting rearward is formed at a lower end of opposite side walls of the movable casing 20 near the recess 28A. A stopper 19 is provided at an appropriate position on an inner side of opposite side walls of the fixed casing 10. Abutment of the projections 20d with the stoppers 19 determines an uppermost opened state of the movable casing 20 (i.e., the detachable position of the movable casing 20).

Figure 15:
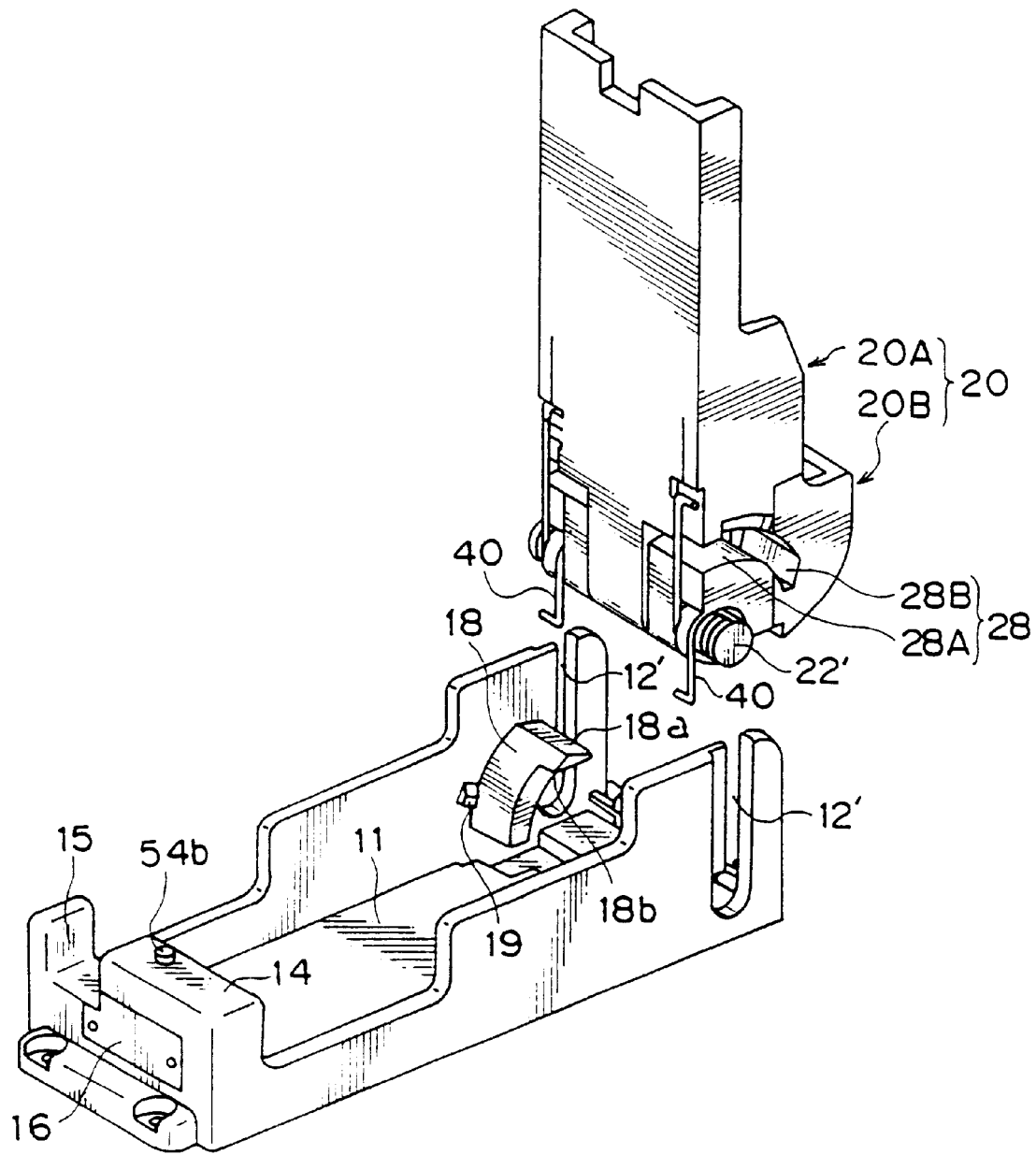
FIG. 15 is a perspective view of the second phone holder before a movable casing is mounted on a fixed casing.

Referring to FIGS. 14 and 15, a projection 18 projecting inward from the inner side of the opposite side walls of the fixed casing 10 is integrally formed with the fixed casing 10 at the rear portion thereof. Each of the projections 18 has such a shape as to be fittable in the recess 28 of the movable casing 20.

A connector operator 18a which projects further inward from the remaining portion of the projection 18 is formed at an upper end of the projection 18. The position and a projected amount of the connector operator 18a are so set as to fulfill the following requirements.

When the movable casing 20 is set to the detachable position of FIG. 16, the connector operator 18a (see FIG. 18) presses the operable member 32 of the holder connector 30 inward to set the holder connector 30 at an unlock position. On the other hand, when the movable casing 20 is set to the housed position of FIG. 17, the operable members 32 are released from an inwardly biased state by the connector operators 18a (see FIG. 19) to set the holder connector 30 at a lock position.

A lower surface of the connector operator 18a is shaped into a tapered surface 18b to smoothly guide the operable member 32 from the unlock position to the lock position while the movable casing 20 being changed from the detachable position to the housed position.

A locking mechanism 50 is provided in a front wall 14 of the fixed casing 10 to retain the movable casing 20 at the housed position, similar to the first embodiment. A specific arrangement of the locking mechanism 50 of the second embodiment is the same as the first embodiment (see FIGS. 11, 12A, 12B) and accordingly is omitted herein.

Next, an operation of the second phone holder is described.

Similar to the first embodiment, when the movable casing 20 is not set at the lock position by the locking mechanism 50, the movable casing 20 is set at the detachable position of FIG. 16 due to a biasing force of the torsion spring 40, i.e., rendering the hollow portion 21 accessible from upward and in the front direction. In this state, the connector operators 18a press the operable members 32 of the holder connector 30 inward to deform the operable members 32 inward. Thereby, engaging pieces 33 (see FIG. 6 and FIG. 18) are retained at the unlock position shown by the broken line of FIG. 6.

When the movable casing 20 is set at the detachable position, the mobile phone T can be accessible to the hollow portion 21 from the front direction to render the phone connector TC connectable with the holder connector 30 in the phone insertion direction.

After the connection, lightly pushing the mobile phone T downward sets the movable casing 20 to the housed position against a biasing force of the torsion spring 40. Similar to the first embodiment, the locking mechanism 50 sets the movable casing 20 along with the mobile phone T at the housed position against the biasing force of the torsion spring 40.

When the movable casing 20 is set at the housed position, the connector operators 18a release pressing of the operable members 32, which in turn, engage the locking members 33 in recesses Ch of the phone connector TC, thereby setting the locking members 33 at the lock position due to a restoring force of the operable members 32. Thus, the connected state of the holder connector 30 with the phone connector TC is automatically locked.

Subsequently, when a pushing pin 54b is depressed, the locking mechanism 50 releases the locked state of the movable casing 20 (see FIG. 12B). Then, the movable casing 20 springs up to the detachable position due to the biasing force of the torsion spring 40. Accompanied with the spring-up of the movable casing 20, the operable members 32 of the holder connector 30 are pushed inward by the connector operators 18a. Thereby, the engaging pieces 33 are automatically returned to the unlock position. In this state, the mobile phone T is detachable from the hollow portion 21 of the movable casing 20.

The second phone holder has advantages similar to the first phone holder, and further has the following effects.

(a) The connector operators 18a, which directly press the operable members 32 of the holder connector 30, are integral with the fixed casing 10. Accordingly, the second phone holder can reduce the number of parts, and the construction thereof can be simplified.

(b) The pivot shaft 22' which supports the fixed casing 10 is integral with the movable casing 20. Accordingly, compared to the case where the movable casing 20 and the pivot shaft 22 are individually produced, this phone holder can further reduce the number of parts.

Further, the cutaway 12' opened upward is formed in the fixed casing 10 to insert the pivot shaft 22' from above. Accordingly, this phone holder can easily assemble the movable casing 20 on the fixed casing 10. The assembling procedure is described as follows.

First, as shown in FIG. 15, the torsion spring 40 is wound around the pivot shaft 22' which is integrally formed with the main body 20A of the movable casing 20 before the assembly. The pivot shaft 22' is inserted in the cutaway 12' in a state that the main body 20A stands upright. Then, after the pivot 22' abutting against the bottom end of the cutaway 12', the main body 20A is laid down in a horizontal posture in a hollow portion 11 of the fixed casing 10 to render the projections 20d mounting over the stoppers 19 of the fixed casing 10. After setting the movable casing 20 at the housed position in the fixed casing 10, the holder connector 30 is mounted in the main body 20A. At the last stage, the cover 20B is mounted on the main body 20A.

(c) Since the movable casing 20 is divided into two parts, the main body 20A and the cover 20B, the engagement of the holder connector 30 in the lower recess 20u of the main body 20A is facilitated before the cover 20B is mounted on the main body 20A. Further, mounting the cover 20B on the main body 20A after the engagement secures the placement of the holder connector 30 between the main body 20A and the cover 20B. This secured placement of the holder connector 30 leads to a stable fitting of the projection 30a of the holder connector 30 in the recess 20c of the main body 20A, thereby restricting a forward/rearward movement of the holder connector 30. Accordingly, an additional attachment for restricting the forward/rearward movement of the holder connector 30 can be omitted, and the mounting of the holder connector 30 on the movable casing 20 can be simplified.

Further, restricting a moved amount of the holder connector 30 by the engagement of the projection 30a in the engaging recess 20c facilitates wiring of the holder connector 30.

[Third Embodiment]

Next, a third embodiment of this invention is described with reference to FIGS. 21 to 29. A phone holder of the third embodiment has the following features.

Note that elements of the third embodiment identical to those in the first and the second embodiments are denoted at the same reference numerals.

(1) In the first and the second embodiments where the movable casing 20 has the bottom wall and the side walls, and is accordingly opened upward and in the front direction, the mobile phone T is accessible to the movable casing 20 from the top and as well as from the front. Accordingly, there remains a possibility that the mobile phone T may be inserted obliquely downward toward the holder connector 30 and detached therefrom obliquely upward. The oblique insertion and detachment may damage or break the holder connector 30.

Figure 24:
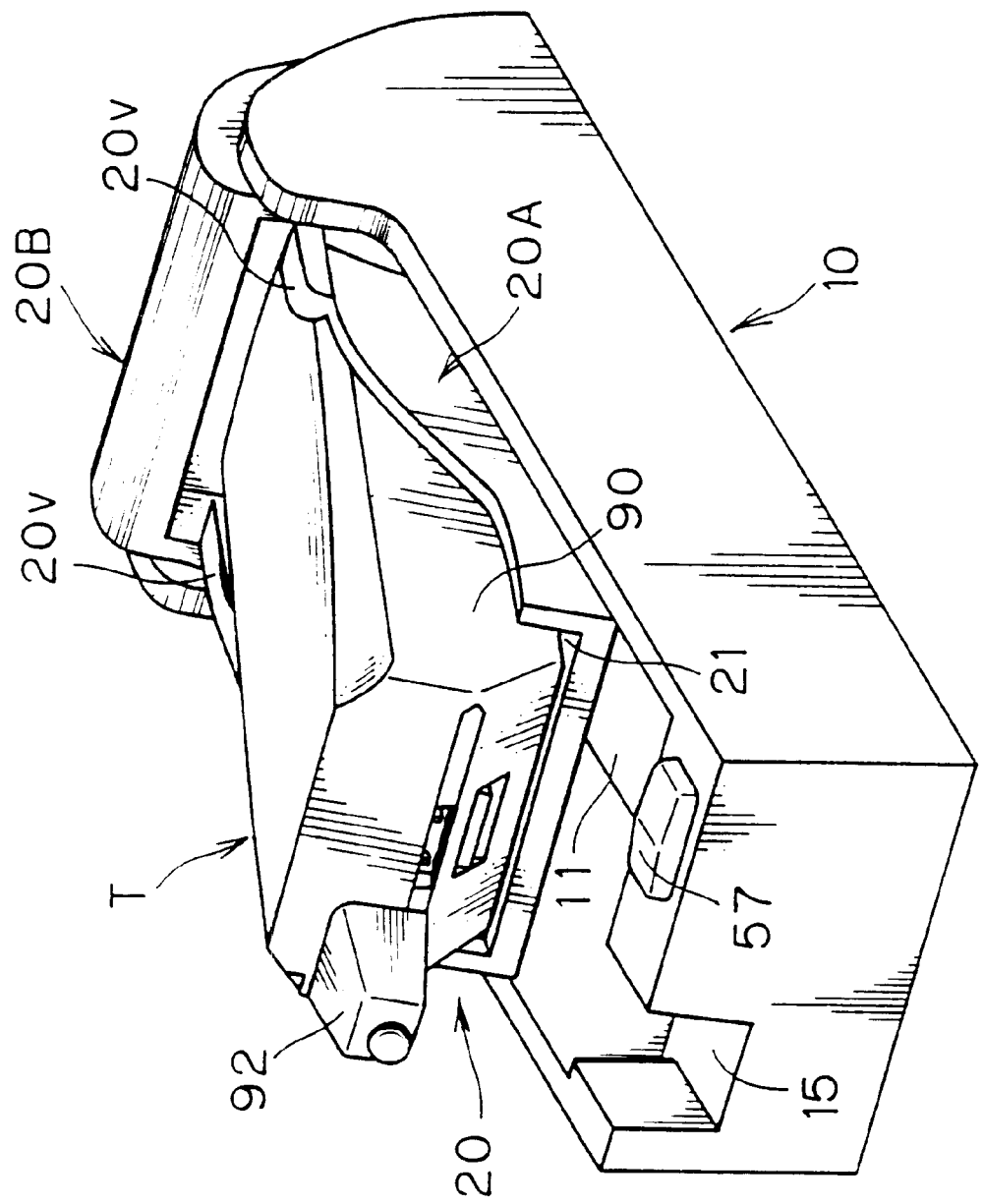
FIG. 24 is a perspective view showing a state that the mobile phone is inserted in the movable casing at the detachable position in the third embodiment.
Figure 25:
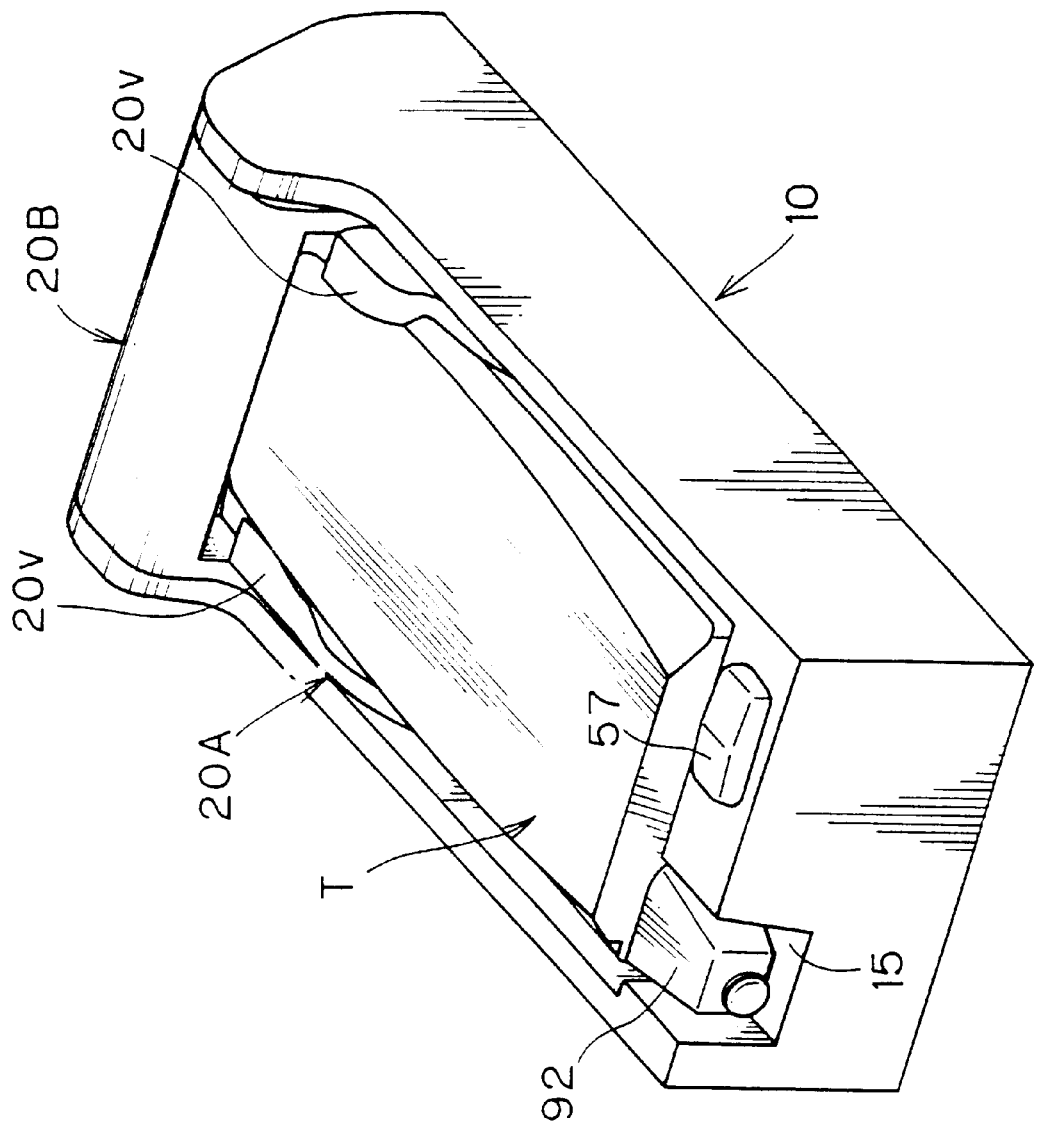
FIG. 25 is a perspective view showing a state that the mobile phone and the movable casing are accommodated in the fixed casing at a housed position.
Figure 26:
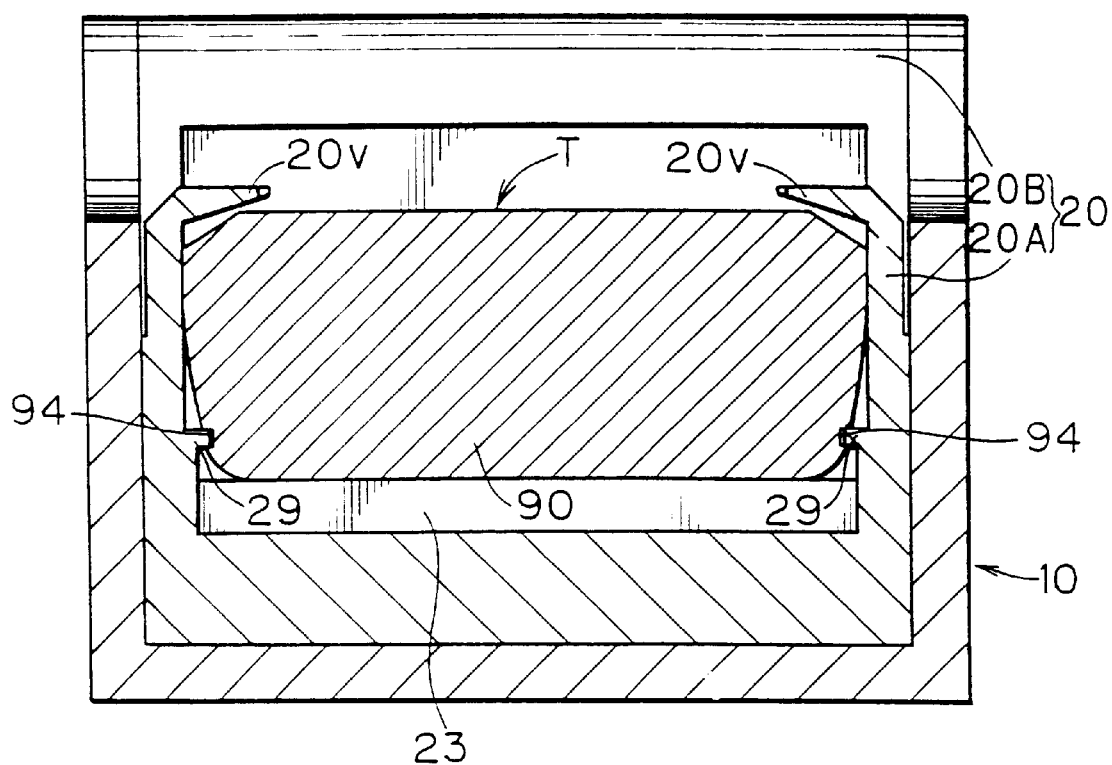
FIG. 26 is a cross sectional front view of the third phone holder in the housed state of FIG. 25.
Figure 27:
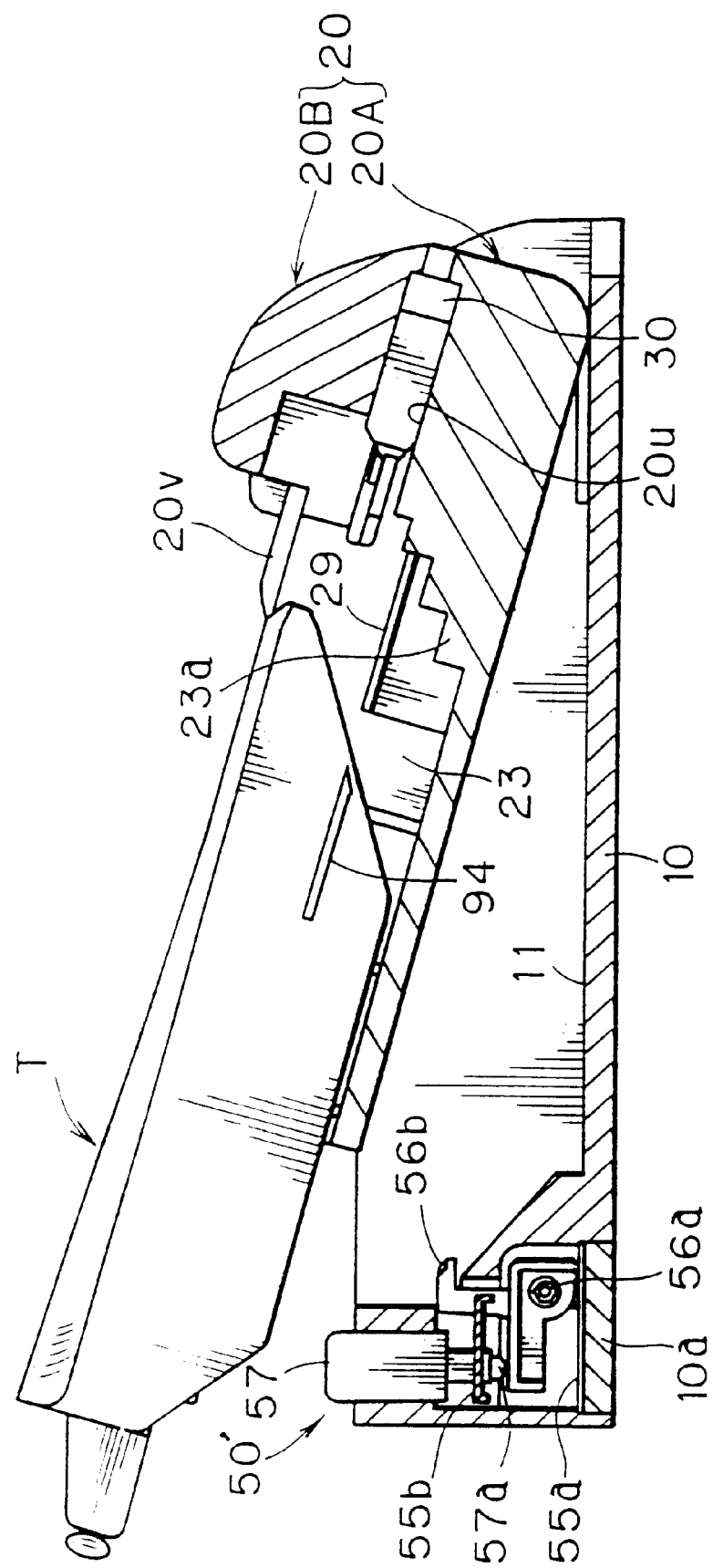
FIG. 27 is a cross sectional side view of the third phone holder of FIG. 23.

Accordingly, to eliminate such a possibility (breakage or damage of the holder connector 30), this embodiment adopts covers 20v shown in FIGS. 24 to 26. Specifically, the covers 20v are provided at a rear portion of side walls of the movable casing 20 in such a shape as to cover opposite side ends of a rear end of the mobile phone T (i.e., connected part of the mobile phone T with the holder connector 30) from above. The cover 20v prevents an oblique insertion (connection) and ejection of the mobile phone to and from the holder connector 30 (see FIGS. 26 and 27). Thereby, the third phone holder can prevent breakage or damage of the holder connector 30 with a simple construction.

Figure 29:
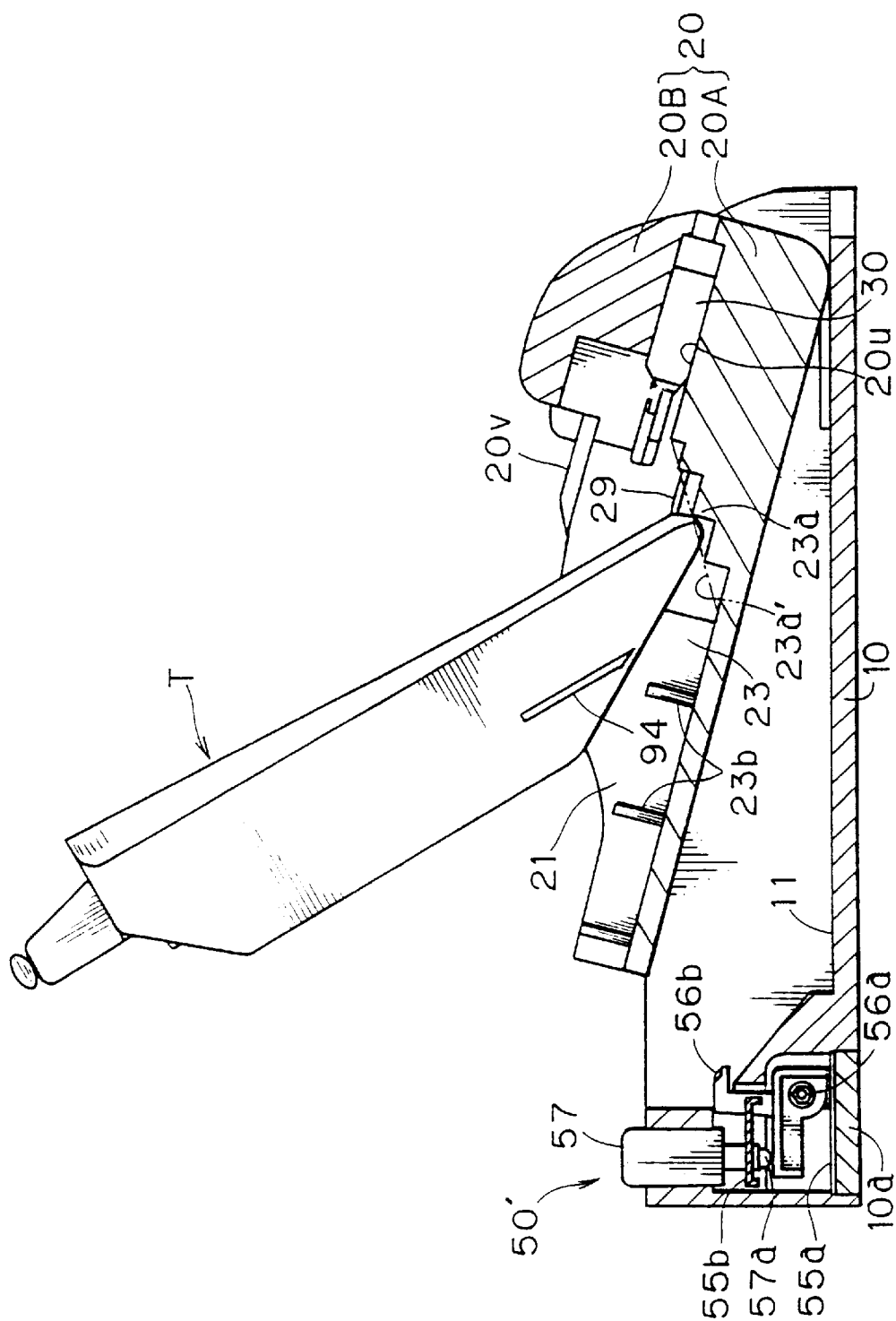
FIG. 29 is a cross sectional side view showing a state that the mobile phone is inadvertently about to be inserted obliquely from above in the movable casing of the third embodiment.

(2) Even if the cover 20v is provided, there still remains a possibility that the mobile phone T may be inserted in the movable casing 20 obliquely downward at a forward side (left side in FIG. 29) of the cover 20v, as shown in FIG. 29. In this case, let us assume that a plane oriented upward toward the holder connector 30 from a recess 23 is a flat slope 23a' shown by the broken line in FIG. 29. Then, there may be a possibility that the rear end of the mobile phone T which has been connected with the holder connector 30 is displaced upward while sliding along the slope 23a' after the connection, thereby deforming the connected position.

In order to avoid such a possibility, this embodiment adopts a stepped portion 23a shown by the solid line in FIG. 29. The rear end of the mobile phone T which is being inserted obliquely downward abuts against the stepped portion 23a, thereby preventing an upward displacement of the rear end of the mobile phone T. Accordingly, the phone holder of this embodiment can securely retain the connected position while protecting the holder connector 30.

(3) In the case where the mobile phone T is inserted in the movable casing 20 from the front, an enlarged contact area of the mobile phone T with the movable casing 20 may result in increase of a frictional resistance, which becomes a hindrance against a smooth insertion/ejection of the mobile phone T in and out of the movable casing 20.

To prevent such a difficulty, plural projections (or connector operating members) 23b are intermittently arranged on an inner side of the opposite side walls of the movable casing 20. Then, the mobile phone T slides in the movable casing 20 while coming into contact with the projections 23b without a direct contact with the side walls of the movable casing 20, thereby reducing a contact area with the movable casing 20 and accordingly, reducing a frictional force which might have caused without the projections 23b.

(4) In this embodiment, a locking mechanism 50' of a pivotal type is adopted to retain the movable casing 20 at a housed position. Specifically, referring to FIGS. 21. and 27 to 29, the locking mechanism 50' comprises a base member 55, a pivotal member 56, and an operation button 57. The base member 55 includes a base plate 55a and a button support arm 55b. The pivotal member 56 has an attachment 56a and a locking pawl (engaging piece) 56b.

The operation button 57 is supported on the button support arm 55b to be vertically movable up and down thereon. The attachment 56a is mounted on the base plate 55a to be pivotable about an axis of a horizontal shaft. The locking pawl 56b is urged in a clockwise direction in FIGS. 27 to 29 toward the fixed casing 10 by a biasing force of an unillustrated torsion spring which is wound around the horizontal shaft.

The operation button 57 protrudes upward to communicate with a through hole 14c which is vertically formed in a front wall 14 of the fixed casing 10. A lower end 57a of the operation button 57 is provided right above the pivotal member 56.

Figure 28:
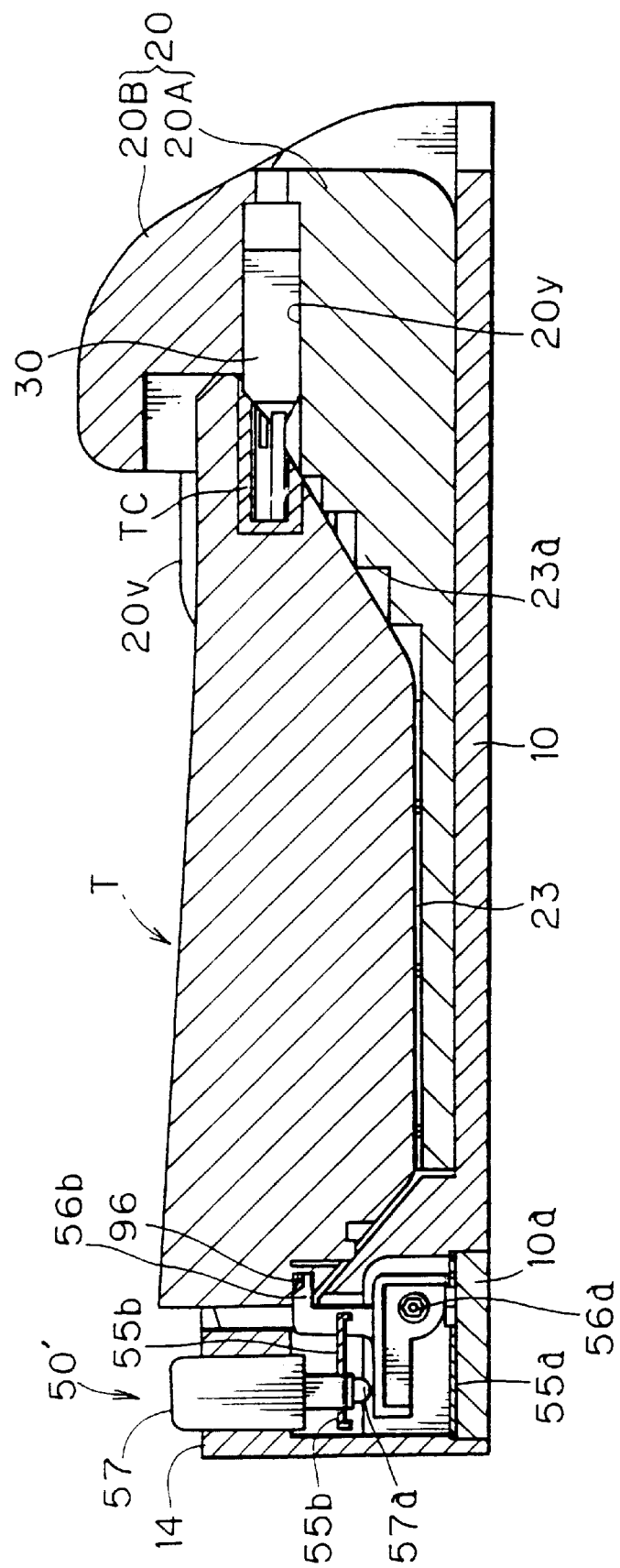
FIG. 28 is a cross sectional side view of the third phone holder of FIG. 25.

Before pressing the operation button, the locking pawl 56b is fitted in a recess 96 of the mobile phone T in the fixed casing 10, i.e., the mobile phone T and the movable casing 20 are set at the housed position (see the state of FIG. 28).

Then, pressing the operation button 57 downward from the above state pushes the pivotal member 56 downward via the lower end 57a of the operation button 57, thereby rotating the locking pawl 56b in a counterclockwise direction against the biasing force of the torsion spring. Thereby, the locking pawl 56 comes out of the recess 96 to release the locked state of the mobile phone T with the fixed casing 10.

Reference numeral 10a in FIGS. 21, 27 to 29 is a bottom lid to cover the locking mechanism 50' when the locking mechanism 50' is mounted in a bottom wall 14 of the fixed casing 10.

The locking mechanism 50' of a pivotal type facilitates release of a locked state with one-push of the operation button 57, and accordingly enhances the operability of the phone holder, compared to the locking mechanism 50 of a slide type shown in the first embodiment.

(5) In the third embodiment, omitted is the self connector locking/releasing mechanism shown in the first embodiment in which the connected state of the mobile phone T with the holder connector 30 is retained and the locked state is released in association with a position change of the movable casing 20 between the detachable position and the housed position. Constructing the fixed casing 10 and the movable casing 20 in such a manner as to restrict a disengagement of the mobile phone T from the holder connector 30 when the movable casing 20 and the mobile phone T are set at the housed position (state of FIG. 25), even without the self locking/releasing mechanism, retains a secured connected state of the holder connector 30 with the mobile phone T.

[Fourth Embodiment]

Next, a fourth embodiment of this invention is described with reference to FIGS. 30 and 31. Note that elements of the fourth embodiment identical to those in the first to the third embodiments are denoted at the same reference numerals.

In the first to the third embodiments, the movable casing 20 is mounted on the fixed casing 10 to be pivotable about the axis of the pivot shaft 22 (22'). In this embodiment, a movable casing 20 is supported in a fixed casing 10 to be vertically movable in the fixed casing 10 while maintaining a substantially horizontal posture.

Figure 30:
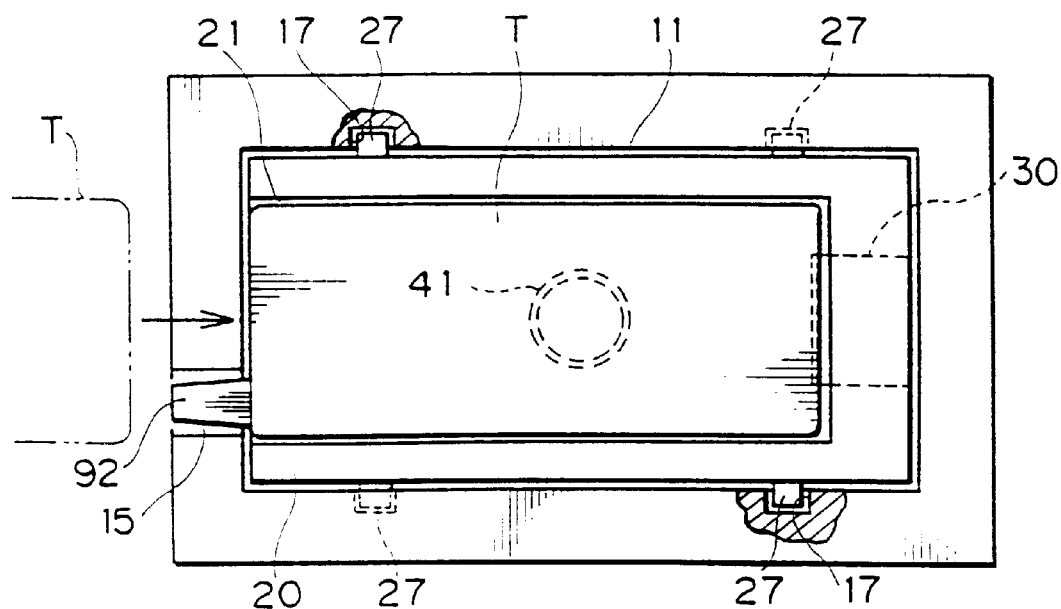
FIG. 30 is a partially cross sectional plan view of a phone holder as a fourth embodiment according to this invention.
Figure 31:
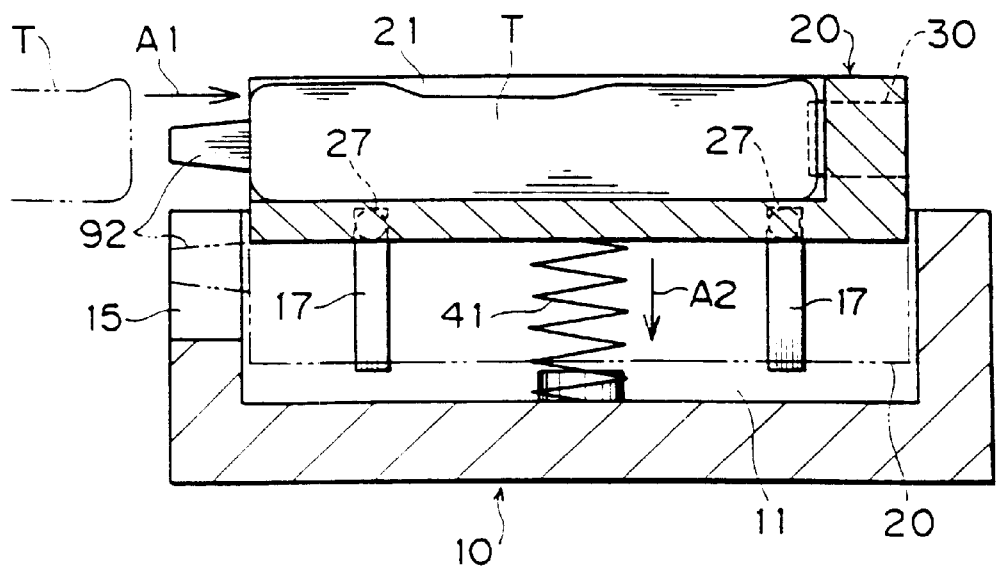
FIG. 31 is a cross sectional side view of the fourth phone holder.
Figure 32:
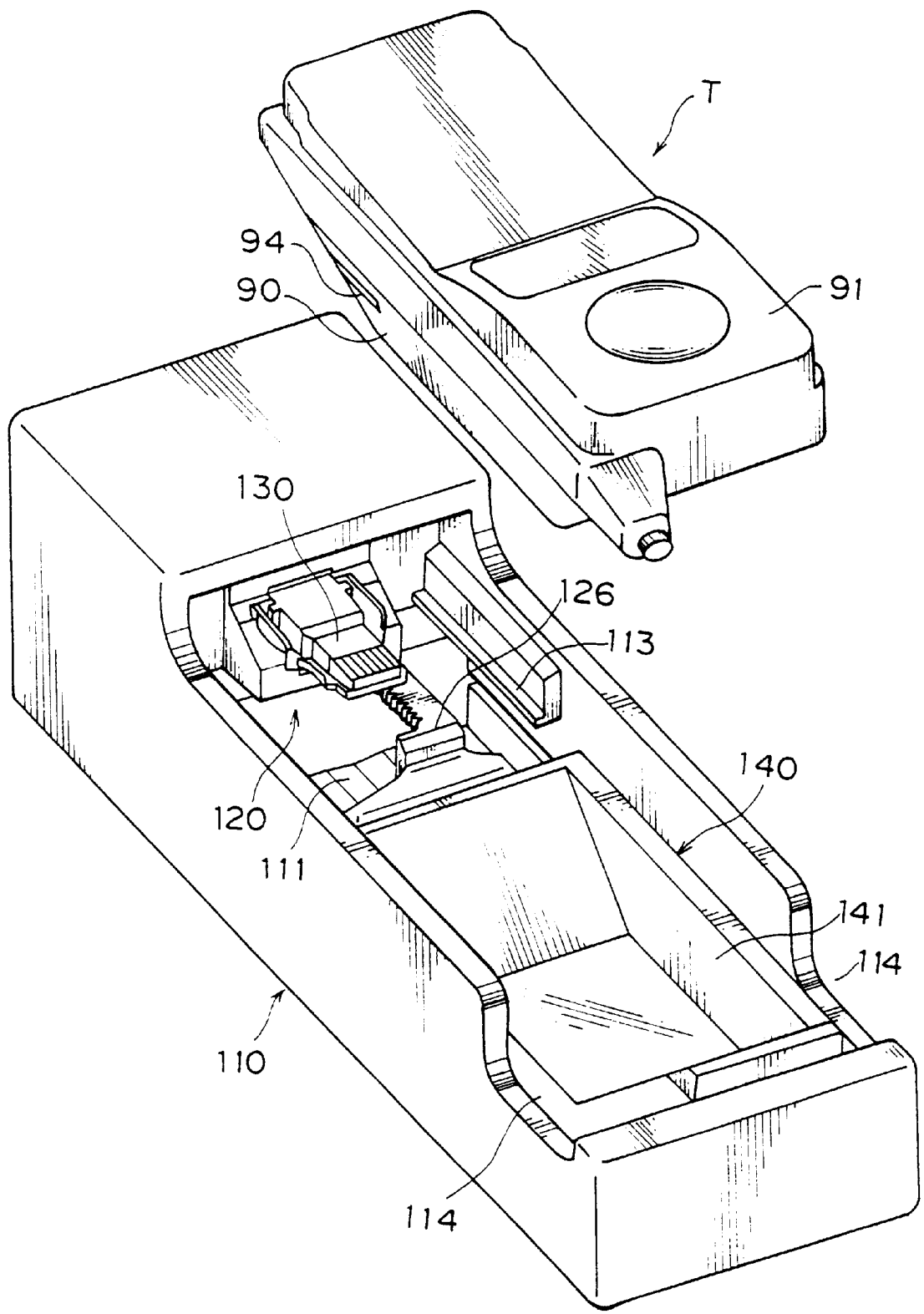
FIG. 32 is a perspective view showing a state that a mobile phone is about to be inserted in a phone holder as a fifth embodiment according to this invention.
Figure 33:
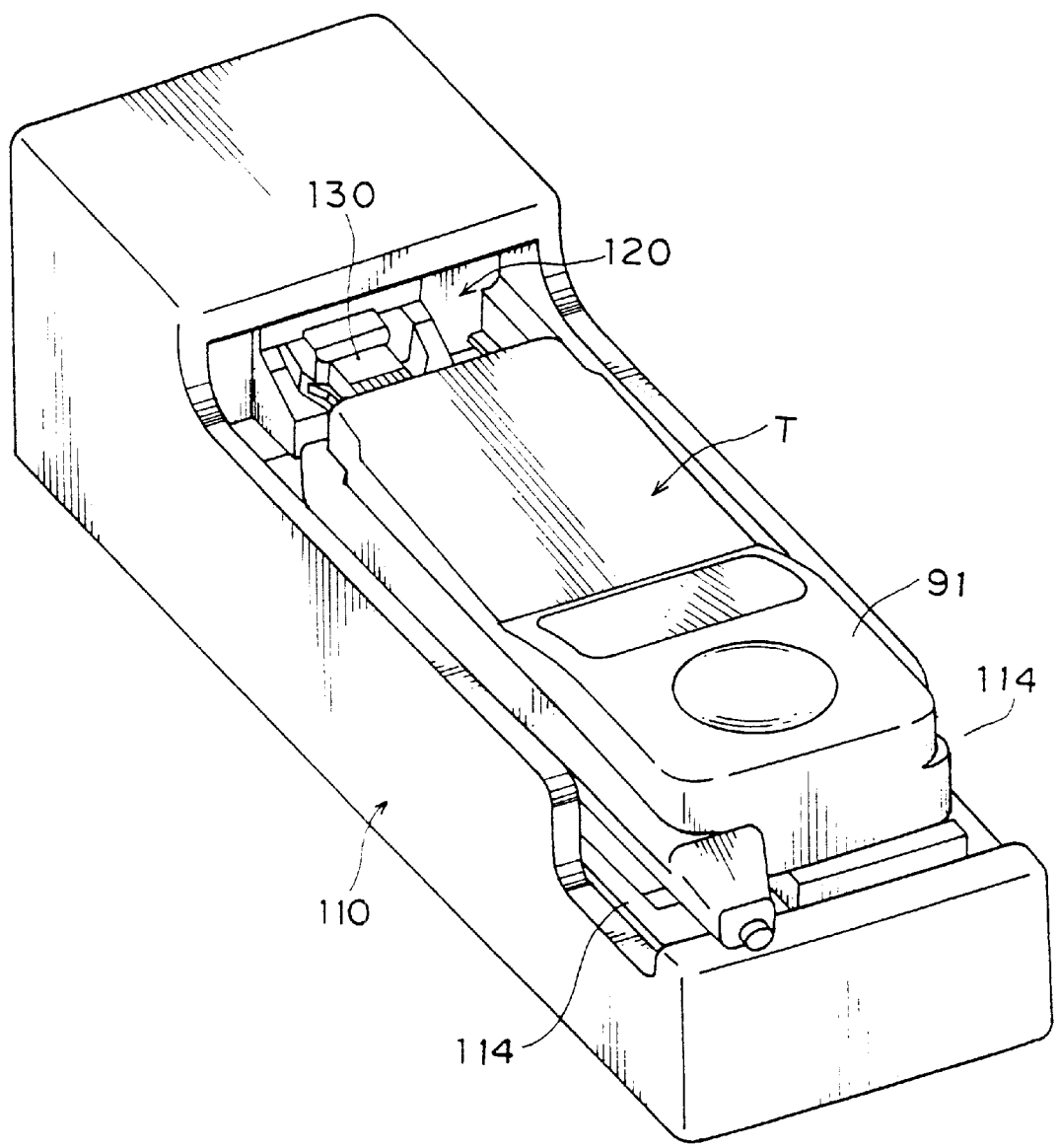
FIG. 33 is a perspective view showing a state that the mobile phone is set in a movable casing of the fifth phone holder.
Figure 34:
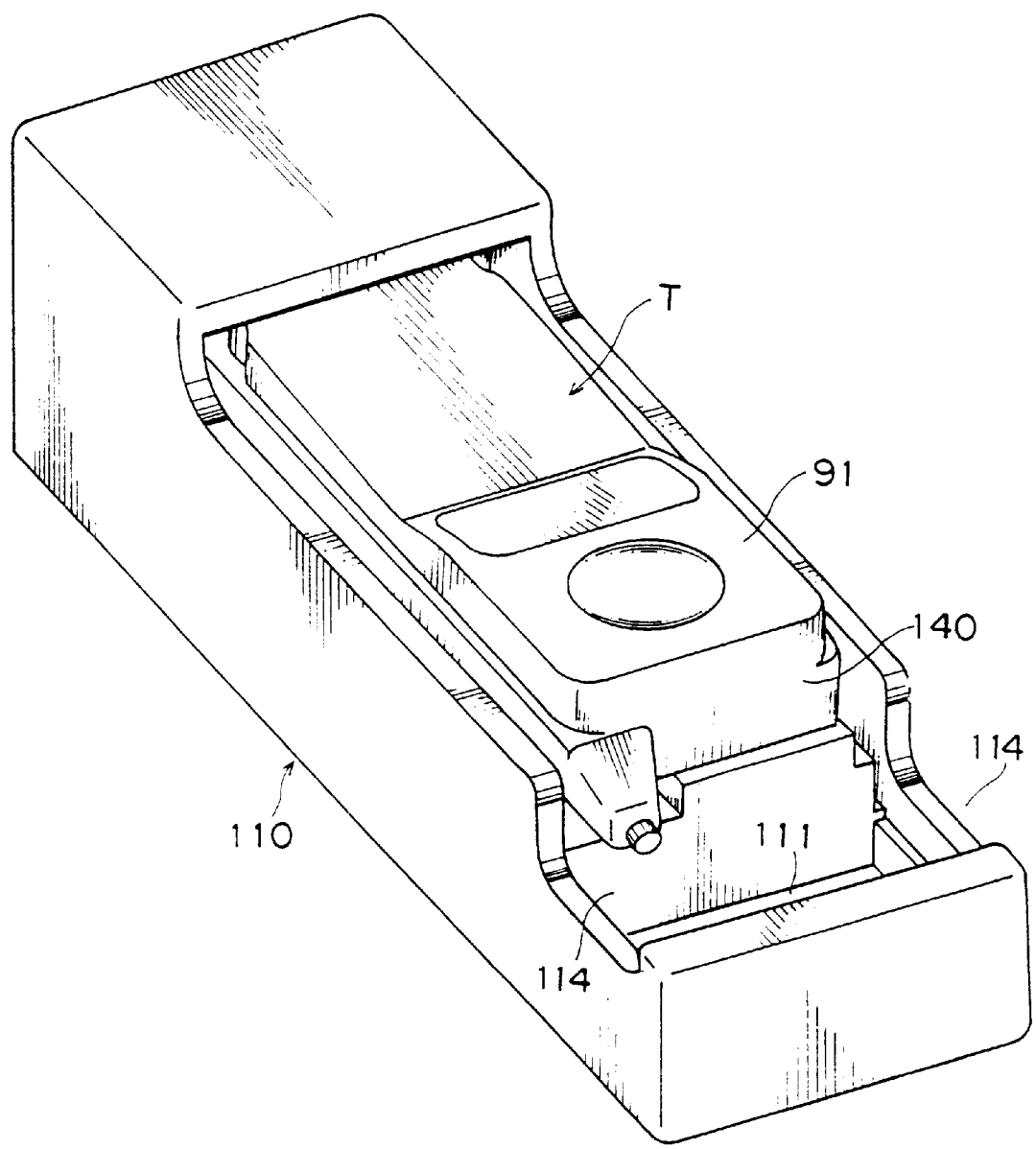
FIG. 34 is a perspective view showing a state that the mobile phone and the movable casing are retracted to a connected position with a holder connector in the fifth embodiment.

Specifically, referring to FIGS. 30 and 31, a projection 27 is provided at an outer side of opposite side walls of the movable casing 20, and a vertical slit 17 is formed in an inner side of opposite side walls of the fixed casing 10. Fitting the projections 27 in the slits 17 enables the movable casing 20 to be vertically movable by a stroke corresponding to a length of the slit 17.

When the movable casing 20 is set at an uppermost position (detachable position shown by the solid line in FIG. 31), a hollow portion (phone insertion space) 21 is accessible upward and in a front direction (left side in FIGS. 30 and 31). On the other hand, when the movable casing 20 is set at a lowermost position (housed position shown by the broken line in FIG. 31), the movable casing 20 and the mobile phone T are accommodated in a hollow portion (movable casing accommodating space) 11 of the fixed casing 10.

In this embodiment, the mobile phone T can be inserted in the movable casing 20 through the front side of the hollow portion 21 (see the arrow A1 of FIG. 31) when the movable casing 20 is set at the uppermost detachable position. Thereafter, lowering the movable casing 20 to the lowermost housed position accommodates the movable casing 20 with the mobile phone T in the fixed casing 10 (see the arrow A2 of FIG. 31).

In this arrangement, the length of the hollow portion 21 can be reduced to almost the same size as the length of the mobile phone T, thereby downsizing the phone holder as a whole.

Further, a compression spring 41 (see FIG. 31) is interposed between a bottom plane of the movable casing 20 and an upper surface of the fixed casing 10 to urge the movable casing 20 upward (toward the detachable position), and a locking mechanism similar to the locking mechanism 50 (50') in the first to the third embodiments is provided in the fixed casing 10. Thereby, the operability of the phone holder can be improved similar to the first to the third embodiments.

It may be possible to incorporate a connector operator to automatically set a holder connector 30 at a locked state accompanied with lowering of the movable casing 20 to the housed position.

As mentioned above, the specific switching mechanism of the movable casing 20 to change the position thereof between the housed position and the detachable position can take any arrangement as long as the movable casing 20 is settable at the detachable position to match the phone insertion direction substantially with the connecting direction with the holder connector 30, while reducing the size of the hollow portion 21 as much as possible to downsize the phone holder.

The hollow portion 21 may be configured into any shape according to a designer's selection. In particular, the mobile phone T has the battery casing 90 (projection) at the bottom plane thereof as in the first embodiment, forming the recess 23 in such a shape as to fit the projection 90 of the mobile phone T improves a secured state of the mobile phone T in the movable casing 20.

Figure 46A:
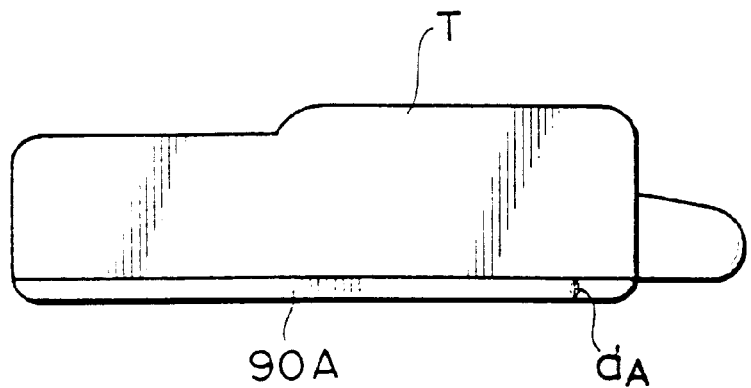
FIGS. 46A to 46C are side views respectively showing a state that mobile phones of different types are formed with a battery casing of a small thickness, a medium thickness, and a large thickness.
Figure 46B:
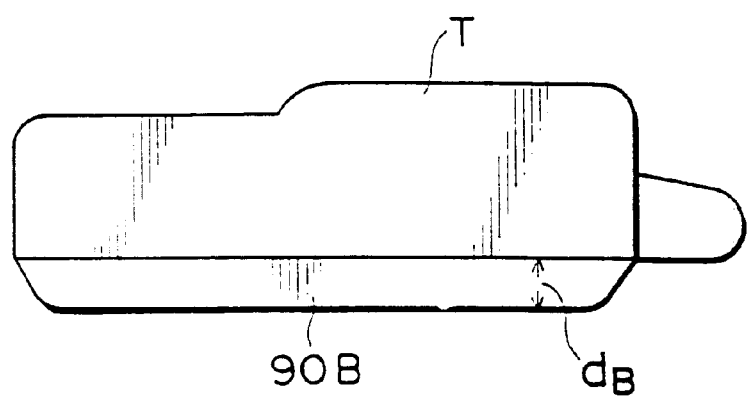
Figure 46C:
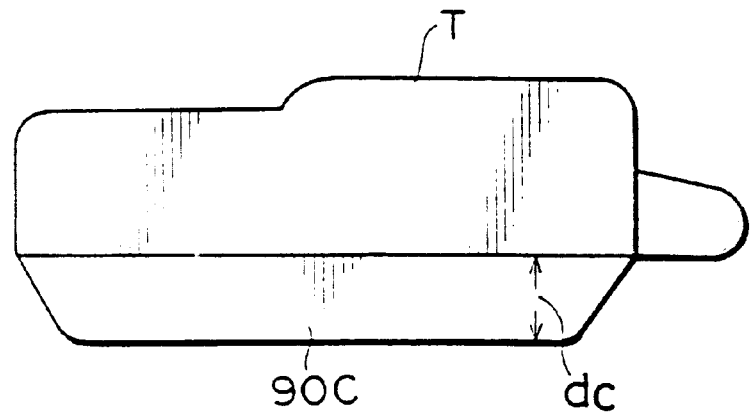

Further, in the case where plural kinds of mobile phones which differ in the size (depth) of battery casing 90 (small size compartment 90A, medium size compartment 90B, and large size compartment 90C) are selectively held in the phone holder, as shown in FIGS. 46A, 46B, 46C, the thickness of the mobile phone T greatly varies according to the size of the battery casing.

Even in such a case, forming a recess 23 in a one-size-fits-all manner with a depth great enough to insert the largest battery casing 90C enables a stable holding of the mobile phone T in the movable casing 20. Accordingly, this phone holder is versatile to hold mobile phones with different sized battery casings including the largest battery casing 90C.

For instance, when a mobile phone T' is formed with a battery casing 90' which has a projected amount smaller than the battery casing 90 shown by the solid line in FIG. 13, and the mobile phone T with the large battery casing 90 or the mobile phone T' with the small battery casing 90' are selectively held in the phone holder, the phone holder is formed with the recess 23 with a depth large enough to fit the large battery casing 90. Accordingly, the phone holder can hold the mobile phones T and T' in the movable casing 20 irrespective of the size (depth) of the battery casing.

The locking mechanism used in retaining the housed position of the movable casing 20 is not limited to the locking mechanism 50 (50'). Sliding a rod or pivoting a pivotal member to release a locked state of the movable casing 20 may be applicable. Further, in the foregoing embodiments, a direct engagement of the locking mechanism 50 with the mobile phone T is adopted. As an altered form, the locking mechanism may be engaged with the movable casing 20 to be indirectly engaged with the mobile phone T.

In the foregoing embodiments, the mobile phone T is held in the phone holder in a substantially horizontal state. Alternatively, the phone holder may hold the mobile phone T in an upright posture. Further, in the foregoing embodiments, the phone insertion space 21 is accessible upward and in a front direction of the phone holder. Alternatively, the hollow portion 21 may be accessible at least in the same direction as the connecting direction of the mobile phone T with the holder connector 30, e.g., in the front direction in the example of the drawings.

In summing up the foregoing disclosures, we proposed an inventive phone holder for holding a mobile phone which comprises: a movable casing formed with a hollow portion adapted for receiving the mobile phone; a holder connector mounted on the movable casing at such a position as to be connectable with the mobile phone when the mobile phone is inserted in the movable casing; and a fixed casing for supporting the movable casing. The movable casing is settable between a housed position where the movable casing is housed in the fixed casing along with the mobile phone and a detachable position where the hollow portion is accessible to allow insertion of the mobile phone with the holder connector and ejection of the mobile phone.

The phone holder may further comprise a biasing member for biasing the movable casing toward the detachable position, and a locking mechanism for locking the movable casing and the mobile phone at the housed position against a biasing force of the biasing member and releasing the locked state upon application of an external force. With this structure, by operating the locking mechanism, the movable casing can be released from its locked state at the housed position.

The holder connector may include a connector locking mechanism having a locking member for retaining the connected state of the holder connector with the mobile phone and an operable member operable upon receiving the external pressing force to switch the locking member between a lock position and an unlock position. With this structure, the connected state of the holder connector can be further secured. In addition, the phone holder of this invention may further comprise a connector operator for operating the operable member to set the locking member at the unlock position when the movable casing is set at the detachable position and set the locking member at the lock position when the movable casing is set at the housed position. Thus the user does not have to perform a special task for changeover of locking state.

The movable casing may be pivotally connected to the fixed casing about a rear end of the movable casing that is opposite to the opening end of the hollow portion. With this construction, the operation force required to pivot the movable casing can be lessened in comparison to the case that the movable casing as a whole had to be lifted. Furthermore, the holder connector is positioned near the pivotal end of the movable casing thus the wiring to the holder connector can be simplified.

The rear end of the movable casing may be integrally formed with a pair of pivot shafts extending in a lateral direction, and the fixed casing may be formed with a cutaway opened upward to receive the pivot shaft from bottom so that the fixed casing rotatably supports the movable casing about the pivot shaft when the pivot shaft is fitted in a bottom end of the cutaway. With this construction, thanks to the gravity, the pivot shafts of the movable casing can be easily fit to the cutaway so that the connection of the movable casing to the fixed casing can be facilitated.

The holder connector may include the connector locking mechanism having a locking member for retaining the connected state of the holder connector with the mobile phone and an operable member operable upon receiving the external pressing force to switch the locking member between a lock position and an unlock position. The phone holder may further comprise a connector operator for operating the operable member to set the locking member to the unlock position when the movable casing is set at the detachable position and to set the locking member to the lock position when the movable casing is set at the housed position.

The connector operator may include a connector operating member integrally formed with the fixed casing and protruding inward from an inner wall of the fixed casing, the connector operating member formed into such a shape as to change the operable member to set the locking member at the unlock position when the movable casing is set at the detachable position and set the locking member at the lock position when the movable casing is set at the housed position. With this structure, a changeover operation of lock and unlock of the connection of the connector is made possible and it contributes to simplification of the structure, resulting in lower cost.

The connector operator may include a movable member movable between an operable position to render the operable member operable and a retracted position away from the operable position toward outside of the movable casing, and a guide member may be formed in an inner wall of the fixed casing to move the movable member to set the locking member at the unlock position when the movable casing is set at the detachable position and set the locking member at the lock position when the movable casing is set at the housed position. With this construction, an automatic operation of the holder connector is made possible.

The movable casing and the fixed casing may be so constructed as to restrict a movement of the mobile phone in a direction away from the holder connector when the movable casing is set at the housed position. With this construction, inadvertent disconnection of the mobile phone from the holder connector, when in the hosed position, can be prevented without having a separate locking mechanism for the holder connector.

The movable casing may include a main body formed with the hollow portion to set the holder connector and a cover mounted on the main body to cover the holder connector set in the main body of the movable casing, the cover and the main body holding the holder connector therebetween when the cover is mounted on the main body. With this construction, the holder connector can be installed onto the movable casing without an aid of such as a holder mounting jig.

It is preferable that at least one of the main body and the cover of the movable casing is provided with a connector stopper for restricting a movement of the holder connector along a connecting direction by an engagement with the holder connector, and the engaged state of the holder connector with the connector stopper is retained when the cover is mounted on the main body of the movable casing.

The movable casing may be formed with a recess at a bottom wall thereof to receive a bulged portion formed on a plane of the mobile phone opposing to the bottom wall. With this configuration, the holding state of the mobile phone to the movable casing is enhanced.

The recess of the movable casing may be formed in such a shape as to fit the bulged portion of the mobile phone in a one-size-fits-all manner, the bulged portion being different in a projected amount from a flat bottom plane of the mobile phone due to a type of battery to be loaded therein. With this configuration, many or maybe all kinds of mobile phones currently available on the market can be held in the phone holder.

The movable casing may have a bottom wall and side walls to form an opening opened upward and in a front direction, and the holder connector may be provided at a rear position of the movable casing to be connectable with the mobile phone in a phone connecting direction. The movable casing may be formed at a rear position on the side wall with a cover in such a shape as to cover part of a top portion of the mobile phone to prevent the mobile phone from obliquely connected to and detached from the holder connector. With this configuration, the mobile phone's oblique movement with respect to the movable casing can be prevented, protecting the holder connector from being damaged.

The movable casing may have a bottom wall and side walls to form an opening opened upward and in a front direction. The holder connector may be provided at a rear position of the movable casing to be connectable with the mobile phone in the phone connecting direction. The recess of the movable casing may be shaped into a stepped portion with a level thereof higher toward the holder connector to secure an abutment of a leading end of the mobile phone with the stepped portion so as to prevent the mobile phone from intruding further rearward of the movable casing over the stepped portion. With this configuration, a progressing movement of the end of the mobile phone along an upward slope from the recess to the holder connector portion is prevented, thereby preventing an undesired contact of the mobile phone to the holder connector.

[Fifth Embodiment]

Next, a fifth embodiment of this invention is described with reference to FIGS. 32 to 44. Note, once again, that elements of this embodiment identical to those in the first to the fourth embodiments are denoted at the same reference numerals. Further, the motivation of the development of this fifth embodiment is in view of the following problem.

In the case where the backside of the mobile phone T (lower side in FIG. 45) is flat, the phone insertion of the mobile phone T in the first stage and the second stage is feasible. However, in the case where the backside of the mobile phone T is partially formed into a projection or a bulged portion (battery casing) to accommodate a battery or its equivalent therein, the connection of the mobile phone T with the holder connector 206 in the second stage may become difficult due to the projection of the mobile phone T.

In particular, as shown in FIGS. 46A to 46C, there are various types of mobile phones, currently available on the market, respectively formed with battery casings 90A, 90B, and 90C on a backside of a mobile phone T. The battery casings 90A, 90B, 90C have different depths $d_A$ to $d_C$ (vertical dimension in FIGS. 46A to 46C), i.e., different projected amounts from the backside of the mobile phone. In such a case, it is hardly impossible to hold the mobile phones of different types (depths) in the same phone holder.

A phone holder of this invention is adapted for holding a mobile phone T with a boat-like shape which is formed with a battery casing (or projection) 90 on a bottom plane thereof to accommodate a battery. The phone holder comprises a fixed casing 110, a connector module 120, and a movable casing 140.

The fixed casing 110 extends in a lengthwise direction of the mobile phone T (fore and aft directions of the phone holder), and is shaped into a vessel or a boat-like shape with an opening opened upward except a rear end thereof.

The movable casing 140 includes a recess 141 which substantially coincides with a bulged portion or the battery casing 90 of the mobile phone T, and is so constructed as to support the mobile phone T in a substantially horizontal posture in a fitted state of the projection 90 in the recess 141.

Figure 35:
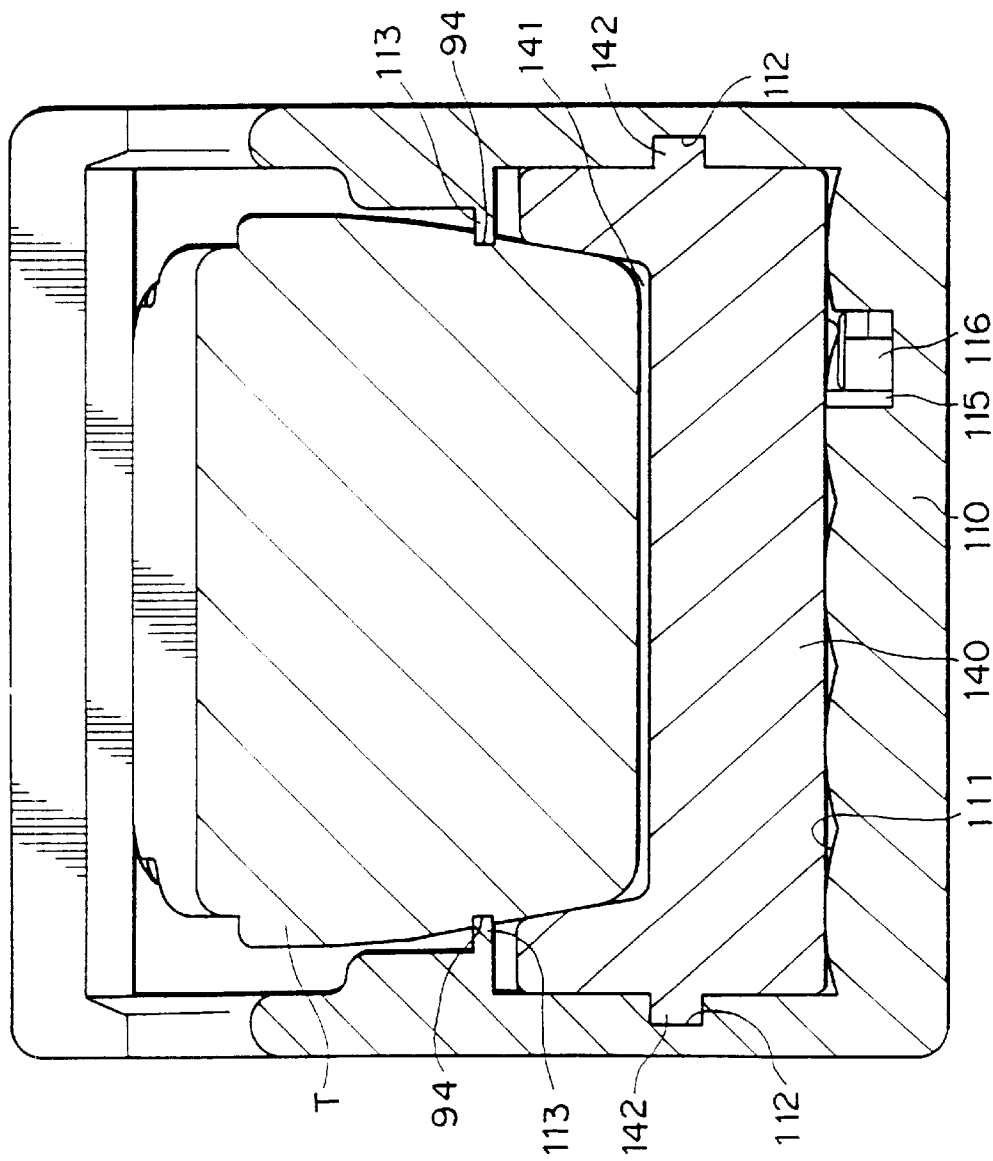
FIG. 35 is a cross sectional front view of the fifth phone holder.

As shown in FIG. 35, a rib 142 extending in the lengthwise direction of the mobile phone T is formed at opposite side walls of the movable casing 140. A guide recess 112 is formed in an inner side of opposite side walls of the fixed casing 110 at a position corresponding to the rib 142. Fitting the ribs 142 in the guide grooves 112 mounts the movable casing 140 in the fixed casing 110 to be slidable in the lengthwise direction of the mobile phone T.

A rib 113 projecting inward is formed on the side walls of the fixed casing 110 at a position above the guide groove 112. The rib 113 is fittable in a recess 94 of the mobile phone T when the mobile phone T is accommodated in the fixed casing 110.

Also, referring to FIG. 35, a top surface 111 of the fixed casing 110 (i.e., a plane in contact with a bottom surface of the movable casing 140) is formed into a series of projections and recesses to smoothly guide the movable casing 140 in the fixed casing 110.

Figure 36:
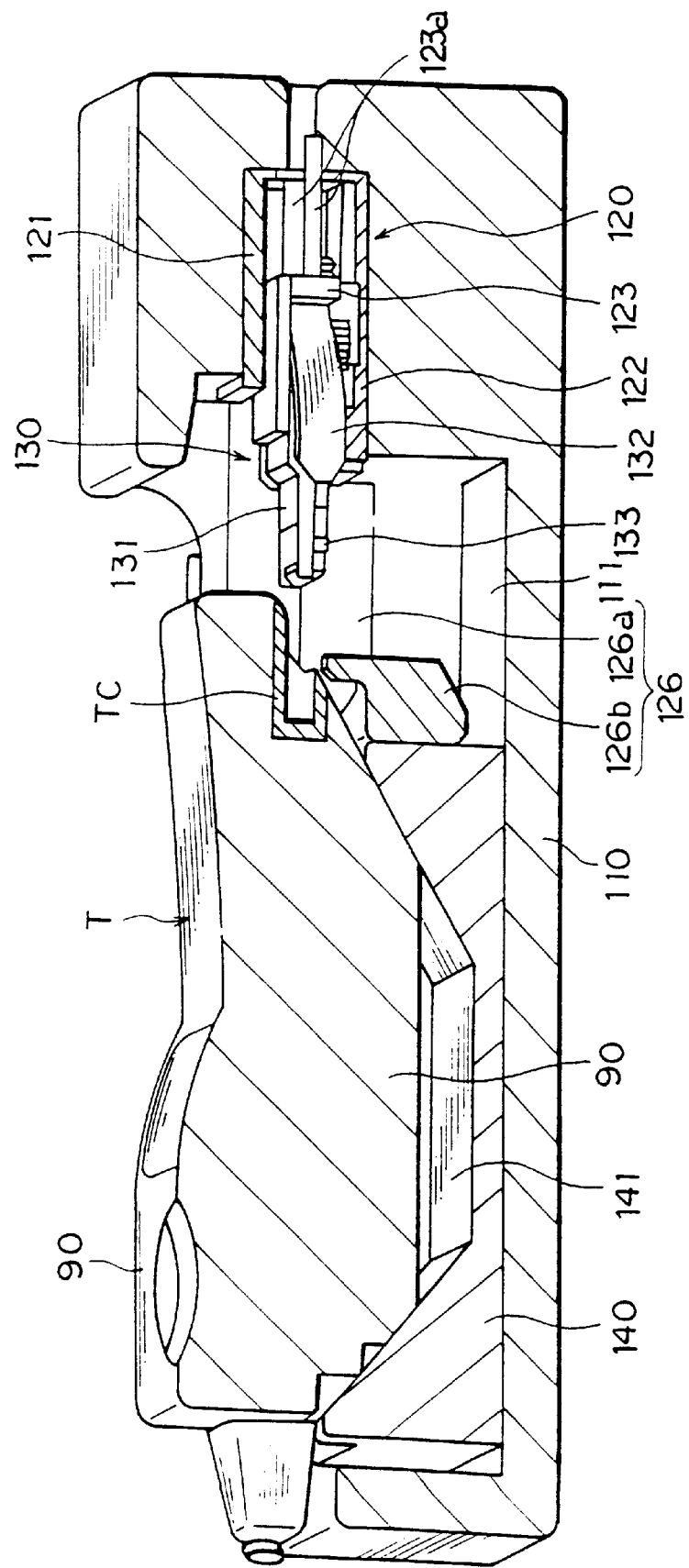
FIG. 36 is a cross sectional perspective view showing a state before the mobile phone is connected with the holder connector in the fifth embodiment.
Figure 37:
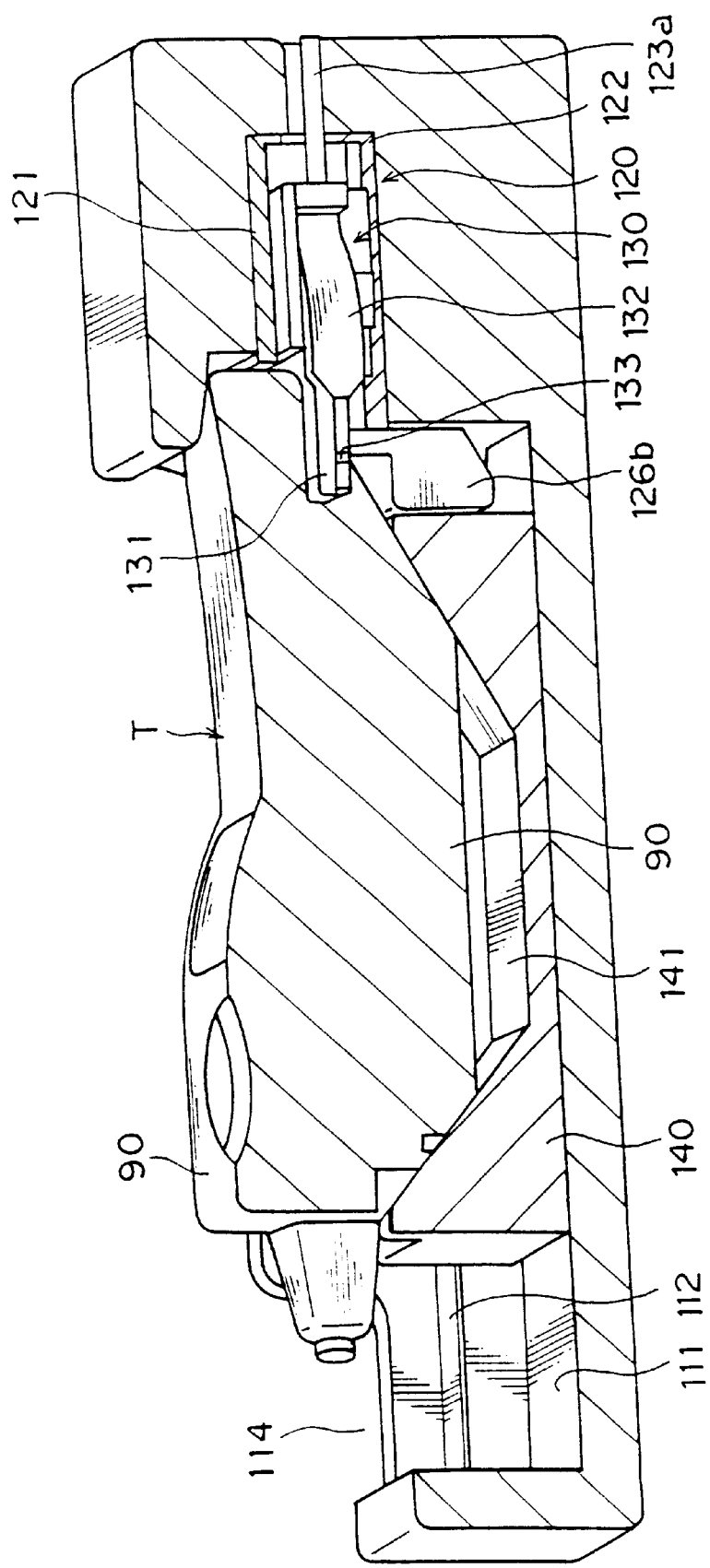
FIG. 37 is a cross sectional perspective view showing a state after the mobile phone is connected with the holder connector in the fifth embodiment.
Figure 38:
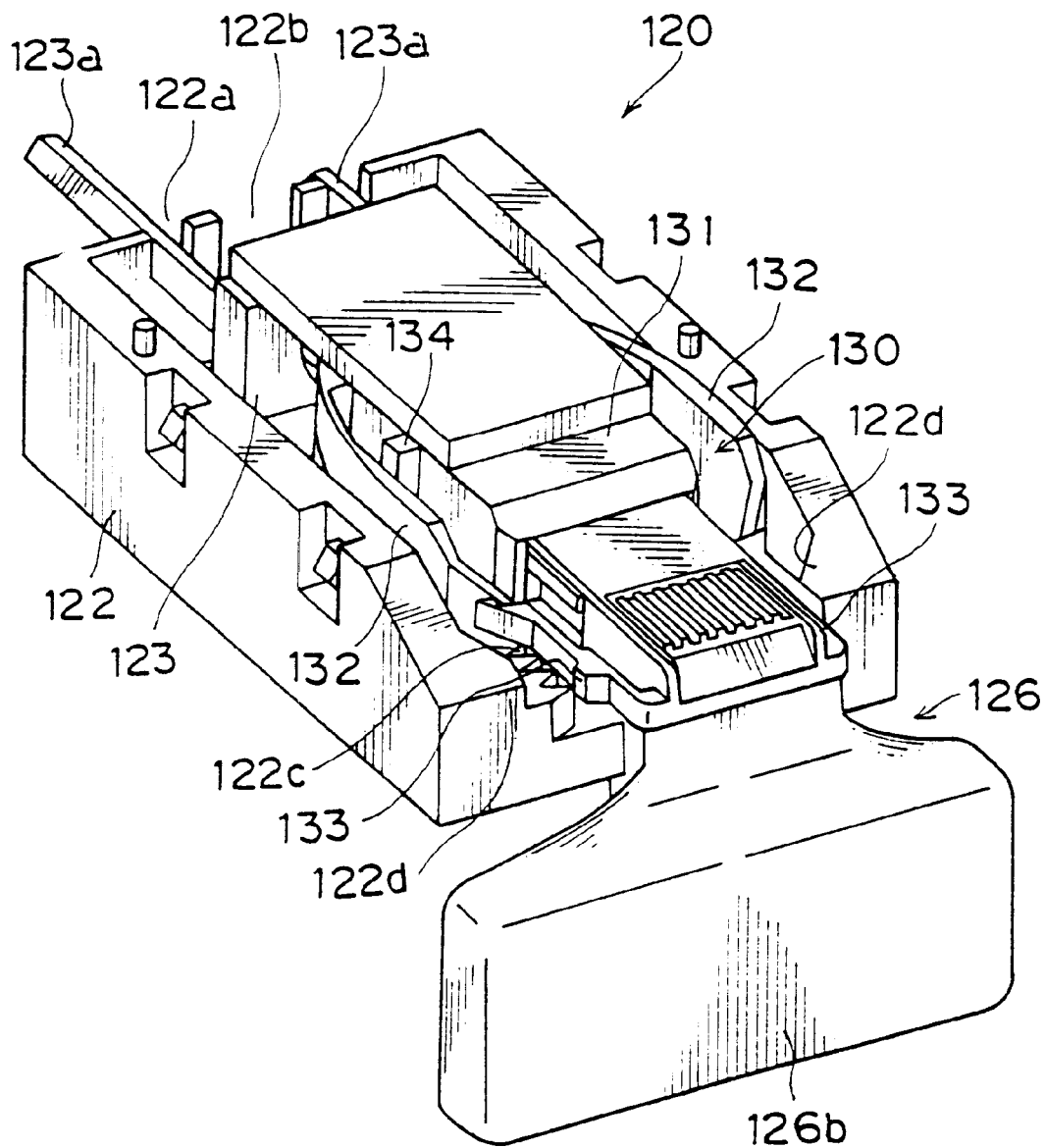
FIG. 38 is a perspective view showing a state that an upper casing of a connector module is omitted in the fifth embodiment.
Figure 39:
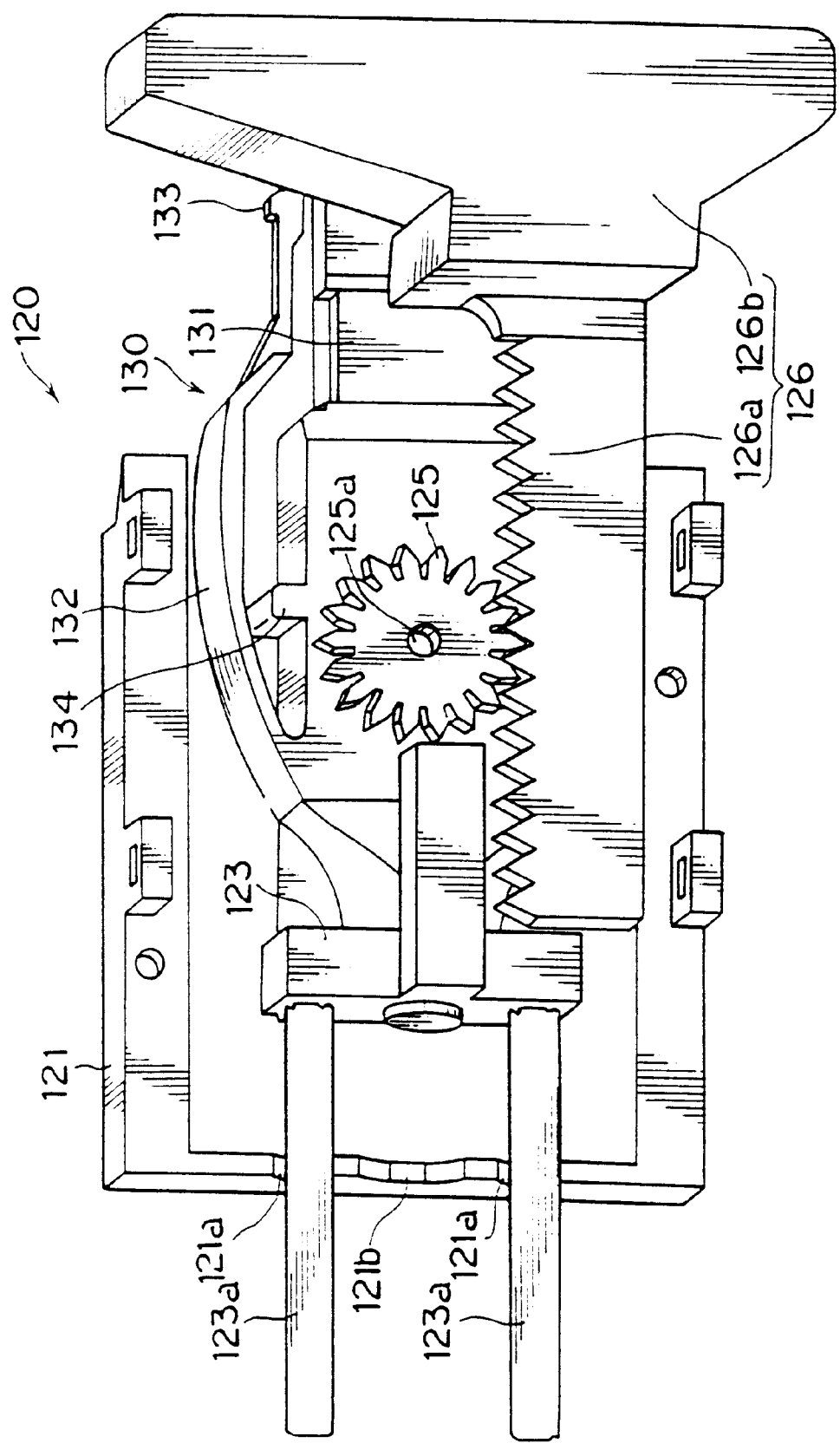
FIG. 39 is a perspective view showing a state that a lower casing of the connector module is omitted in the fifth embodiment.

As shown in FIGS. 36 and 37, the connector module 120 comprising an upper casing 121 and a lower casing 122 is constructed such that a holder connector 130 is held between the upper casing 121 and the lower casing 122 at a rear portion of the fixed casing 110. The connector module 120 is arranged in the fixed casing 110 at such a position as to render a phone connector TC provided at a rear end of the mobile phone T connectable with the holder connector 130 when the mobile phone T set in the movable casing 140 slides rearward in the fixed casing 10 (see FIG. 37).

Note that the mobile phone T and the battery casing 90 are shown by a hatched portion as an integral member in FIGS. 36 and 37 for sake of easier explanation.

Similar to the first embodiment, the holder connector 130 is integrally formed with a connector main body 131 and a pair of left and right operable members 132. The locking and unlocking of engaging pieces 133 (corresponding to the engaging pieces 33 of the first embodiment) with recesses Ch of the mobile phone T are the same as in the first embodiment. Accordingly, the construction of the operable member 132, the engaging piece 133, and the recess Ch, and the description on the locked and unlocked state are omitted here in this fifth embodiment.

Further, similar to the first embodiment, a stopper 134 (see FIGS. 38 to 41) is formed on. the connector main body 131 to restrict the operable member 132 from deforming beyond a maximum amount.

The upper casing 121 and the lower casing 122 of the connector module 120 are so shaped as to hold the holder connector 130 to be slidable in the length direction of the mobile phone T by a certain stroke. Specifically, the connector module 120 (i.e., the upper casing 121 and the lower casing 122) is opened in a front side (lower side in FIGS. 40 and 41). A connector operator 122d is formed at opposite ends of the connector module 120 in the widthwise direction of the mobile phone T opposing to the front opening (side) of the connector module 120. The connector operator 122d projects inward to press the operable member 132 of the holder connector 130 inward.

Figure 40:
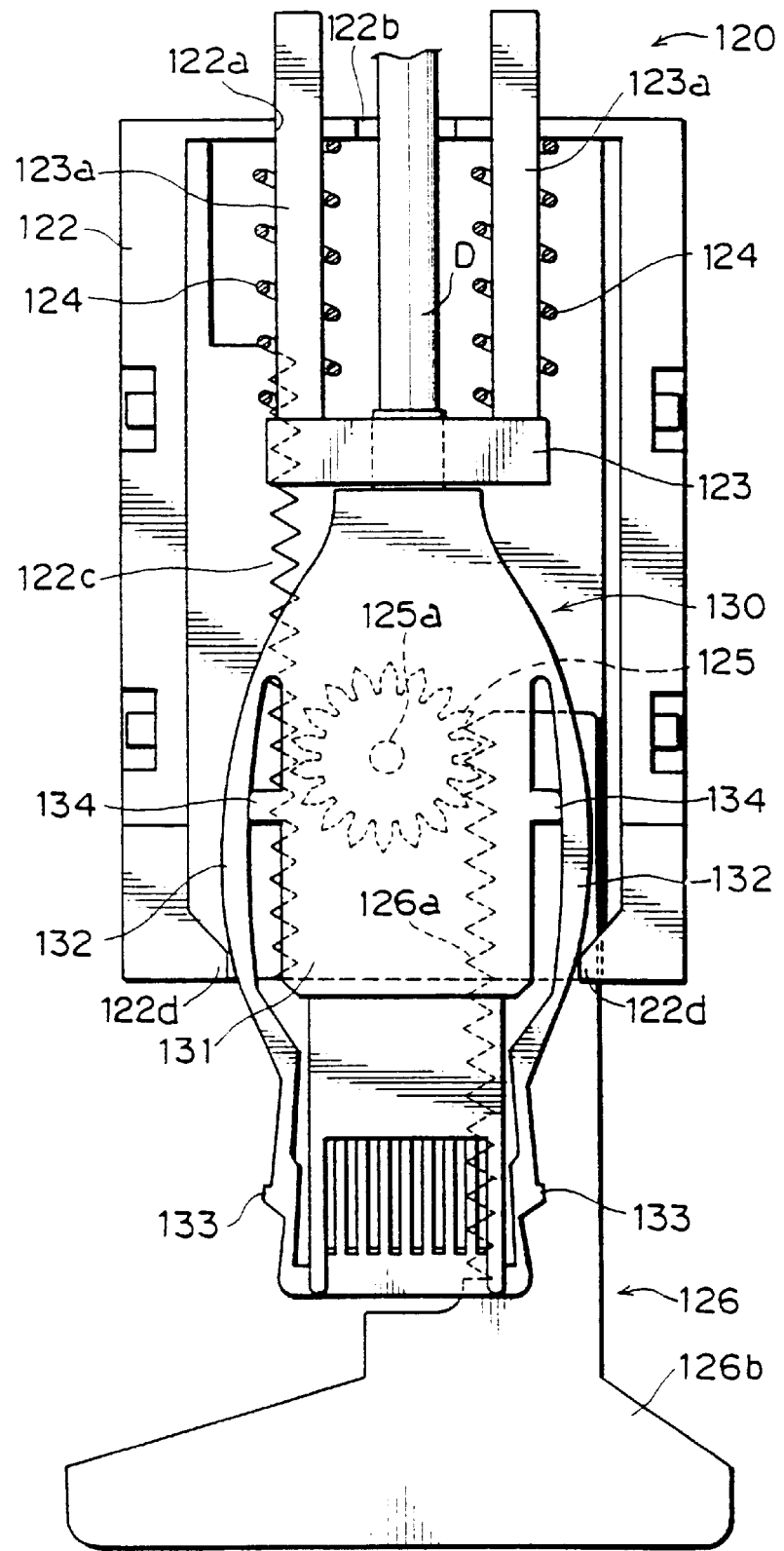
FIG. 40 is a plan view showing a state that the holder connector is biased forward in the connector module of the fifth embodiment.
Figure 41:
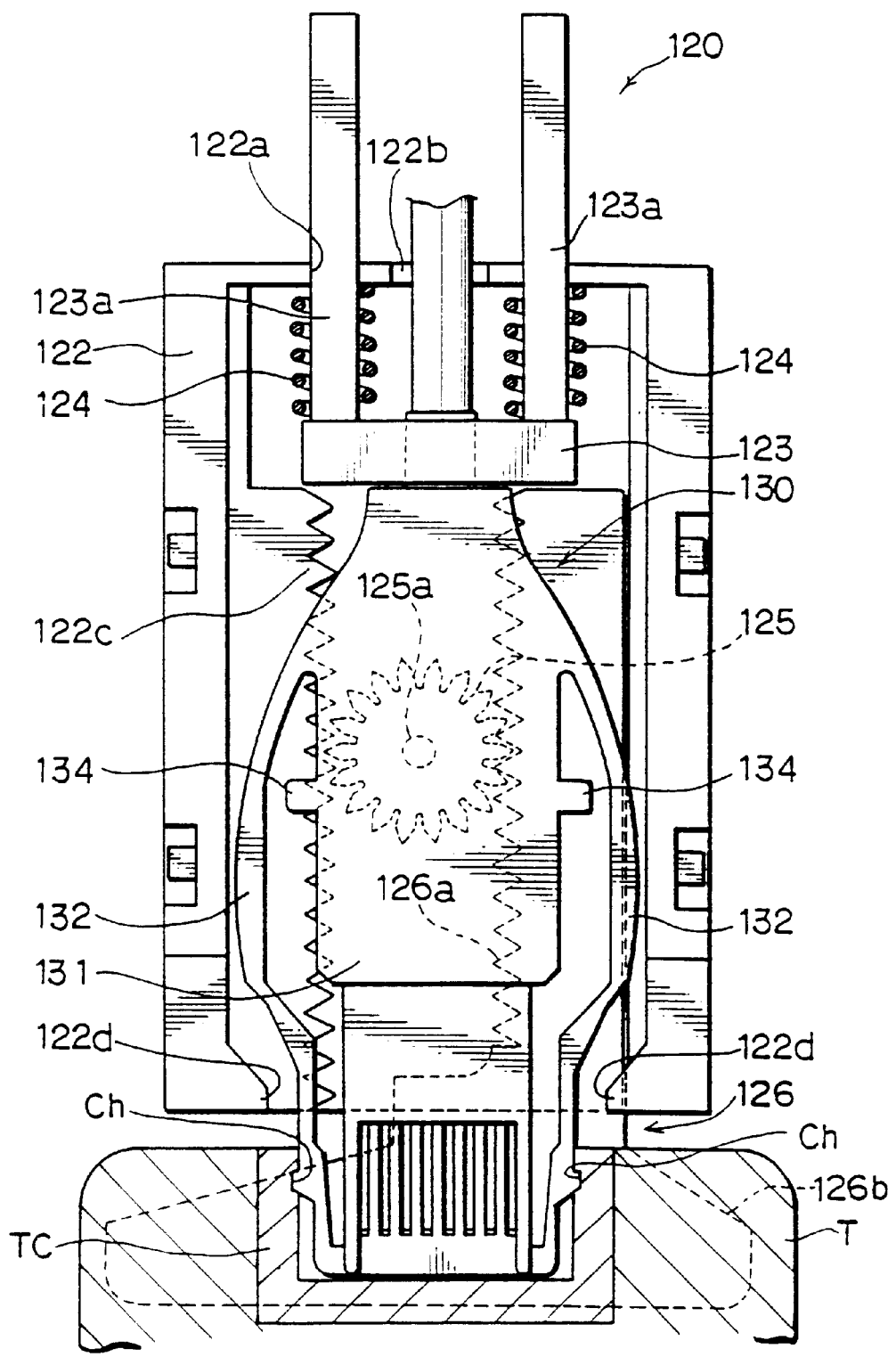
FIG. 41 is a partially cross sectional plan view showing a state that a phone connector is being connected to the holder connector in the connector module while the mobile phone is inserted toward the holder connector.

Referring to FIGS. 40 and 41, a bracket 123 is mounted on a rear portion of the holder connector 130. A pair of left and right pins 123a extend rearward from the bracket 123 to be respectively inserted in jointed through holes (cutaways) 121a, 122a which are respectively formed in the upper casing 121 and the lower casing 122. A compression spring (biasing member) 124 is wound around each of the pins 123a between the bracket 123 and a rear end wall of the upper casing 121 and the lower casing 122 to urge the holder connector 130 forward (downward in FIGS. 40 and 41) due to a biasing force of the compression springs 124.

Specifically, when an external pressing force is not applied to the holder connector 130, the compression springs 124 apply a biasing force to set the holder connector 130 at such a position (position of FIG. 40) as to press the operable members 132 inward by the connector operators 122d.

Note that the cutaways 121b, 122b (see FIGS. 38, 39) are formed in the rear end wall of the respective upper casing 121 and the lower casing 122. An electric cord D (see FIG. 40) of the holder connector 130 is drawn outside the connector module 120 through the cutaways 121b, 122b.

Referring to FIGS. 40 and 41, a vertically extending rotary shaft 125a is provided on a lower surface of the connector main body 131 of the holder connector 130. A pinion gear 125 is mounted to be rotatable about an axis of the shaft 125a. A rack 122c which is meshable with the pinion gear 125 is provided on an inner side of an upper surface of a bottom wall of the lower casing 122. Meshing the rack 122c with the pinion gear 125 slides the holder connector 130 relative to the lower casing 122 in the length direction of the mobile phone T in association with a rotation of the pinion gear 125.

A drive transmitter 126 which integrally comprises a rack 126a and a contact piece (contact plate) 126b is mounted in the connector module 120. The rack 126a extends in the length direction of the mobile phone T and is inserted from the front side of the connector module 120. The rack 126a is meshable with the pinion gear 125 and slidable in the fore and aft directions of the phone holder (length direction of the mobile phone T). The contact piece 126b is integrally connected to a fore end of the rack 126a and extends in a direction normal to the phone insertion direction (i.e., in the width of the mobile phone T).

With this arrangement, the rack 122c, the pinion gear 125 and the drive transmitter 126 constitute a drive transmission mechanism which moves the holder connector 130 at a speed half as fast as the moving speed of the movable casing 140 in the same direction as the movable casing 140 and in association with a fore/aft movement thereof. The compression springs 124 also apply a biasing force to the movable casing 140 as well as the holder connector 130 to urge the movable casing 140 forward in a direction away from the holder connector 130, in a leftward direction in FIGS. 36 and 37. That is, due to the biasing force of the compression springs 124, the movable casing 140 is set at a detachable position where the mobile phone T is ejectable from the fixed casing 110.

Figure 42:
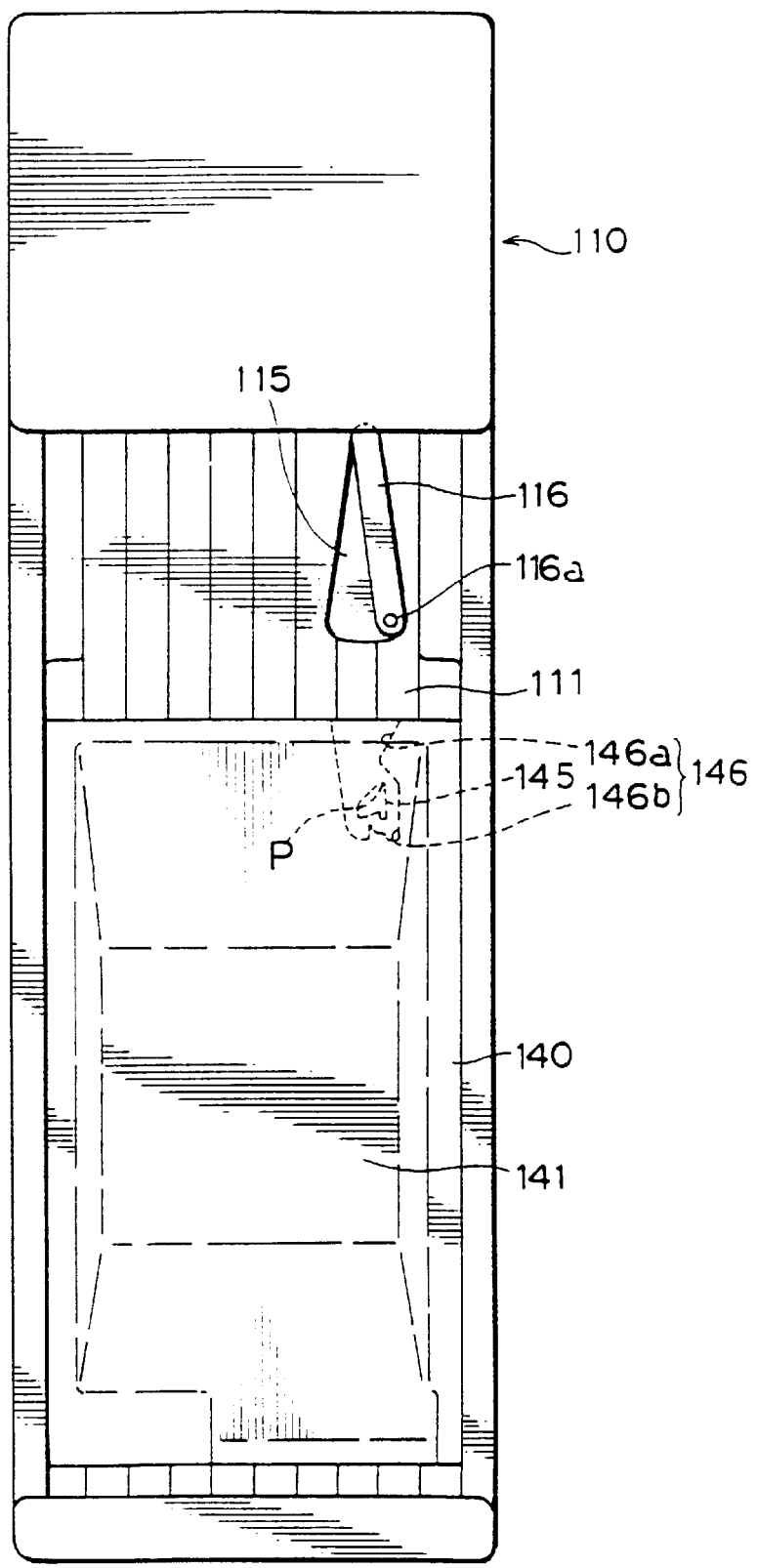
FIG. 42 is a plan view showing a state that the movable casing of the fifth phone holder is biased at a foremost position.
Figure 43:
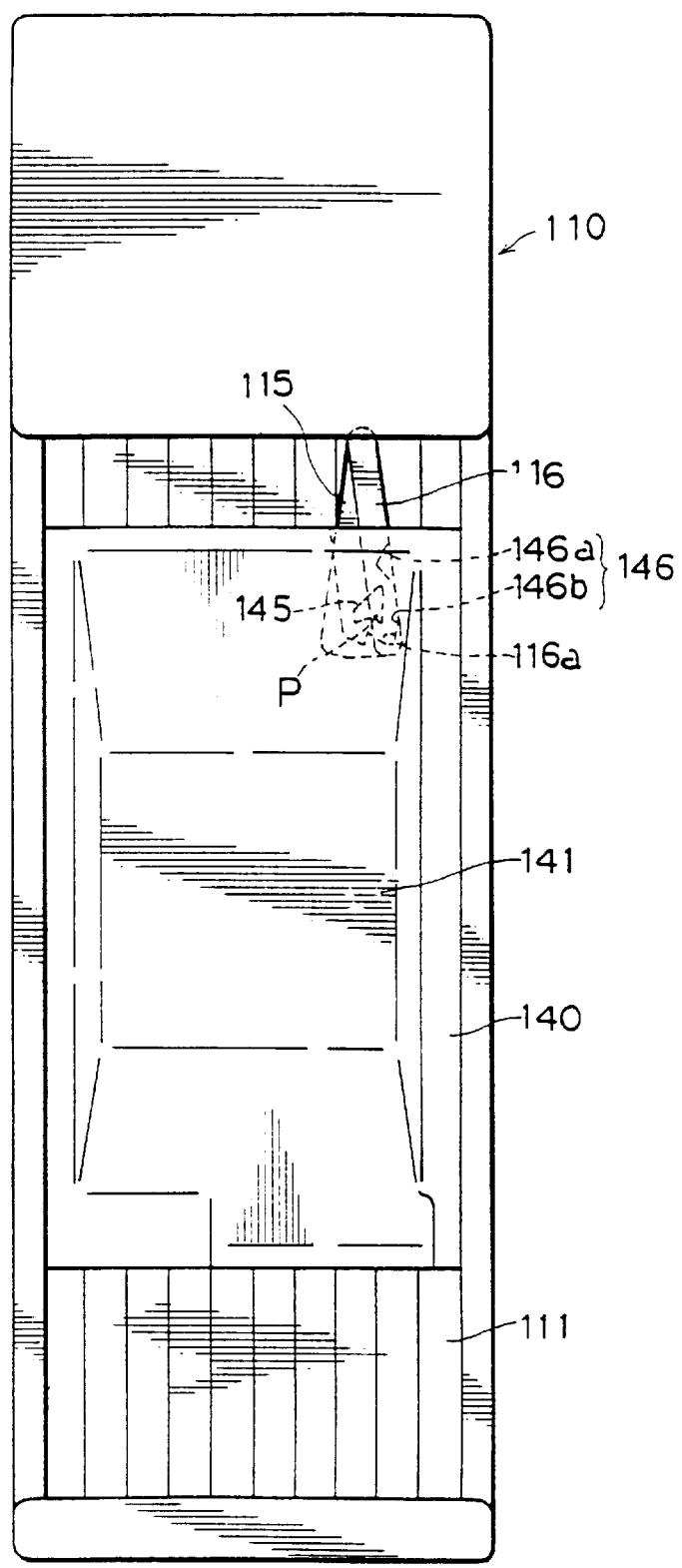
FIG. 43 is a plan view showing a state that the movable casing of the fifth phone holder is retracted at a rearmost position.
Figure 44:
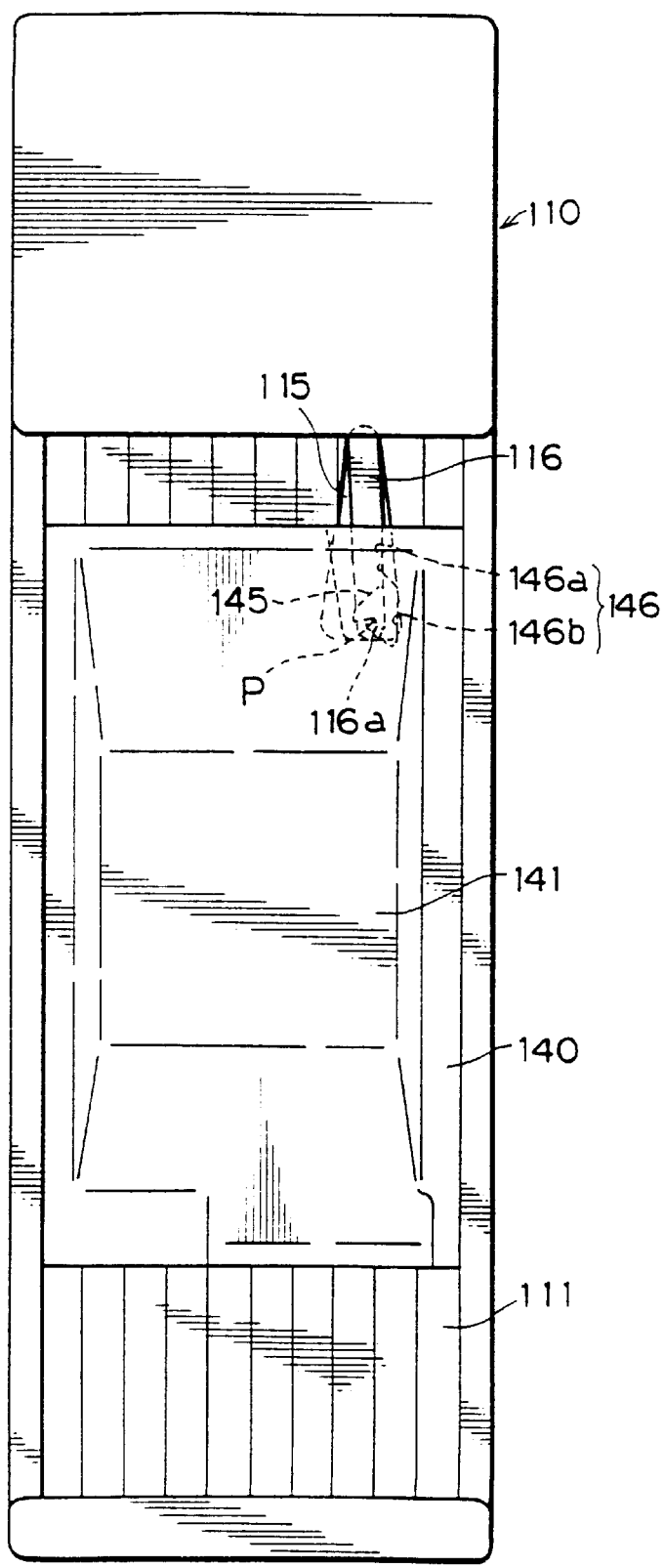
FIG. 44 is a plan view showing a state that a movement of the movable casing is restricted in the fifth embodiment.

In this embodiment, an engaging mechanism is provided for holding the movable casing 140 at such a position (a housed position) to set the phone connector TC and the holder connector 130 at a connected position (retracted position shown in FIG. 37). A specific construction of the engaging mechanism is shown in FIGS. 42 to 44. Note that, in these drawings, the connector module 120 is omitted for sake of easier explanation.

A substantially fan-shaped recess 115 is formed in a rear portion on the top wall of the fixed casing 111 (upper portion in FIGS. 42 to 44). A lever 116 is fitted in the recess 115 to be pivotable about a rear end thereof (upper end in FIGS. 42 to 44) corresponding to a center (root) of the fan-shaped recess 115. An upward extending projection 116a is formed at a fore end of the lever 116.

A groove (or an engaged member) 146 is formed in a rear portion on the bottom wall of the movable casing 140. The groove 146 has an opening opened downward to fit the projection 116a of the lever 116 mounted on the fixed casing 110.

The groove 146 includes an entrance groove 146a opened in the rear direction (upper direction in FIGS. 42 to 44), and a loop groove 146b which is communicated with the entrance groove 146a at a fore end thereof and encases a substantially heart-shaped cam 145.

The loop groove or the loop portion 146b is shaped to fulfil the following requirements. As the movable casing 140 carrying the mobile phone T approaches the connector module 120 (i.e., toward the holder connector 130) in the rear direction of the phone holder, the projection 116a first enters the entrance groove 146a, passes along a side wall (right side in FIGS. 42 to 44) of the loop groove 146b, and reaches a center recess P of the cam 145 (see FIGS. 43 and 44). In the state of fitting the projection 116a in the center recess P, the movable casing 140 is set at the engaged position to retain the phone connector TC and the holder connector 130 at the connected position.

Further, when the connector main body 123 is lightly pushed rearward from the above engaged state, the projection 116a comes out of the center recess P, passes along the opposite side wall (left side in FIGS. 42 to 44) of the loop groove 146b, and returns to the entrance groove 146a, thereby releasing the engaged state of the movable casing 140.

Referring back to FIGS. 33 and 34, a cutaway 114 is formed in a forward portion on opposite side walls of the fixed casing 110. The height of the side walls of the fixed casing 110 and the position of the cutaways 114 are set such that when the mobile phone T is set in the movable casing 140 (see FIG. 34), and the movable casing 140 is retracted in the rearward direction to connect the mobile phone T with the holder connector 130, the opposite side walls of the fixed casing 110 cover the side portions of the mobile phone T and that when the mobile phone T is advanced forward to be disconnected from the holder connector 130 (see FIG. 33), side surfaces of a forward portion 91 of the mobile phone T are exposed outside through the cutaways 114.

Next, an operation of the phone holder of the fifth embodiment is described.

When the mobile phone T is not set in the movable casing 140, i.e., an external force is not applied to the connector module 120, the holder connector 130 is biased forward and retained at the detachable position by a biasing force of the compression springs 124 in the connector module 120. In this state, the connector operators 122d of the lower casing 122 press the operable members 132 inward. Thereby, the engaging pieces 133 of the holder connector 130 are disengaged from the recesses Ch of the mobile phone T, thereby setting at an unlock position.

In association with the forward biased state of the holder connector 130, the drive transmitter 126 which is linked with the holder connector 130 via the pinion gear 125 and the rack 126a is biased forward at a stroke twice as large as the pushing stroke of the holder connector 130. At this time, the movable casing 140 in contact with the contact piece 126b of the drive transmitter 126 is retained at a foremost position (see FIGS. 32 and 36). At this time, the movable casing 140 is set at the detachable position.

Then, when the mobile phone T in a substantially horizontal posture is set in the movable casing 140 and slides rearward toward the connector module 120 in a state that the battery casing 90 is fitted in the recess 141 of the movable casing 140, the movable casing 140 and the mobile phone T are integrally retracted rearward to connect the phone connector TC of the mobile phone T with the holder connector 130 in the connector module 120, thereby setting the movable casing 140 at the connected position or housed position.

When sliding the mobile phone T in the fixed casing 110, the drive transmitter 126 of the connector module 120 moves rearward at the same speed as the mobile phone T while rotating the pinion gear 125 which is in mesh with the rack 126a of the drive transmitter 126. Thereby, the holder connector 130 moves rearward in the connector module 120 at a speed half as fast as the drive transmitter 126 (i.e., the mobile phone T) in association with the rotation of the pinion gear 125 (state of FIG. 41).

Specifically, as the holder connector 130 is moved rearward, the holder connector 130 and the phone holder TC of the mobile phone T are connected due to a difference between the moving speed of the holder connector 130 and the mobile phone T. Further, accompanied with the rearward movement of the holder connector 130, the operable members 132 are released from a pressed state by the connector operators 122d. Thereby, the engaging pieces 133 are automatically fitted in the recesses Ch of the mobile phone T due to a restoring force of the operable members 132 (i.e., set at a locked position) to retain the connected state of the holder connector 130 with the phone connector TC.

Accompanied with the rearward sliding of the movable casing 140 carrying the mobile phone T, the projection 116a of the lever 116 provided at the top wall of the fixed casing 110 is guided along the side wall of the loop guide 146 through the entrance groove 146a of the movable casing 140 toward the center recess P (see FIG. 43). Then, lightly pushing the mobile phone T in the movable casing 140 rearward after abutment of the phone connector TC with the holder connector 130 slightly advances the mobile phone T and the movable casing 140 forward against the biasing force of the compression springs 124, thereby fitting the projection 116a in the center recess P of the cam 145 (see FIG. 44). Thereupon, the movable casing 140 and the mobile phone T are retained at the connected position of the holder connector 130 with the phone connector TC against the biasing force of the compression springs 124.

When the connected state is finalized, the entirety of the side portions of the mobile phone T is covered by the side walls of the fixed casing 110. Accordingly, the mobile phone T at the connected position (housed position) is inaccessible in the width direction of the mobile phone, i.e., holding the mobile phone T in the width direction thereof with fingers of a person or its equivalent is not feasible. With this arrangement, the mobile phone T snuggles in the fixed casing 110 at the connected position (housed position), thereby preventing an erroneous operation of forcibly pulling out the mobile phone T from the fixed casing 110 to disengage the phone connector TC from the holder connector 130 despite the locked state of the connection.

Next, described is an operation where the movable casing 140 is returned to the detachable position from the connected position (housed position). Lightly pushing the mobile phone T rearward toward the connector module 120 disengages the projection 116a from the center recess P. Then, the projection 116a is guided along the opposite side (left side in FIG. 44) of the loop groove 146b toward the entrance groove 146a. During the travel of the projection 116a along the above track, the mobile phone T and the movable casing 140 are moved forward by the biasing force of the compression springs 124, thereby enabling ejection of the mobile phone T from the fixed casing 110.

At this time, the holder connector 130 which is connected with the phone connector TC of the mobile phone T also advances forward in the connector module 120. Accompanied with the advancement of the holder connector 130, the operable members 132 of the holder connector 130 are pressed inward by the connector operators 122d, thereby changing the engaging pieces 133 from the lock position to the unlock position. As a result, the locked state of the connection between the phone connector TC and the holder connector 130 is released to render the mobile phone T disconnectable from the holder connector 130.

In association with the advancement of the holder connector 130, the pinion gear 125 in mesh with the rack 122c is rotated. Then, the drive transmitter 126 advances forward at a speed twice as large as the advancing speed of the holder connector 130, and the contact piece 126b of the drive transmitter 126 pushes the movable casing 140 and the mobile phone T forward. As a result, the mobile phone T is disconnected from the holder connector 130.

Specifically, the moving speed difference between the drive transmitter 126 (i.e., the mobile phone T) and the holder connector 130 enables disengagement of the phone connector TC from the holder connector 130. After the connected state of the holder connector 130 with the phone connector TC is released, holding the forward portion 91 of the mobile phone T through the cutaways 114 with fingers or its equivalent facilitates ejection of the mobile phone T from the fixed casing 110.

As mentioned above, the phone holder of the fifth embodiment is constructed such that the movable casing 140 is mounted on the fixed casing 110 to be slidable relative thereto in a state that the projection 90 on the bottom plane of the mobile phone T is fitted in the recess 141 of the movable casing 140, and sliding the movable casing 140 relative to the fixed casing 110 enables connecting the phone connector TC of the mobile phone T with the holder connector 130. Accordingly, this phone holder enables a smooth connection of the phone connector TC with the holder connector 130 while stably holding the mobile phone T in the movable casing 140 despite the projection 90.

Even in the case where batteries of plural kinds which differ in depth are accommodated in the battery casing 90, and accordingly, mobile phones of different types provided with battery casings of different shapes (depths), e.g., the small size battery casing 90A, the medium size battery casing 90B, and the large size battery casing 90C are held in the phone holder, as shown in FIGS. 46A to 46C, the phone holder is versatile in holding these mobile phones of different types.

For instance, providing the movable casing 140 with the recess 141 deep enough to fit the largest battery casing 90C enables holding the mobile phone T with the largest battery compartment 90C in the movable casing 140 in a stable state and smoothly guides the mobile phone T to the connectable position with the holder connector 130.

In the fifth embodiment, described is the phone holder with the projection (battery casing) 90 at the bottom plane thereof. However, the projection is not limited to the battery casing 90 for accommodating a battery therein. In other words, the phone holder of this invention is applicable to a phone holder capable of holding a mobile phone formed with a projection other than the battery casing.

In the fifth embodiment, the following effects are obtainable.

① The movable casing 140 is biased forward when an external pressing force is not applied (i.e., set at the detachable position), while retaining the holder connector 130 and the phone connector TC at the connected position against the biasing force of the biasing member. Lightly pushing the mobile phone T rearward (application of an external pressing force) from the above state releases the locked state. Accordingly, single operation of pushing the mobile phone T rearward disengages the mobile phone T from the holder connector 130 and ejects the mobile phone T from the fixed casing 110.

② The holder connector 130 is moved in the same direction as the mobile phone T when inserting and ejecting the mobile phone T in and out of the fixed casing 110 at a speed half as fast as the mobile phone T. Accordingly, a stroke necessary for connecting the mobile phone T with the holder connector 130 (i.e., a moved amount of the mobile phone T from the start to the end of the connection) becomes twice as long as that in a phone holder without the drive transmission mechanism (or a force duplex mechanism), and a peak force required for connection/disconnection is lessened, compared to the case where the above speed difference is not set.

③ The holder connector 130 has a locking mechanism for changing the position of the engaging pieces 133 between an unlock position and a lock position in response to an application of a pressing force by the connector operators 122*d*. Specifically, when the operable members 132 move forward in association with an advancement of the holder connector 130, the connector operators 122*d* of the connector module 120 press the operable members 132 inward to release a locked state of the engaging pieces 133.

With this arrangement, during the connection of the mobile phone T with the holder connector 130, the connected state is locked to secure an electrical connection. On the other hand, in association with an ejection of the mobile phone T, the locked state is automatically released. This arrangement eliminates an additional operation of releasing the locked state.

The drive transmission mechanism (or the force duplex mechanism) comprising the pinion gear 125 and the drive transmitter 126 may be omitted. In the case where this mechanism is omitted, for example, a spring is interposed between a rear end of the movable casing 140 and the rear portion of the fixed casing 110 to directly transmit a biasing force thereof to the movable casing 140.

The arrangement of the force duplex mechanism is not limited to the foregoing embodiment. For example, a gear train with a certain deceleration ratio including plural gear wheels may be provided in the holder connector 130. Thereby, the ratio of the moving speed of the holder connector 130 to the moving speed of the mobile phone T can be freely set, and accordingly, the connecting stroke and the force necessary for connection can be freely set.

The force duplex mechanism may comprise a linking mechanism to render the holder connector 130 movable relative to the mobile phone T in association with the movement of he mobile phone T.

In the foregoing embodiment, described is the case where the holder connector 130 and the drive transmitter 126 are incorporated in the connector module 120, and constitute the connector module 120 as a whole. Alternatively, the holder connector 130, the drive transmitter 126, and the racks 122*c*, 126*a* my be individually arranged at the respective appropriate positions in the holder main body.

Further, in the fifth embodiment, the recess 141 (engaged member) is formed in the movable casing 140. As an altered form, the recess may be formed in the mobile phone T.

In the foregoing embodiments, the phone holder is constructed such that pushing the mobile phone T rearward after the insertion in the phone holder releases a locked state of the connection with the holder connector 130. Alternatively, an operation button or its equivalent may be provided at an appropriate position on the fixed casing to release the locked state of the connection.

Further, this invention is applicable to any arrangement where a mobile phone T is held in the phone holder in a state that a phone connector is connected with a holder connector regardless of any specific use or purpose. For instance, this invention is applicable to a case where a mobile phone T is connected with an electronic device such as a personal computer for radio communication, as well as a case where a mobile phone T is connected with a speaker in a passenger compartment of a vehicle.

In summing up the disclosures in the fifth embodiment, we proposed an inventive phone holder for holding a mobile phone formed with a bulged portion on a plane thereof which comprises: a holder connector connectable with the mobile phone; a fixed casing mounted with the holder connector thereon; and a movable casing slidably mounted on the fixed casing in a connecting direction of the holder connector with the mobile phone, formed with a recess to fit the bulged portion of the mobile phone, the movable casing and the mobile phone slide in the fixed casing in a fitted state of the bulged portion in the recess to connect the mobile phone with the holder connector.

In this arrangement, the integral sliding of the mobile phone with the movable casing in a fitted state of the projection of the mobile phone in the recess of the movable casing toward the holder connector enables smooth connection of the mobile phone with the holder connector despite the existence of the projection. After the connection, the connected state of the mobile phone with the holder connector in the fixed casing remains stable. Further, when ejecting the mobile phone from the holder connector, simply pushing the mobile phone and the movable casing in a direction toward the holder connector after the connection enables smooth ejection of the mobile phone from the holder connector and consequently from the fixed casing.

The recess of the movable casing may be so designed as to fit the bulged portion of the mobile phone, the bulged portion being different in a projected amount from a flat plane of the mobile phone due to a type of battery to be loaded therein. With this configuration, the common phone holder can be used for various kinds of mobile phones currently available on the market whose thickness vary due to the size of the battery loaded therein.

The phone holder may further comprise a biasing member for biasing the movable casing in a direction away from the holder connector, and an engaging mechanism for retaining the movable casing and the mobile phone in a connected position of the mobile phone with the holder connector against a biasing force of the biasing member and releasing the connected state upon application of the external force. With this structure, by merely releasing the engagement state of the mobile phone to the holder connector, the mobile phone can be disengaged from the holder connector and the movable casing can be restored to its original state.

The engaging mechanism may include an engaged member provided in the movable casing, and the engaging mechanism is so constructed as to engage with the engaged member. With this construction, re-designing of the mobile phone is not required for this engagement purpose, thereby facilitating the versatile use of the phone holder.

The engaging mechanism may be so constructed as to release the connected state when the mobile phone in the movable casing is pushed toward the holder connector from the connected position. With this structure, the mere operation of the mobile phone enables a release of the connection between the mobile phone and the holder connector.

The holder connector may be mounted on the fixed casing to be movable in the connecting direction with the mobile phone. The phone holder may further comprise a drive transmitter for moving the holder connector at a speed slower than a moving speed of the mobile phone in the same direction as a moving direction of the mobile phone in association with the movement of the mobile phone to connect and eject the mobile phone to and from the holder connector due to a moving speed difference between the mobile phone and the holder connector. With this configuration, the holder connector is movable in the same direction as the mobile phone, thus this increases the total stroke of the movable phone required for connection and disengagement in comparison to the case with the holder connector in stationary manner. On the other hand, due to this structure, the peak force required for disengagement (or connection) is lowered, thus the operation force needed for the mobile phone for this operation can be lowered, enhancing the operability of phone holder.

The holder connector may include a connector locking mechanism having a locking member for retaining the connected state of the holder connector with the mobile phone and an operable member operable upon application of the external pressing force to switch the locking member between a lock position and an unlock position. The fixed casing may include a connector operator for operating the operable member to switch the locking member from the lock position to the unlock position when the holder connector moving in a direction opposite to the phone connecting direction with the mobile phone in the fixed casing. With this arrangement, the electrical connection between the holder connector and the mobile phone can be further secured when in the lock state; on the other hand, releasing of the lock state, when the mobile phone needs to be disengaged from the holder connector, can be automatically done.

The side wall of the fixed casing may be so designed as to cover a side portion of the mobile phone when the mobile phone is set at the connected position with the holder connector and expose part of the side portion of the mobile phone when the mobile phone is set at a detachable position away from the connected position. With this arrangement, when the mobile phone is securely connected to the holder connector, the sides of the mobile phone are covered thus the temptation to grab the exposed portion of the mobile phone is not generated; on the other hand, the part of sides of mobile phone are exposed when the phone is in the detachable position, the exposed side portion of the mobile phone can be easily grabbed for disengagement operation.

Although the present invention has been fully described by way of example with reference to the accompanying drawings, it is to be understood that various changes and modifications will be apparent to those skilled in the art. Therefore, unless otherwise such change and modifications depart from the scope of the invention, they should be construed as being included therein.

What is claimed is:

1. A phone holder for holding a mobile phone comprising:
   a movable casing formed with a hollow portion adapted for receiving the mobile phone;
   a holder connector mounted on the movable casing at such a position as to be connectable with the mobile phone when the mobile phone is inserted in the movable casing wherein the holder connector includes a connector locking mechanism having a locking member for retaining the connected state of the holder connector with the mobile phone and an operable member operable upon receiving the external pressing force to switch the locking member between a lock position and an unlock position, and further comprising a connector operator for operating the operable member to set the locking member at the unlock position when the movable casing is set at the detachable position and set the locking member at the lock position when the movable casing is set at the housed position; and
   a fixed casing for supporting the movable casing,
   the movable casing settable between a housed position where the movable casing is housed in the fixed casing along with the mobile phone and a detachable position where the hollow portion is accessible to allow insertion of the mobile phone with the holder connector and ejection of the mobile phone.

2. The phone holder as defined in claim 1 further comprising a biasing member for biasing the movable casing toward the detachable position, and a locking mechanism for locking the movable casing and the mobile phone at the housed position against a biasing force of the biasing member and releasing the locked state upon application of an external force.

3. The phone holder as defined in claim 1, wherein the movable casing is pivotally connected to the fixed casing about a rear end of the movable casing that is opposite to an opening end of the hollow portion.

4. The phone holder as defined in claim 3, wherein the holder connector includes the connector locking mechanism having a locking member for retaining the connected state of the holder connector with the mobile phone and an operable member operable upon receiving the external pressing force to switch the locking member between a lock position and an unlock position, and further comprising a connector operator for operating the operable member to set the locking member to the unlock position when the movable casing is set at the detachable position and to set the locking member to the lock position when the movable casing is set at the housed position.

5. The phone holder as defined in claim 1, wherein the movable casing and the fixed casing are so constructed as to restrict a movement of the mobile phone in a direction away from the holder connector when the movable casing is set at the housed position.

6. The phone holder as defined in claim 1, wherein the movable casing includes a main body formed with the hollow portion to set the holder connector and a cover mounted on the main body to cover the holder connector set in the main body of the movable casing, the cover and the main body holding the holder connector therebetween when the cover is mounted on the main body.

7. The phone holder as defined in claim 6, wherein at least one of the main body and the cover of the movable casing is provided with a connector stopper for restricting a movement of the holder connector along a connecting direction by an engagement with the holder connector, and the engaged state of the holder connector with the connector stopper is retained when the cover is mounted on the main body of the movable casing.

8. The phone holder as defined in claim 1, wherein the movable casing is formed with a recess at a bottom wall thereof to receive a bulged portion formed on a plane of the mobile phone opposing to the bottom wall.

9. The phone holder as defined in claim 8, wherein the recess of the movable casing is formed in such a shape as to fit the bulged portion of the mobile phone in a one-size-fits-all manner, the bulged portion being different in a projected amount from a flat bottom plane of the mobile phone due to a type of battery to be loaded therein.

10. The phone holder as defined in claim 8, wherein the movable casing has a bottom wall and side walls to form an opening opened upward and in a front direction, the holder connector is provided at a rear position of the movable casing to be connectable with the mobile phone in a phone connecting direction, the movable casing is formed at the rear position on the side wall with a cover in such a shape as to cover part of the mobile phone to prevent the mobile phone from obliquely connected to and detached from the holder connector.

11. The phone holder as defined in claim 8, wherein the movable casing has a bottom wall and side walls to form an opening opened upward and in a front direction, the holder connector is provided at a rear position of the movable casing to be connectable with the mobile phone in the phone connecting direction, the recess of the movable casing is shaped into a stepped portion with a level thereof higher toward the holder connector to secure an abutment of a leading end of the mobile phone with the stepped portion so as to prevent the mobile phone from intruding further rearward of the movable casing over the stepped portion.

12. The phone holder as defined in claim 1, wherein the movable casing has a bottom wall and side walls to form an opening opened upward and in a front direction, the holder connector is provided at a rear position of the movable casing to be connectable with the mobile phone in a phone connecting direction, the movable casing is formed at a rear position on the side wall with a cover in such a shape as to cover part of a top portion of the mobile phone to prevent the mobile phone from obliquely connected to and detached from the holder connector.

13. A phone holder for holding a mobile phone comprising:

a movable casing formed with a hollow portion adapted for receiving the mobile phone;

a holder connector mounted on the movable casing at such a position as to be connectable with the mobile phone when the mobile phone is inserted in the movable casing; and a fixed casing for supporting the movable casing, the movable casing settable between a housed position where the movable casing is housed in the fixed casing along with the mobile phone and a detachable position where the hollow portion is accessible to allow insertion of the mobile phone with the holder connector and ejection of the mobile phone, wherein the movable casing is pivotally connected to the fixed casing about a rear end of the movable casing that is opposite to an opening end of the hollow portion, and wherein the rear end of the movable casing is integrally formed with a pair of pivot shafts extending in a lateral direction, and the fixed casing is formed with a cutaway opened upward to receive the pivot shaft from bottom so that the fixed casing rotatably supports the movable casing about the pivot shaft when the pivot shaft is fitted in a bottom end of the cutaway.

14. A phone holder for holding a mobile phone comprising:

a movable casing formed with a hollow portion adapted for receiving the mobile phone;

a holder connector mounted on the movable casing at such a position as to be connectable with the mobile phone when the mobile phone is inserted in the movable casing wherein the holder connector includes the connector locking mechanism having a locking member for retaining the connected state of the holder connector with the mobile phone and an operable member operable upon receiving the external pressing force to switch the locking member between a lock position and an unlock position; and further comprising a connector operator for operating the operable member to set the locking member to the unlock position when the movable casing is set at the detachable position and to set the locking member to the lock position when the movable casing is set at the housed position, wherein the connector operator includes a connector operating member integrally formed with the fixed casing and protruding inward from an inner wall of the fixed casing, the connector operating member formed into such a shape as to change the operable member to set the locking member at the unlock position when the movable casing is set at the detachable position and set the locking member at the lock position when the movable casing is set at the housed position; and a fixed casing for supporting the movable casing, the movable casing settable between a housed position where the movable casing is housed in the fixed casing along with the mobile phone and a detachable position where the hollow portion is accessible to allow insertion of the mobile phone with the holder connector and ejection of the mobile phone, wherein the movable casing is pivotally connected to the fixed casing about a rear end of the movable casing that is opposite to an opening end of the hollow portion.

15. A phone holder for holding a mobile phone comprising:

a movable casing formed with a hollow portion adapted for receiving the mobile phone;

a holder connector mounted on the movable casing at such a position as to be connectable with the mobile phone when the mobile phone is inserted in the movable casing; and a fixed casing for supporting the movable casing, the movable casing settable between a housed position where the movable casing is housed in the fixed casing along with the mobile phone and a detachable position where the hollow portion is accessible to allow insertion of the mobile phone with the holder connector and ejection of the mobile phone, wherein the movable casing is pivotally connected to the fixed casing about a rear end of the movable casing that is opposite to an opening end of the hollow portion, wherein the holder connector includes the connector locking mechanism having a locking member for retaining the connected state of the holder connector with the mobile phone and an operable member operable upon receiving the external pressing force to switch the locking member between a lock position and an unlock position; and further comprising a connector operator for operating the operable member to set the locking member to the unlock position when the movable casing is set at the detachable position and to set the locking member to the lock position when the movable casing is set at the housed position, wherein the connector operator includes a movable member movable between an operable position to render the operable member operable and a retracted position away from the operable position toward outside of the movable casing, and a guide member is formed in an inner wall of the fixed casing to move the movable member to set the locking member at the unlock position when the movable casing is set at the detachable position and set the locking member at the lock position when the movable casing is set at the housed position.

* * * * *